United States Patent
Zhao et al.

(10) Patent No.: US 11,361,764 B1
(45) Date of Patent: Jun. 14, 2022

(54) DEVICE NAMING-INDICATOR GENERATION

(71) Applicant: Amazon Technologies, Inc., Seattle, WA (US)

(72) Inventors: David Y Zhao, Bellevue, CA (US); Akshay Kumar, Seattle, WA (US); William Evan Welbourne, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 196 days.

(21) Appl. No.: 16/239,182

(22) Filed: Jan. 3, 2019

(51) Int. Cl.
| | |
|---|---|
| *G10L 15/22* | (2006.01) |
| *G10L 15/18* | (2013.01) |
| *G10L 15/28* | (2013.01) |

(52) U.S. Cl.
CPC .......... *G10L 15/22* (2013.01); *G10L 15/1815* (2013.01); *G10L 15/28* (2013.01); *G10L 2015/223* (2013.01)

(58) Field of Classification Search
USPC .................. 704/235, 246, 247, 251, 252
See application file for complete search history.

(56) References Cited

U.S. PATENT DOCUMENTS

| | | | | |
|---|---|---|---|---|
| 6,584,439 | B1* | 6/2003 | Geilhufe | G06F 3/167 |
| | | | | 704/270 |
| 10,515,623 | B1* | 12/2019 | Grizzel | H04M 1/6066 |
| 10,623,844 | B2* | 4/2020 | Clayton | H04R 1/1041 |
| 10,692,485 | B1* | 6/2020 | Grizzel | G10L 15/1822 |
| 2018/0077115 | A1* | 3/2018 | Miao | H04L 61/3065 |
| 2018/0102914 | A1* | 4/2018 | Kawachi | G10L 15/22 |
| 2018/0359360 | A1* | 12/2018 | Yi | H04M 3/5183 |
| 2019/0306607 | A1* | 10/2019 | Clayton | H04R 1/1041 |

* cited by examiner

*Primary Examiner* — Leonard Saint Cyr
(74) *Attorney, Agent, or Firm* — Lee & Hayes, P.C.

(57) ABSTRACT

Systems and methods for device naming-indicator generation are disclosed. Friendly names for accessory devices, such as smart-home devices, may be utilized to generate formatted text data that includes capitalization and/or punctuation for the friendly names. The formatted text data may be utilized to generate tag data indicating attributes of the friendly name. The tag data and/or contextual data indicating historical usage of the accessory device may be utilized to generate naming indicator(s) for the accessory device. The naming indicator(s) may be utilized, for example, during target inference and/or for communicating with a user about the accessory device.

20 Claims, 13 Drawing Sheets

DEVICE NAMING-INDICATOR GENERATION

BACKGROUND

Voice-enabled devices and smart home devices have become ubiquitous. Some users may utilize voice-enabled devices to operate such smart home devices by providing user utterances to the voice-enabled devices. Described herein are improvements in technology and solutions to technical problems that can be used to, among other things, improve the use of voice-enabled devices to operate smart home devices.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
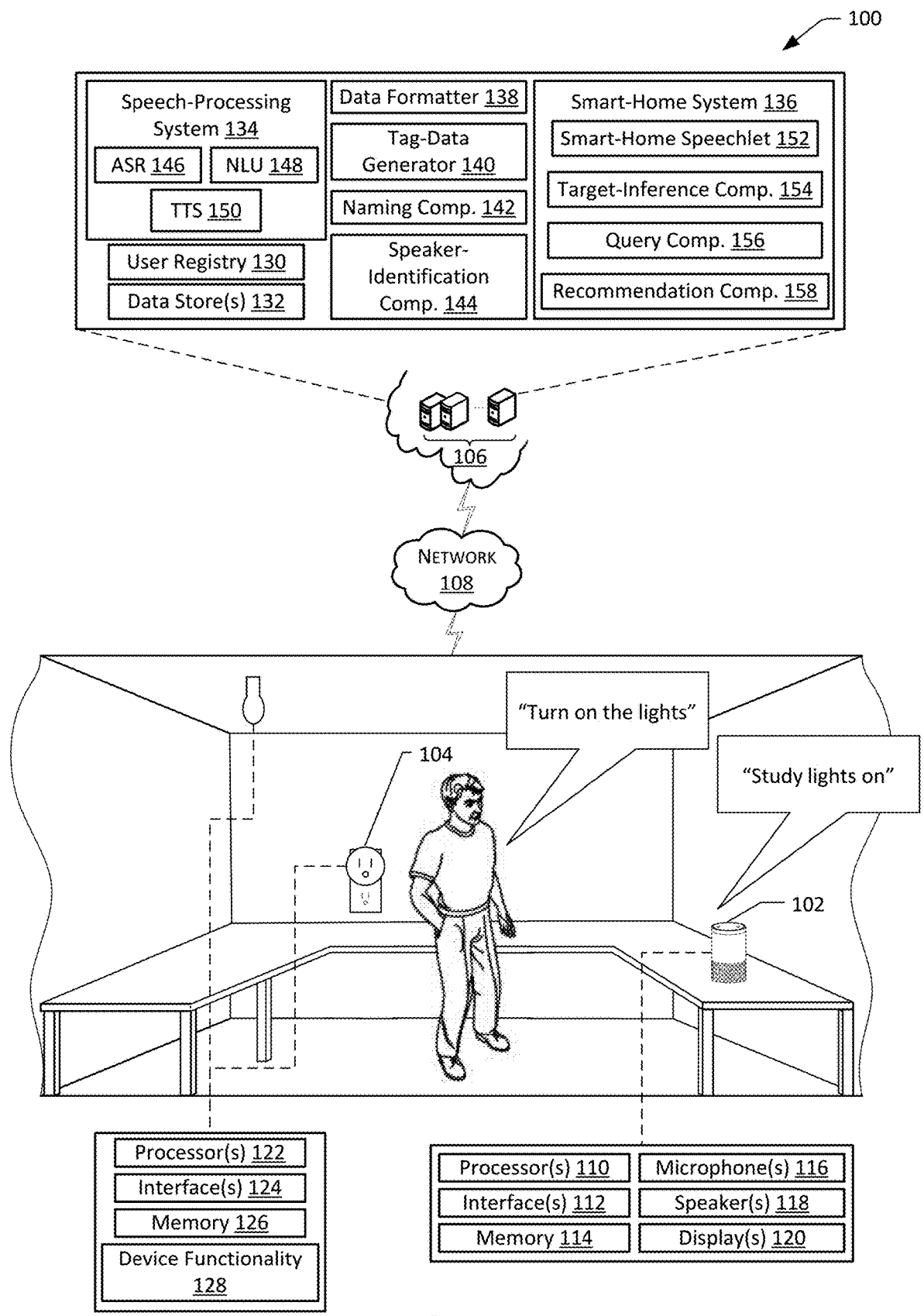
FIG. 1 illustrates a schematic diagram of an example environment for device naming-indicator generation.

Systems and methods for device naming-indicator generation are disclosed. Take, for example, an environment or space such as a home that may have one or more voice-enabled devices and one or more smart home devices, also described herein as accessory devices. The voice-enabled devices may be configured, for example, to receive audio representing user utterances and generate corresponding audio data to be utilized by a system, for example, to cause an action and/or operation to be performed. The action may be to cause the one or more accessory devices to perform an operation, such as switching from an on state to an off state, or vice versa. Other actions may include causing an accessory device to lock, unlock, dim a light bulb, start a timer, activate a heating element, capture image data, set a temperature, etc. These accessory devices may each be associated with a device identifier, which may have been assigned to the smart home device by the manufacturer and/or seller of the device.

Additionally, a user of a given device may assign a naming indicator to the device. This naming indicator may be described as a "friendly name." For example, during an out-of-the-box experience, during setup of the device, and/or at some point after setup, the user may assign the device a naming indicator. For example, the user may assign a smart light bulb with the naming indicator "Rob's Light," or "Kitchen Light," or "Brand X Light," for example. Assignment of naming indicators may be performed utilizing an application residing on and/or accessible to a mobile device and/or utilizing the voice-enabled devices described herein. In these and other examples, numerous accessory devices in numerous spaces in an environment may each be assigned a friendly name. However, as the number of accessory devices increases, and thus the number of naming indicators increases, it may be difficult to determine which device to operate in response to a user utterance provided to the voice-enabled device. Additionally, or alternatively, when audio is to be output by a speaker of the voice-enabled device, such as when a query is to be output to the user, accurate and understandable identification of an accessory device may increase the usefulness of the voice-enabled device in operating accessory device.

Described herein are innovations that allow for device naming-indicator generation in a manner that allows for improved and/or more accurate interaction between users and voice-enabled devices for operating accessory devices. For example, data representing friendly names for accessory devices may be stored in association with a user account associated with a voice-enabled device. This data may be stored in a user registry and/or a data store associated with a system. In this way, the system may be configured to identify the friendly names of accessory devices associated with a voice-enabled device. In examples, the friendly names may be stored in an irregularly-parsed manner such that the text data representing the friendly names does not indicate and/or omits capitalization and/or punctuation. For example, the friendly name "David's bedroom Brand X light" may be stored as "davids bedroom brand x light." In these examples, identifying and/or parsing the friendly name for purposes of determining its components may be difficult. As such, the system may format the text data representing the friendly name to indicate capitalization and/or punctuation. For example, the text data may be analyzed in association with a naming list indicating common names. The portions of the text data that correspond to a name in the naming list may be determined to be names and the first letter of that portion of the text data may be capitalized. Additionally, or alternatively, a brand list indicating common brands of accessory devices may be analyzed in association with the text data to determine portions of the text data corresponding to a brand name. Text data indicating a capitalized letter may be considered a proper noun such as a name and/or brand. Formatting of the text data may also include determining that a proper noun ends in an "s" and indicates possession of the next word in the text data. For example, for the friendly name "Davids bedroom Brand X light," the "s" at the end of the proper noun "David" may indicate that the "bedroom Brand X light" is possessed by "David." In these examples, appropriate punctuation, such as an apostrophe may be included in the text data such that the formatted friendly name is "David's bedroom Brand X light." In this way, the text data representing a friendly name may be formatted for further processing as described herein.

For example, tag data may be generated for a given friendly name. The tag data may represent one or more tags, such as device location, device type, device brand, device name, a quantifier, one or more setting values, and/or placeholder tags for unknown words not yet associated with the friendly name. Using the example provided above, the system may generate tag data associated with the friendly name "David's bedroom Brand X light." In this example, given that "David" was determined to be a name during formatting, the tag data may indicate that the friendly name includes a person name and may indicate that the person name is "David." Additionally, given that "Brand X" was determined to be a brand name during formatting, the tag data may indicate that the friendly name includes a brand name and may indicate that the brand name is "Brand X."

Additionally, the formatted text data may be analyzed in association with a location list that may indicate common names of locations, such as spaces within a home. For example, the text data "David's bedroom Brand X light" may be analyzed with respect to the location list to determine that "bedroom" is a location. The tag data may indicate that the friendly name includes a location indicator and may indicate that the location is "bedroom." Additionally, the formatted text data may be analyzed in association with a device-type list that may indicate common device types, such as plugs, lights, switches, lamps, light bulbs, locks, thermostats, cameras, displays, etc. For example, the text data "David's bedroom Brand X light" may be analyzed with respect to the device-type list to determine that "light" is a device type. The tag data may indicate that the friendly name includes a device-type indicator and may indicate that the device type is "light." Additionally, given that the word "light" from the text data is singular, as opposed to "lights," tag data may be generated indicating that the friendly name corresponds to a single accessory device as opposed to multiple lights and/or a group of lights. The tag data may be stored in association with, for example, a data store associated with the system. Some or all of the tag data described herein may be described as device-profile data, and may include indications of device location, device type, person names associated with a device, brand names associated with a device, etc.

In addition to, or instead of, the formatted text data and/or the tag data as described above, contextual data associated with the accessory devices and/or the voice-enabled devices may be received, identified, determined, and/or generated and stored in association with the data store. The contextual data may include, for example, indications of historical usage of accessory devices. For example, the contextual data may indicate, for a given accessory device, times and/or days that a state change occurred for the accessory device, such as when the accessory device was turned on and/or turned off. The contextual data may also include a user identifier associated with a given interaction with a voice-enabled device. The user identifier may indicate which user provided the user utterance. The contextual data may be utilized by the system, for example, to temporally cluster devices based on state changes and/or usage information. For example, a given accessory device may be associated with a usage pattern that is similar to a group and/or cluster of other accessory devices having friendly names that include "porch light." In these examples, the given accessory device may be determined to be a "porch light," such as in examples where a friendly name has not been assigned to the given accessory device.

The system may be configured to utilize the formatted text data associated with accessory devices, and/or the tag data, and/or the contextual data to determine and/or generate a naming indicator for a given accessory device, such as at a given time and/or in response to a given user utterance. For example, a user utterance may include "turn on my bedroom light." The voice-enabled device may capture audio representing the user utterance and may generate corresponding audio data. The audio data may be sent to the system, which may attempt to determine an action to be performed based at least in part on the user utterance. In this example, the system may determine that a "turn on" intent is associated with the user utterance and that the accessory device to be turned on is "my bedroom light." However, in situations where "my bedroom light" may correspond to multiple friendly names and/or no friendly name of accessory devices associated with the voice-enabled device, the system may perform target-device arbitration operations to determine which accessory device should be acted upon.

For example, the system may utilize the formatted text data, the tag data, and/or the contextual data to determine which accessory device should be acted upon. Utilizing the example provided above, the system may determine that the user who provided the user utterance is associated with a particular name identifier, such as "David." The system may utilize the tag data to determine which friendly names are associated with the name "David." Additionally, or alternatively, the system may utilize the tag data to determine which friendly names include the location indicator of "bedroom" and which friendly names include the device-type indicator of "light." In this example, the system may determine that the accessory device with the friendly name "David's bedroom Brand X light" is the target accessory device. In other examples, the contextual information may indicate that, at a time and/or day at which the audio data representing the user utterance was received by the system, the "David's bedroom Brand X light" accessory device is typically activated. This information may be utilized to select the "David's bedroom Brand X light" accessory device as the target accessory device. In still other examples where friendly names of accessory devices associated with the voice-enabled device do not include "bedroom light," the contextual data may indicate that a given accessory device is likely a "bedroom light" based at least in part on usage patterns associated with that accessory device. For example, as described more fully above, the system may determine that the accessory device has a usage pattern that is similar to usage patterns of a cluster of accessory devices, associated with the voice-enabled device and/or associated with other voice-enabled devices, that include versions of "bedroom light" in their friendly names.

Additionally, or alternatively, the system may utilize the naming indicator generated for the accessory device when communicating with a user. For example, a query and/or alert and/or reminder may be sent to the voice-enabled device for audible output via one or more speakers of the voice-enabled device. The query may include a request for information, such as in response to a user utterance requesting an action to be performed. The alert, which may also be described as a "hunch," may include an indication that, for example, an accessory device is in a state that the system has determined to differ from a state the accessory device is historically operating at a given time and/or on a given day.

The reminder may include an indication that the user should request an action to be performed in association with an accessory device based at least in part on contextual data associated with the accessory device. In these and other examples, the system may generate output data, which may include audio data and send that output data to the voice-enabled device, which may output corresponding audio. As such, identification of the accessory device referenced in the output data may be helpful.

In these examples, generation of the output data may include determining the naming indicator for the accessory device utilizing the tag data and/or contextual data and incorporating the naming indicator in the output data as the identifier of the accessory device. Additionally, with respect to portions of the output data other than the identifier of the accessory device, the naming indicator may be utilized to inform generation of those portions. For example, if a naming indicator of "kitchen lights" is determined for the accessory devices to be acted upon, the system may determine that the naming indicator includes an indication of plural accessory devices and may generate the remaining output data based at least in part on that determination. For example, the system may generate output data corresponding to "the kitchen lights are on" instead of "the kitchen lights is on." The output data may be sent to the voice-enabled device, which may output corresponding audio via speakers of the voice-enabled device.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for device naming-indicator generation. The system 100 may include, for example, a voice-enabled device 102. The voice-enabled device 102 may be configured to receive user utterances and perform operations in response to such user utterances. In these examples, the voice-enabled device 102 may be "hands free" such that interactions with the device are performed through audible requests and responses.

The system 100 may also include one or more accessory devices 104. The accessory devices 104 may be described as "smart" devices, which may have certain computing components and be configured to send and/or receive data from other devices. The accessory devices 104 may be, for example, light bulbs, plugs, locks, televisions, appliances, doorbells, cameras, etc. As shown in FIG. 1, the space in which the voice-enabled device 102 is situated may include two accessory devices 104, which may be a light bulb and a plug, respectively. The accessory devices 104 may be "paired" or otherwise associated with the voice-enabled device 102. As such, the accessory devices 104 may be configured to send data to and/or receive data from the voice-enabled device 102. The accessory devices 104 may be associated with friendly names, which may be provided by a user of the accessory devices 104, the system 106, and/or one or more third-party systems.

The voice-enabled device 102 and/or the accessory devices 104 may be configured to send data to and/or receive data from the system 106, such as via a network 108. In examples, voice-enabled device 102 and/or the accessory devices 104 may communicate directly with the system 106, via the network 108.

The voice-enabled device 102 may include one or more components, such as, for example, one or more processors 110, one or more network interfaces 112, memory 114, one or more microphones 116, one or more speakers 118, and/or one or more displays 120. The microphones 116 may be configured to capture audio, such as user utterances, and generate corresponding audio data. The speakers 118 may be configured to output audio, such as audio corresponding to audio data received from another device and/or the system 106. The displays 120 may be configured to present images, such as images corresponding to image data received from another device and/or the system 106.

The accessory devices 104 may include one or more components, such as, for example, one or more processors 122, one or more network interfaces 124, memory 126, and/or device functionality components 128. The memory 126 and/or processors 122 may be utilized to cause certain operations to be performed by the accessory devices 104, such as activating and/or deactivating the device functionality components 128. The device functionality components 128 may include components associated with the intended use of the accessory devices 104. For example, one of the accessory devices 104 may be a light bulb, and in this example, the device functionality components 128 may include a filament and/or light emitting diode that may produce and/or emit light. By way of further example, another accessory device 104 may be a wall plug, and in this example, the device functionality components 128 may include an "on/off mechanism" for causing electricity to flow or not flow to a device that is plugged in to the wall plug. It should be noted that the device functionality components 128 illustrated here are by way of example only.

In examples, while the accessory devices 104 are described with respect to FIG. 1 and elsewhere herein as differing from voice-enabled devices 102, the accessory devices 104 may be voice-enabled devices 102. In these examples, the techniques described herein may be utilized to generate naming indicators for voice-enabled devices 102 in addition to or instead of accessory devices 104. Additionally, friendly names may be identified, determined, and/or generated for voice-enabled devices 102 in the same or a similar manner as for accessory devices 104, as described herein. As such, in some instances, or each instance, where performance of an operation by and/or about an accessory device 104 is perform, this disclosure includes the performance of an operation by and/or about a voice-enabled device 102.

The system 106 may include components such as, for example, a user registry 130, one or more data stores 132, a speech-processing system 134, a smart-home system 136, a data formatter 138, a tag-data generator 140, a naming component 142, and/or a speaker-identification component 144. The speech-processing system 134 may include an automatic speech recognition (ASR) component 146, a natural language understanding (NLU) component 148, and/or a text-to-speech (TTS) component 150. The smart-home system 136 may include a smart-home speechlet 152, a target-inference component 154, a query component 156, and/or a recommendation component 158. Each of the components described herein with respect to the system 106 may be associated with their own systems, which collectively may be referred to herein as the system 106, and/or some or all of the components may be associated with a single system. The components of the system 106 are described in detail below. In examples, some or each of the components of the system 106 may include their own processor(s), network interface(s), and/or memory. As such, by way of example, the speech-processing system 134 may include and/or be associated with processor(s), network interface(s), and/or memory. The smart-home system 136 may include and/or be associated with different processor(s), network interface(s), and/or memory, or one or more of these components may utilize some or all of the same processor(s), network interface(s), and/or memory utilized by the speech-processing system 136. These components are described in detail below. Additionally, the operations and/or functionalities associated with and/or described with respect to the components of the system 106 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

The user registry component 130 may be configured to identify, determine, and/or generate associations between users, user accounts, and/or devices. For example, one or more associations between user accounts may be identified, determined, and/or generated by the user registry 130. The user registry 130 may additionally store information indicating one or more applications and/or resources accessible to and/or enabled for a given user account. Additionally, the user registry 130 may include information indicating device identifiers, such as naming identifiers, associated with a given user account, as well as device types associated with the device identifiers. The user registry 130 may also include information indicating user account identifiers, naming indicators of devices associated with user accounts, and/or associations between devices, such as the voice-enabled device 102 and the accessory devices 104. The user registry 130 may also include information associated with usage of the voice-enabled device 102 and/or the accessory devices 104. It should also be understood that a user account may be associated with one or more than one user profiles. It should also be understood that the term "user account" may be used to describe a set of data and/or functionalities associated with a given account identifier. For example, data identified, determined, and/or generated while using some or all of the system 100 may be stored or otherwise associated with an account identifier. Data associated with the user accounts may include, for example, account access information, historical usage data, device-association data, and/or preference data.

The data stores 132 may be configured to identify, determine, and/or generate data associated with use of the voice-enabled device 102 and/or the accessory devices 104. For example, the voice-enabled device 102 may be utilized to provide responses to user requests and/or other interactions may occur between the voice-enabled device 102 and the accessory devices 104 and/or one or more users. Usage data may be identified, determined, and/or generated that indicates some or each of these interactions. Timing data may also be identified, determined, and/or generated that indicates a time at which some or each of these interactions took place. It should be understood that while the user registry 130 and the data stores 132 are illustrated as separate components, the user registry 130 and the data stores 132 may be the same component. In examples, the data stores 132 may store data utilized by the naming component 142, as discussed more fully herein.

The speech-processing system 134 may be configured to receive audio data from the voice-enabled device 102 and perform speech-processing operations. For example, the ASR component 146 may be configured to generate text data corresponding to the audio data, and the NLU component 148 may be configured to generate intent data corresponding to the audio data. In examples, intent data may be generated that represents the audio data, such as without the generation and/or use of text data. The intent data may indicate a determined intent associated with the user utterance as well as a payload and/or value associated with the intent. For example, for a user utterance of "turn on David's bedroom light," the NLU component 148 may identify a "turn on" intent and the payload may be "David's bedroom light." In this example where the intent data indicates an intent to operate an accessory device 104, the speech-processing system 134 may call one or more speechlets to effectuate the intent. For example, the smart-home speechlet 152 associated with the smart-home system 136 may be called when the intent indicates operation of an accessory device 104. The speechlet 152 may be designated as being configured to handle the intent of activating and/or deactivating an accessory device 104, for example. The speechlet 152 may receive the intent data and/or other data associated with the user utterance from the NLU component 148, such as by an orchestrator of the system 106, and may perform operations to instruct the voice-enabled device 102 and/or another device to perform on operation with respect to an accessory device 104.

The speechlet(s) described herein may include a speech-enabled web component that may run in the system 106. Speechlet(s) may receive and respond to speech-initiated requests. Speechlet(s) may define life-cycle events for an application as experienced by a user, a way to process speech requests from the user, and/or call-backs from events happening on the device the user is interacting with. Given speechlet(s) may be capable of handling certain intents. For example, the NLU component may generate intent data that indicates an intent as well as a payload associated with the intent. A speechlet may be associated with the intent, and thus the intent data, including the payload may be sent to and received by the speechlet. The speechlet may process that intent by analyzing the payload and generating data representing a directive and/or instruction to perform an action. The directive and/or instruction may be sent to other components of the system for performance of the action.

The data formatter 138 may be configured to format data representing friendly names of accessory devices 104. For example, the data representing friendly names for accessory devices may be stored in association with the user registry 130 and/or the data stores 132. In examples, the friendly names may be stored in an irregularly-parsed manner such that the text data representing the friendly names does not indicate and/or omits capitalization and/or punctuation. For example, the friendly name "David's bedroom Brand X light" may be stored as "davids bedroom brand x light." The data formatter 138 may be configured to format the text data representing the friendly name to indicate capitalization and/or punctuation. For example, the text data may be analyzed in association with a naming list indicating common names. The portions of the text data that correspond to a name in the naming list may be determined to be names and the first letter of that portion of the text data may be capitalized. Additionally, or alternatively, a brand list indicating common brands of accessory devices may be analyzed in association with the text data to determine portions of the text data corresponding to a brand name. Text data indicating a capitalized letter may be considered a proper noun such as a name and/or brand. Formatting of the text data may also include determining that a proper noun ends in an "s" and indicates possession of the next word in the text data. For example, for the friendly name "Davids bedroom Brand X light," the "s" at the end of the proper noun "David" may indicate that the "bedroom Brand X light" is possessed by "David." In these examples, appropriate punctuation, such as an apostrophe may be included in the text data such that the formatted friendly name is "David's bedroom Brand X light." In this way, the text data representing a friendly name may be formatted for further processing as described herein.

The data formatter 138 may utilize one or more models to generate the formatted text data as described herein. For example, a corpus of training text data that are each correctly cased and punctuated may be utilized to train a model for generation of the formatted text data. The model may, for each word in the unformatted text data, iteratively test a varies of cased and/or uncased forms as well as a variety of punctuated forms. Unigram, bigram, and/or trigram probabilities may be determined for each of the possibilities and a score for each may be generated. The iteration with the most favorable score may be determined to be the appropriate casing and/or punctuation of the word in the text data. In addition to, or instead of, utilizing a model to generate the formatted text data, one or more heuristics may be utilized.

The tag-data generator 140 may be configured to generate tag data for a given friendly name. The tag data may indicate device location, device type, device brand, device name, a quantifier, one or more setting values, and/or placeholder tags for unknown words not yet associated with the friendly name. The tag-data generator 140 may generate tag data associated with the friendly name "David's bedroom Brand X light." In this example, given that "David" was determined to be a name during formatting, the tag data may indicate that the friendly name includes a person name and may indicate that the person name is "David." Additionally, given that "Brand X" was determined to be a brand name during formatting, the tag data may indicate that the friendly name includes a brand name and may indicate that the brand name is "Brand X."

In examples, the tag-data generator 140 may utilize one or more models to generate the tag data as described herein. For example, a logistic regression model and/or a neural network may be configured to accept featurized friendly names and output the tag data. For example, one or more mappings between portions of the featurized friendly names and lists for human names, device types, device locations, brand names, etc. may be generated. The mappings having the most favorable scores may be selected for a given friendly name. In addition to, or instead of, utilizing a model to generate the tag data, one or more heuristics may be utilized.

Additionally, the formatted text data may be analyzed in association with a location list that may indicate common names of locations, such as spaces within a home. For example, the text data "David's bedroom Brand X light" may be analyzed with respect to the location list to determine that "bedroom" is a location. The tag data may indicate that the friendly name includes a location indicator and may indicate that the location is "bedroom." Additionally, the formatted text data may be analyzed in association with a device-type list that may indicate common device types, such as plugs, lights, switches, lamps, light bulbs, locks, thermostats, cameras, displays, etc. For example, the text data "David's bedroom Brand X light" may be analyzed with respect to the device-type list to determine that "light" is a device type. The tag data may indicate that the friendly name includes a device-type indicator and may indicate that the device type is "light." Additionally, given that the word "light" from the text data is singular, as opposed to "lights," tag data may be generated indicating that the friendly name corresponds to a single accessory device as opposed to multiple lights and/or a group of lights. The tag data may be stored in association with, for example, the data store 132 associated with the system. Some or all of the tag data described herein may be described as device-profile data, and may include indications of device location, device type, person names associated with a device, brand names associated with a device, etc.

In addition to, or instead of, the formatted text data and/or the tag data as described above, contextual data associated with the accessory devices 104 and/or the voice-enabled devices 102 may be received, identified, determined, and/or generated and stored in association with the data store 132. The contextual data may include, for example, indications of historical usage of accessory devices 104. For example, the contextual data may indicate, for a given accessory device 104, times and/or days that a state change occurred for the accessory device 104, such as when the accessory device 104 was turned on and/or turned off. The contextual data may also include a user identifier associated with a given interaction with a voice-enabled device 102. The user identifier may indicate which user provided the user utterance. The contextual data may be utilized by the system 106, for example, to temporally cluster devices based on state changes and/or usage information. For example, a given accessory device 104 may be associated with a usage pattern that is similar to a group and/or cluster of other accessory devices 104 having friendly names that include "porch light." In these examples, the given accessory device 104 may be determined to be a "porch light," such as in examples where a friendly name has not been assigned to the given accessory device 104.

The naming component 142 may be configured to identify, determine, and/or generate naming indicators based at least in part on the formatted text data, the tag data, and/or the contextual data, such as described above. For example, the friendly name for an accessory device 104 may be "Rob's device." However, the naming component 142, utilizing the data described herein, may be configured to generate one or more naming indicators for the accessory device 104 other than Rob's device. For example, the tag data may indicate that the accessory device 104 is located in a kitchen, and the naming component 142 may utilize this information to generate a naming indicator of "kitchen device." Additionally, or alternatively, the tag data may indicate that the accessory device 104 is a "light," and the naming component 142 may utilize this information to generate a naming indicator for "Rob's light." Additionally, or alternatively, the tag data may indicate that the accessory device 104 is associated with a particular brand, such as Brand X, and the naming component 142 may utilize this information to generate a naming indicator of "Rob's Brand X device." In further examples, the naming component 142 may utilize the contextual data, particularly the usage history and temporal clustering as described herein, to determine that the device is likely a "porch light," and the naming component 142 may generate a naming indicator of "Rob's porch light."

The naming component 142 may utilize one or more machine learning models to generate the naming indicators. Additionally, or alternatively, the components described above for generating formatted text data and/or tag data and/or contextual data may utilize one or more machine learning models to generate such data. For example, a lemmatizer may be utilized when determining plurality associated with a friendly name, or in other words, when determining if a friendly name corresponds to a single device or multiple devices. The lemmatizer may utilize the tag data associated with the device type and/or the device name to determine whether that tag data indicates plurality. In examples, the friendly name may be analyzed with respect to the lemmatized name to determine whether the friendly name corresponds to one or multiple devices. A lemmatizer, otherwise described as a lemmatization model, may receive, as input, text data. In these examples, the text data may correspond to a friendly name of a device. The lemmatization model may analyze the text data to determine a context associated with words corresponding to the text data. For example, multiple words may have the same root phrase and/or multiple words may be associated with a category of objects and/or items. Words such as "living room," "great room," and "family room" may all be related to a common living space, similar to "study" and "office" being related to a working space. The lemmatizer may be utilized to associate or otherwise link words to a common meaning and/or word. Over time, the lemmatizer may utilize machine learning techniques to identify and/or determine associations between words and apply those associations to the friendly names of devices.

Additionally, or alternatively, the tag data may be generated based at least in part on machine learning models. For example, as described above, naming lists may be utilized to determine whether a friendly name includes a person name and/or a brand name. The text data of the friendly name may be analyzed with respect to the naming lists to determine whether a name on the naming list corresponds to a word of the text data. However, in examples, the naming lists may not be inclusive of all person names and/or brand names. In these examples, a statistical model may be utilized to determine whether a portion of a friendly name corresponds to a person name and/or a brand name. The model may receive, as input, the formatted text data that includes the capitalization and punctuation. The statistical model may determine for some or each portion of the formatted text data, a probability that a portion corresponds to a person name and/or a brand name. The probability may be determined based at least in part on factors such as, capitalization, the presence of an apostrophe, the length of a given word, the placement of the word with respect to other words in the friendly name, and/or a similarity of the word to one or more names in the naming list. If the determined probability is greater than a threshold probability, then that portion may be tagged as associated with a person name and/or a brand name. The machine learning models may determine, over time, which features have the greatest impact on identifying names and may adjust a weighting of those features. Additionally, or alternatively, the machine learning models may identify that the probability threshold should be increased or decreased to avoid false positives and/or false negatives for person and/or brand naming.

Additionally, or alternatively, the contextual data may be generated based at least in part on machine learning models. For example, as described above, the contextual data may include indications that a given device operates similarly to a cluster of other devices. In these examples, the friendly names of the other devices may inform the generation of a naming indicator for the given device. In these examples, machine learning models, such as a temporal clustering model, may be utilized to determine device clusters and determine when to associate a given device with a device cluster. The model may receive, as input, state-change data indicating a time and/or day that a device changes state, such as from an on state to an off state. The model may also, in examples, receive location data indicating a location of devices, such as with respect to a home. The model may also, in examples, receive naming data indicating the friendly names of the devices. The state-change data may be utilized to generate a vector and/or other indicator of the time and/or day of the state change. The vectors for the various devices may be analyzed with respect to each other such that vectors that are closer to each other may be determined to have similar state change times. Vectors that are within a threshold distance of each other may be clustered and the friendly names associated with those vectors may be analyzed to determine similarities. For example, the model may identify a group of devices that represent a device cluster. Those devices, or an appreciable number of them, may have friendly names that include the words "study" or "office." In these examples, the model may determine that the devices associated with the device cluster are associated with a location of "office." The state-change data for a given device may be input into the model, which may determine that the given device is also associated with the device cluster. In these examples, the system may determine that the given device should be associated with and/or tagged with the term "office" for naming indicator generation.

The models described herein may utilize predictive analytic techniques, machine learning, and/or data mining, for example. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the models and/or components describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning.

Information from stored and/or accessible data may be extracted from one or more databases and may be utilized to predict trends and behavior patterns. The predictive analytic techniques may be utilized to determine associations and/or relationships between explanatory variables and predicted variables from past occurrences and utilizing these variables to predict an unknown outcome, such as association of a naming indicator to a device. The predictive analytic techniques may include defining the outcome and data sets used to predict the outcome. Then, data may be collected and/or accessed to be used for analysis.

Data analysis may include using one or more models, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models. Thereafter, predictive modelling may be performed to generate accurate predictive models for future events. Outcome prediction may be deterministic such that the outcome is determined to occur or not occur. Additionally, or alternatively, the outcome prediction may be probabilistic such that the outcome is determined to occur to a certain probability and/or confidence.

The speaker-identification component 144 may be configured to identify a speaker identifier associated with the user providing a given user utterance. For example, the system 106 may store reference voice signatures and/or reference audio data in association with speaker identifier, which may indicate an identity of a given user of the voice-enabled device 102. The speaker-identification component 144 may receive the audio data representing a user utterance and may analyze the audio data with respect to the voice signatures and/or the reference audio data to determine which voice signature and/or reference audio data is most similar to the sample audio data. The speaker-identification component 144 may select a speaker identifier based at least in part on this analysis. The speaker identifier may be utilized by the naming component 142 to determine a naming indicator. For example, if the speaker-identification component 144 determines that audio data including the phrase "turn on my light" is associated with the voice signature corresponding to the speaker identifier of "Rob," then the naming component 142 may utilize that information to generate a naming indicator of "Rob's light" for the accessory device.

Having generated one or more naming indicators for one or more of the accessory devices 104, components of the smart-home system 136, for example, may utilize the naming indicators as described herein. For example, the target-inference component 154 may utilize the naming indicators to perform device arbitration.

For example, the target-inference component 154 may utilize the naming indicators as generated by the naming component 142 to determine which accessory device 104 should be acted upon. Utilizing the example provided above of a user utterance including "David's bedroom Brand X light," the target-inference component 154 may determine that the user who provided the user utterance is associated with a particular name identifier, such as "David." The target-inference component 154 may utilize the naming indicators to determine which friendly names are associated with the name "David." Additionally, or alternatively, the target-inference component 154 may utilize the naming indicators to determine which friendly names include the location indicator of "bedroom" and which friendly names include the device-type indicator of "light." In this example, the target-inference component 154 may determine that the accessory device 104 with the friendly name "David's bedroom Brand X light" is the target accessory device. In other examples, the contextual data may indicate that, at a time and/or day at which the audio data representing the user utterance was received by the system 106, the "David's bedroom Brand X light" accessory device is typically activated. This information may be utilized to select the "David's bedroom Brand X light" accessory device as the target accessory device. In still other examples where friendly names of accessory devices associated with the voice-enabled device do not include "bedroom light," the naming indicators generated based at least in part on the contextual data may indicate that a given accessory device is likely a "bedroom light" based at least in part on usage patterns associated with that accessory device.

Additionally, or alternatively, the query component 156 and/or the recommendation component 158 may utilize the naming indicator generated for accessory devices 104 when communicating with a user. For example, the query component 156 may generate a query to be sent to the voice-enabled device 102 for audible output via one or more speakers of the voice-enabled device. The query may include a request for information, such as in response to a user utterance requesting an action to be performed. The recommendation component 158 may generate a recommendation, which may also be described as a "hunch," that may include an indication that, for example, an accessory device 104 is in a state that the system 106 has determined to differ from a state the accessory device 104 is historically operating at a given time and/or on a given day. The recommendation may include an indication that the user should request an action to be performed in association with an accessory device 104 based at least in part on contextual data associated with the accessory device 104. In these and other examples, the system 106 may generate output data and send that output data to the voice-enabled device 102, which may output corresponding audio. As such, identification of the accessory device 104 referenced in the out data may be helpful. It should be understood that where output data is described herein, the output data may include audio data, text data, and/or any other type of data that a machine can use to convey information to a user. For example, the output data may also include machine-readable binary that may not directly represent human-readable text data and/or audio data. It should also be understood that when text data including the naming indicators and/or audio data including the naming indicators as described herein are generated, the text data and/or the audio data may be described as output data.

In these examples, generation of the output data may be performed by the TTS component 150 of the speech-processing system 134, and may include utilizing the naming indicator for the accessory device 104 as generated by the naming component 142 based at least in part on the tag data and/or contextual data and incorporating the naming indicator in the audio data as the identifier of the accessory device 104. Additionally, with respect to portions of the output data other than the identifier of the accessory device 104, the naming indicator may be utilized to inform generation of those portions by the TTS component 150. For example, if a naming indicator of "kitchen lights" is determined for the accessory devices 104 to be acted upon, the query component 156, the recommendation component 158, and/or the TTS component 150 may determine that the naming indicator includes an indication of plural accessory devices and may generate the remaining output data based at least in part on that determination. For example, the TTS component 150 may generate output data corresponding to "the kitchen lights are on" instead of "the kitchen lights is on." The output data may be sent to the voice-enabled device 102, which may output corresponding audio via speakers of the voice-enabled device 102.

It should be noted that while text data is described as a type of data utilized to communicate between various components of the system 106 and/or other systems and/or devices, the components of the system 106 may use any suitable format of data to communicate. For example, the data may be in a human-readable format, such as text data formatted as XML, SSML, and/or other markup language, or in a computer-readable format, such as binary, hexadecimal, etc., which may be converted to text data for display by one or more devices such as the voice-enabled device 102.

As shown in FIG. 1, several of the components of the system 106 and the associated functionality of those components as described herein may be performed by one or more of the voice-enabled device 102 and/or the personal device 104. Additionally, or alternatively, some or all of the components and/or functionalities associated with the voice-enabled device 102 and/or the personal device 104 may be performed by the system 106.

It should be noted that the exchange of data and/or information as described herein may be performed only in situations where a user has provided consent for the exchange of such information. For example, upon setup of devices and/or initiation of applications and/or skills, a user may be provided with the opportunity to opt in and/or opt out of data exchanges between devices and/or with the system and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed only in situations where a user has provided consent for performance of the operations.

As used herein, a processor, such as processor(s) 110, 122, and/or the processor(s) described with respect to the components of the system 106, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 110, 122, and/or the processor(s) described with respect to the components of the system 106 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 110, 122, and/or the processor(s) described with respect to the components of the system 106 may possess its own local memory, which also may store program components, program data, and/or one or more operating systems.

The memory 114, 126, and/or the memory described with respect to the components of the system 106 may include volatile and nonvolatile memory, removable and non-removable media implemented in any method or technology for storage of information, such as computer-readable instructions, data structures, program component, or other data. Such memory 114, 126, and/or the memory described with respect to the components of the system 106 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 114, 126, and/or the memory described with respect to the components of the system 106 may be implemented as computer-readable storage media ("CRSM"), which may be any available physical media accessible by the processor(s) 110, 122, and/or the processor(s) described with respect to the system 106 to execute instructions stored on the memory 114, 126, and/or the memory described with respect to the components of the system 106. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 114, 126, and/or the memory described with respect to the components of the system 106, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

The network interface(s) 112, 124, and/or the network interface(s) described with respect to the components of the system 106 may enable messages between the components and/or devices shown in system 100 and/or with one or more other systems, as well as other networked devices. Such network interface(s) 112, 124, and/or the network interface(s) described with respect to the components of the system 106 may include one or more network interface controllers (NICs) or other types of transceiver devices to send and receive messages over the network 108.

For instance, each of the network interface(s) 112, 124, and/or the network interface(s) described with respect to the components of the system 106 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 112, 124, and/or the network interface(s) described with respect to the components of the system 106 may include a wide area network (WAN) component to enable message over a wide area network.

In some instances, the system 106 may be local to an environment associated the voice-enabled device 102 and/or the personal device 104. For instance, the system 106 may be located within one or more of the voice-enabled device 102 and/or the personal device 104. In some instances, some or all of the functionality of the system 106 may be performed by one or more of the voice-enabled device 102 and/or the personal device 104. Also, while various components of the system 106 have been labeled and named in this disclosure and each component has been described as being configured to cause the processor(s) to perform certain operations, it should be understood that the described operations may be performed by some or all of the components and/or other components not specifically illustrated.

Figure 2:
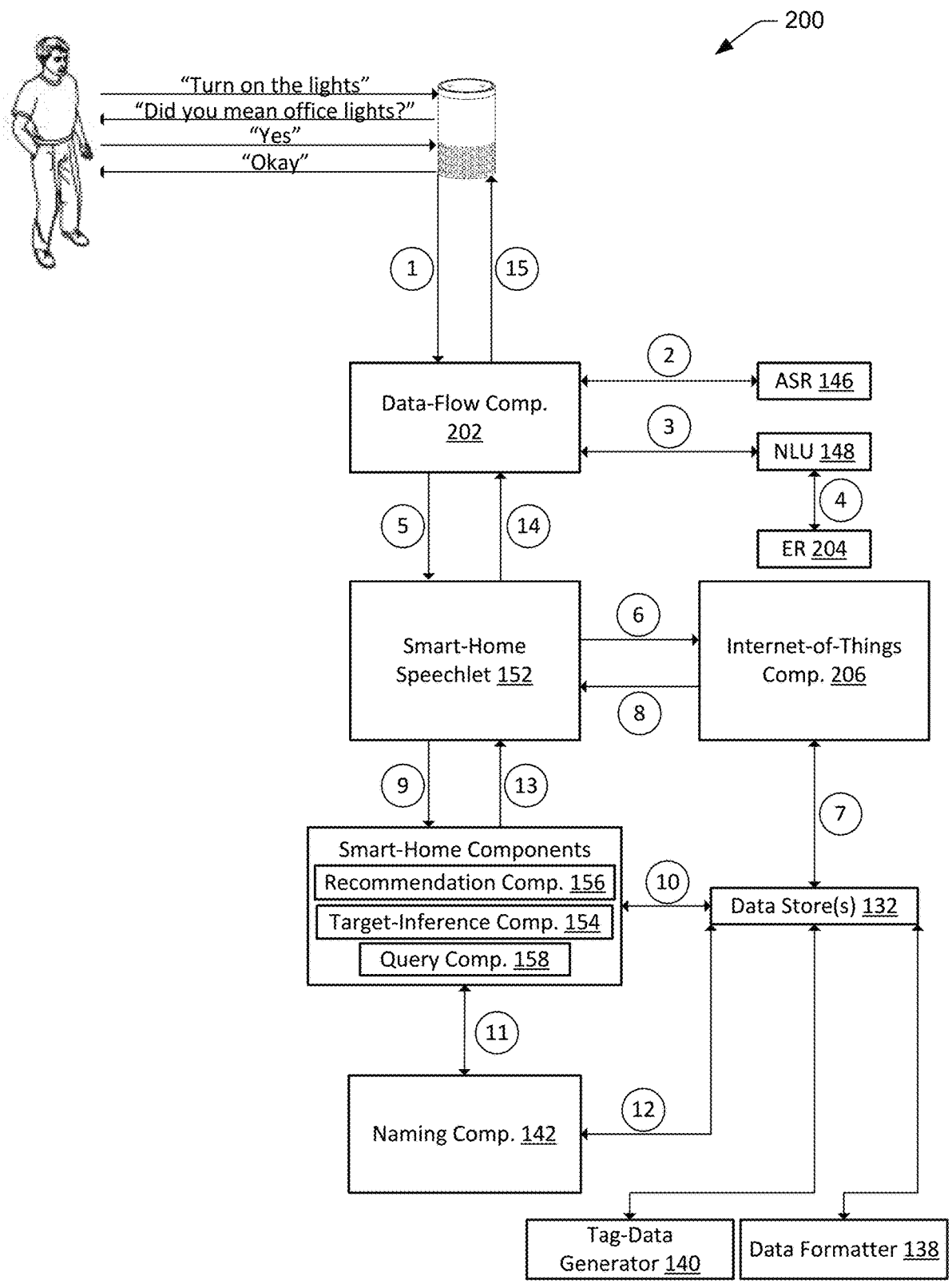
FIG. 2 illustrates a conceptual diagram of example components of a system for device naming-indicator generation.

FIG. 2 illustrates a conceptual diagram of example components of a system 200 for utilizing device naming indicators generated as described herein. The example provided in FIG. 2 shows a user interacting with a voice-enabled device 102 and the flow of data and/or operations between the voice-enabled device 102 and example components of the system 106. This example is provided using a number of steps, from 1 to 15, but it should be understood that the process may include additional and/or different steps as described elsewhere herein. Additionally, while the steps are numbered in chronological order, the steps need not be performed in that order but are instead provided as an example order with respect to FIG. 2.

For example, a user may speak a user utterance such as "turn on the lights," and audio corresponding to the user utterance may be captured by microphones of the voice-enabled device 102. Audio data corresponding to the audio may be generated and may, at step 1, be sent to the system 106. In examples, the audio data may be received by a data-flow component 202, which may be configured to send the audio data and/or other data such as device identifiers, timing data, state data, etc. to other components of the system 106 and/or third-party systems. At step 2, the data-flow component 202 may cause the audio data to be sent to an ASR component 146, which may generate text data corresponding to the audio data. Here, the text data may be the phrase "turn on the lights." The ASR component 146 may return the text data to the data-flow component 202, which may cause the text data to be sent to an NLU component 148 at step 3. The NLU component 156 may generate intent data based at least in part on the text data. Here, the intent data may include a determination of a "turn on" intent as well as a payload and/or device identifier of "the lights." In examples, at step 4, the NLU component 148 may send the intent data or a portion thereof to an entity recognition (ER) component 204, which may be utilized to identify portions of query text that correspond to a named entity that may be recognizable by the system. A process called named entity resolution may link a text portion to a specific entity known to the system. The NLU component 148 may return the intent data to the data-flow component 202.

In examples, given the intent data indicated that the user utterance is associated with a "turn on" intent, the NLU component 148 and/or the data-flow component 202 may determine one or more speechlets that are configured to perform operations associated with a "turn on" or similar intent. In this example, the "turn on" intent may be associated with a smart-home speechlet 152, which may be configured to process requests to control operation of accessory devices, such as smart devices, via the voice-enabled device 102. As such, at step 5, the data-flow component 202 may send the intent data and/or a portion thereof to the smart-home speechlet 152 for further processing.

At step 6, the smart-home speechlet 152 may request naming indicator information from an internet-of-things component 206. By way of example, the smart-home speechlet 152, having received the intent data, may determine that a command or instruction to "turn on" an accessory device is desired, but the smart-home speechlet 152 may also determine which accessory device associated with the voice-enabled device should be turned on. To make this determination, the smart-home speechlet 152 may provide the payload of "the lights" to the internet-of-things component 206. At step 7, the internet-of-things component 206 may query one or more data stores 132 and/or user registries 130 to identify naming indicators of accessory devices that are associated with the voice-enabled device 102. For example, the voice-enabled device 102 may be associated with a user account, which may store information indicating the accessory devices that the voice-enabled device 102 has been configured to control. For example, the accessory devices may include a light with the naming indicator of "office light 1" and another light with the naming indicator of "office light 2." The internet-of-things component 206 may receive data representing the naming indicators of the accessory devices and may attempt to determine which of the naming indicators corresponds to the payload, here "the lights." In this example, both "office light 1" and "office light 2" may correspond to "the lights," and as such, the internet-of-things component 206, at step 8, may return a response to the smart-home speechlet 152 indicating that an accessory device was not found or multiple accessory devices were found for the identifier "the lights."

At step 9, based at least in part on receiving the indication that the internet-of-things component 206 could not determine which accessory device naming indicators correspond to the identifier, the smart-home speechlet 152 may send a request for target-device resolution to a target-inference component 154. The smart-home speechlet 152 may also send data indicating the device identifier for the voice-enabled device 102 and/or the payload representing the identifier of the target accessory device. At this point, it should be noted that steps 6-8 may not be performed and instead, upon receiving the intent data at step 5, the smart-home speechlet 152 may request target-device resolution from the target-inference component 154 without waiting for the internet-of-things component 206 to return results. Alternatively, the processes described with respect to steps 6-8 may be performed in parallel with steps 9-12.

At step 10, the target-inference component 154 may query the data store(s) 132 and/or the user registries 130 for data to assist in target-device resolution. For example, the data may include naming indicators of the accessory devices associated with the voice-enabled device 102 from which the audio data was received, tag data, formatted text data corresponding to friendly names of accessory devices, device-state data indicating historical activation and deactivation of the accessory devices, utterance data indicating historical operation of the accessory devices by user utterances, prior-request data indicating which accessory devices were activated and/or deactivated recently, device-affinity data indicating frequencies at which accessory devices are controlled by voice-enabled devices, current device state indicating the state of accessory devices at or near the time the audio data is received, and/or the audio data received from the voice-enabled device 102. In examples, the data store(s) 132 may store the tag data generated by the tag-data generator 140 and/or the formatted text data from the data formatter 138. The target-inference component 154 may utilize the tag data, the formatted text data, and/or the contextual data to determine which accessory device associated with the voice-enabled device should be selected as the target device or target devices.

In examples, at step 11, the target-inference component 154 may, in addition to or instead of receiving data from the data store(s) 132, may request naming indicators for accessory devices from the naming component 142. The naming component 142, at step 12, may access the data in the data store(s) 132 to generate naming indicators for the accessory devices. In examples, generation of the naming indicators may be performed "in flight" to provide the naming component 142 with a temporal context of the request for naming indicators and/or to provide information associated with speaker identification and/or which voice-enabled device generated the audio data representing the user utterance. In other examples, the naming component 142 may have identified, determined, and/or generated the naming indicators, which may be stored in association with the data store(s) 132. In these examples, the target-inference component 154 may not query the naming component 142 for one or more naming indicators, but may instead query the data store(s) 132 for the naming indicators.

Utilizing the example provided above, the target-inference component 154 may determine, at step 13, that the naming indicator of "office lights," which corresponds to accessory devices with the friendly names of "office light 1" and "office light 2," corresponds to "the lights" from the user utterance.

The smart-home speechlet 152, now having identified the "turn on" intent and having received the naming indicator for the accessory device to be acted on, here the "office lights," may generate directive data representing a directive for the voice-enabled device 102 and/or other components of the system 106 to perform a directive, such as activation and/or deactivation, on the highest-ranking accessory device. In examples, the smart-home speechlet 152 may send the naming indicator for the accessory device to be acted on to the internet-of-things component 206, which may generate the instruction to perform an action such as activation and/or deactivation of the accessory device. Additionally, or alternatively, the system 106 may generate audio data representing a request for the user of the voice-enabled device 102 to confirm that the identified accessory device is the device the user intended for the system to act upon. In examples, the smart-home speechlet 152 and/or one or more other components of the system may generate text data representing a response to the user utterance. The text data may be generated based at least in part on the naming indicator identified by the target-inference component 154. The text data may be utilized by a TTS component to generate audio data to be output by the voice-enabled device 102. In some examples the TTS component that generates audio data may be a component of the system. In other examples, the TTS component that generates audio data may be a component of another system, and in these examples, the system may send the text data to the other system and receive the corresponding audio data back from the other system.

At step 14, the smart-home speechlet 152 may send the directive data and/or audio data to the data-flow component 202, which may, at step 15, send the directive data and/or the audio data to the voice-enabled device 102. In the example shown with respect to FIG. 2, the directive data represents a directive to output the audio "did you mean office lights?" via speakers of the voice-enabled device 102. The user may speak a response, here "yes," which may be captured by the microphones of the voice-enabled device 102, and corresponding audio data may be generated and sent to the system 106. Having received confirmation that the "office lights" are to be "turned on," the system 106 may send directive data to the voice-enabled device 102 directing it to cause the accessory devices associated with the naming indicator of "office lights" to activate. Audio may be output by the speakers of the voice-enabled device 102 to confirm that the action has been taken, such as "okay."

In addition to the target-inference operations described herein, the recommendation component 156 and/or the query component 158 may receive naming indicators from the naming component 142, such as described more fully herein. The naming indicators may be utilized to generate audio data representing a recommendation and/or a query in response to a user utterance.

Figure 3:
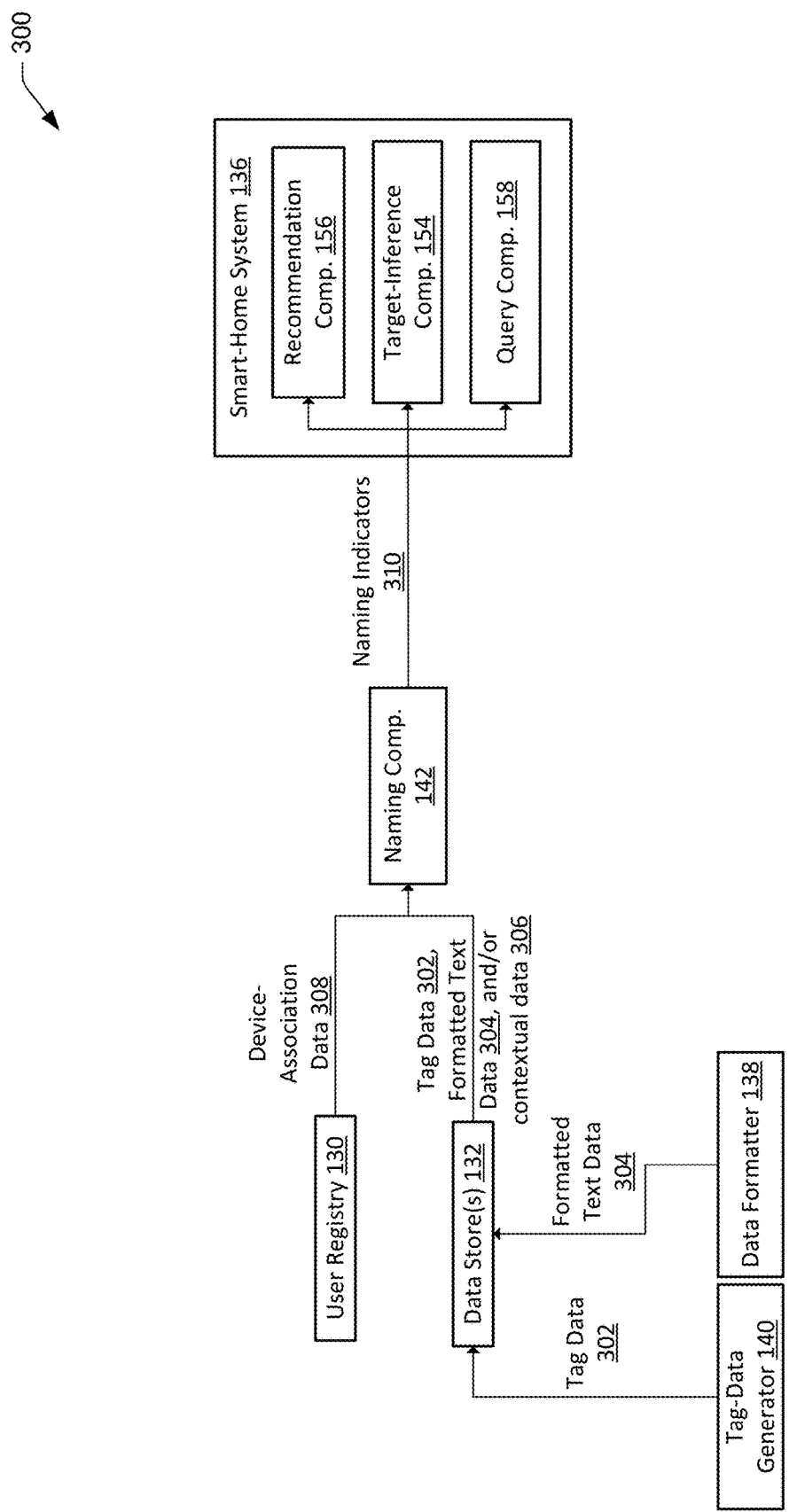
FIG. 3 illustrates a conceptual diagram of examples components of a system for device naming-indicator generation showing the flow of data between components.

FIG. 3 illustrates a conceptual diagram of examples components of a system for device naming-indicator generation showing the flow of data between components. The system 300 may include one or more components similar to the components described with respect to FIG. 1, such as a user registry 130, one or more data stores 132, and/or a smart-home system 136. The smart-home system 136 may include components such as a a recommendation component 156, a target-inference component 154, and/or a query component 158. FIG. 3 also shows the flow of data from components associated with the system 300.

For example, the data formatter 138 may be configured to format data representing friendly names of accessory devices. In examples, the friendly names may be stored in an irregularly-parsed manner such that the text data representing the friendly names does not indicate and/or omits capitalization and/or punctuation. The data formatter 138 may be configured to format the text data representing the friendly name to indicate capitalization and/or punctuation. For example, the text data may be analyzed in association with a naming list indicating common names. The portions of the text data that correspond to a name in the naming list may be determined to be names and the first letter of that portion of the text data may be capitalized. Additionally, or alternatively, a brand list indicating common brands of accessory devices may be analyzed in association with the text data to determine portions of the text data corresponding to a brand name. Text data indicating a capitalized letter may be considered a proper noun such as a name and/or brand. Formatting of the text data may also include determining that a proper noun ends in an "s" and indicates possession of the next word in the text data. In these examples, appropriate punctuation, such as an apostrophe may be included in the text data at the end of the proper noun and before the "s." In this way, formatted text data 302 representing a friendly name may be generated and utilized for further processing as described herein. The formatted text data 302 may be stored in association with the data store(s) 132.

The tag-data generator 140 may be configured to generate tag data 304 for a given friendly name. The tag data 304 may indicate device location, device type, device brand, device name, a quantifier, one or more setting values, and/or placeholder tags for unknown words not yet associated with the friendly name, for example. For example, for a given proper noun that was determined to be a name during formatting, the tag data 304 may indicate that the friendly name includes a person name and may indicate the specific name. Additionally, given that a particular brand name was identified during formatting of the text data, the tag data 304 may indicate that the friendly name includes the brand name and may indicate the specific brand name.

Additionally, the formatted text data 302 may be analyzed in association with a location list that may indicate common names of locations, such as spaces within a home. For example, particular formatted text data 302 may be analyzed with respect to the location list to determine that a portion of formatted text data 302 corresponds to a location. The tag data 304 may indicate that the friendly name includes a location indicator and may indicate the specific location. Additionally, the formatted text data 302 may be analyzed in association with a device-type list that may indicate common device types, such as plugs, lights, switches, lamps, light bulbs, locks, thermostats, cameras, displays, etc. The tag data 304 may indicate that the friendly name includes a device-type indicator and may indicate the specific device type. Additionally, the tag data 304 may indicate whether the formatted text data 302 corresponds to multiple accessory devices and/or a group of accessory device, or if the formatted text data 302 corresponds to a single accessory device. The tag data 304 may be stored in association with, for example, the data store(s) 132 associated with the system.

In addition to, or instead of, the formatted text data 302 and/or the tag data 304 as described above, contextual data 306 associated with accessory devices and/or voice-enabled devices may be received, identified, determined, and/or generated and stored in association with the data store(s) 132. The contextual data 306 may include, for example, indications of historical usage of accessory devices. For example, the contextual data may indicate, for a given accessory device, times and/or days that a state change occurred for a given accessory device, such as when the accessory device was turned on and/or turned off. The contextual data 306 may also include a user identifier associated with a given interaction with a voice-enabled device. The user identifier may indicate which user provided the user utterance. The contextual data 306 may be utilized by the system, for example, to temporally cluster devices based on state changes and/or usage information. For example, a given accessory device may be associated with a usage pattern that is similar to a group and/or cluster of other accessory devices having friendly names that include "bedroom light." In these examples, the given accessory device may be determined to be a "bedroom light," such as in examples where a friendly name has not been assigned to the given accessory device.

The user registry 130 may store device-association data 308, which may indicate which accessory devices are associated with a given voice-enabled device. The device-association data 308 may also indicate the friendly names associated with accessory devices. The device-association data 308 may also indicate which voice signatures are and/or reference audio data is associated with a voice-enabled device.

The formatted text data 302, the tag data 304, the contextual data 306, and/or the device-association data 308 may be utilized by the naming component 142 to identify, determine, and/or generate naming indicators 310. For example, the friendly name for an accessory device may be "Rob's device." However, the naming component 142, utilizing the data described herein, may be configured to generate one or more naming indicators 310 for the accessory device other than Rob's device. For example, the tag data 304 may indicate that the accessory device is located in a kitchen, and the naming component 142 may utilize this information to generate a naming indicator 310 of "kitchen device." Additionally, or alternatively, the tag data 304 may indicate that the accessory device is a "light," and the naming component 142 may utilize this information to generate a naming indicator 310 for "Rob's light." Additionally, or alternatively, the tag data 304 may indicate that the accessory device is associated with a particular brand, such as Brand X, and the naming component 142 may utilize this information to generate a naming indicator 310 of "Rob's Brand X device." In further examples, the naming component 142 may utilize the contextual data 306, particularly the usage history and temporal clustering as described herein, to determine that the device is likely a "porch light," and the naming component 142 may generate a naming indicator 310 of "Rob's porch light." The system may also determine an identity of a user that provided a given user utterance, such as via the operations described elsewhere herein, and the speaker identifier associated with the user may be utilized by the naming component 142 to determine a naming indicator 310. For example, if the system determines that audio data including the phrase "turn on my light" is associated with the voice signature corresponding to the speaker identifier of "Rob," then the naming component 142 may utilize that information to generate a naming indicator 310 of "Rob's light" for the accessory device.

Having generated one or more naming indicators 310 for one or more of the accessory devices, components of the smart-home system 136, for example, may utilize the naming indicators 310 as described herein. For example, the target-inference component 154 may utilize the naming indicators to perform device arbitration.

For example, the target-inference component 154 may utilize the naming indicators 310 as generated by the naming component 142 to determine which accessory device should be acted upon. Additionally, or alternatively, the query component 156 and/or the recommendation component 158 may utilize the naming indicator generated for accessory devices when communicating with a user. For example, the query component 156 may generate a query to be sent to the voice-enabled device for audible output via one or more speakers of the voice-enabled device. The query may include a request for information, such as in response to a user utterance requesting an action to be performed. The recommendation component 158 may generate a recommendation that may include an indication that, for example, an accessory device is in a state that the system has determined to differ from a state the accessory device is historically operating at a given time and/or on a given day. The recommendation may include an indication that the user should request an action to be performed in association with an accessory device based at least in part on the contextual data 306 associated with the accessory device. In these and other examples, the system may generate audio data and send that audio data to the voice-enabled device, which may output corresponding audio.

Figure 4:
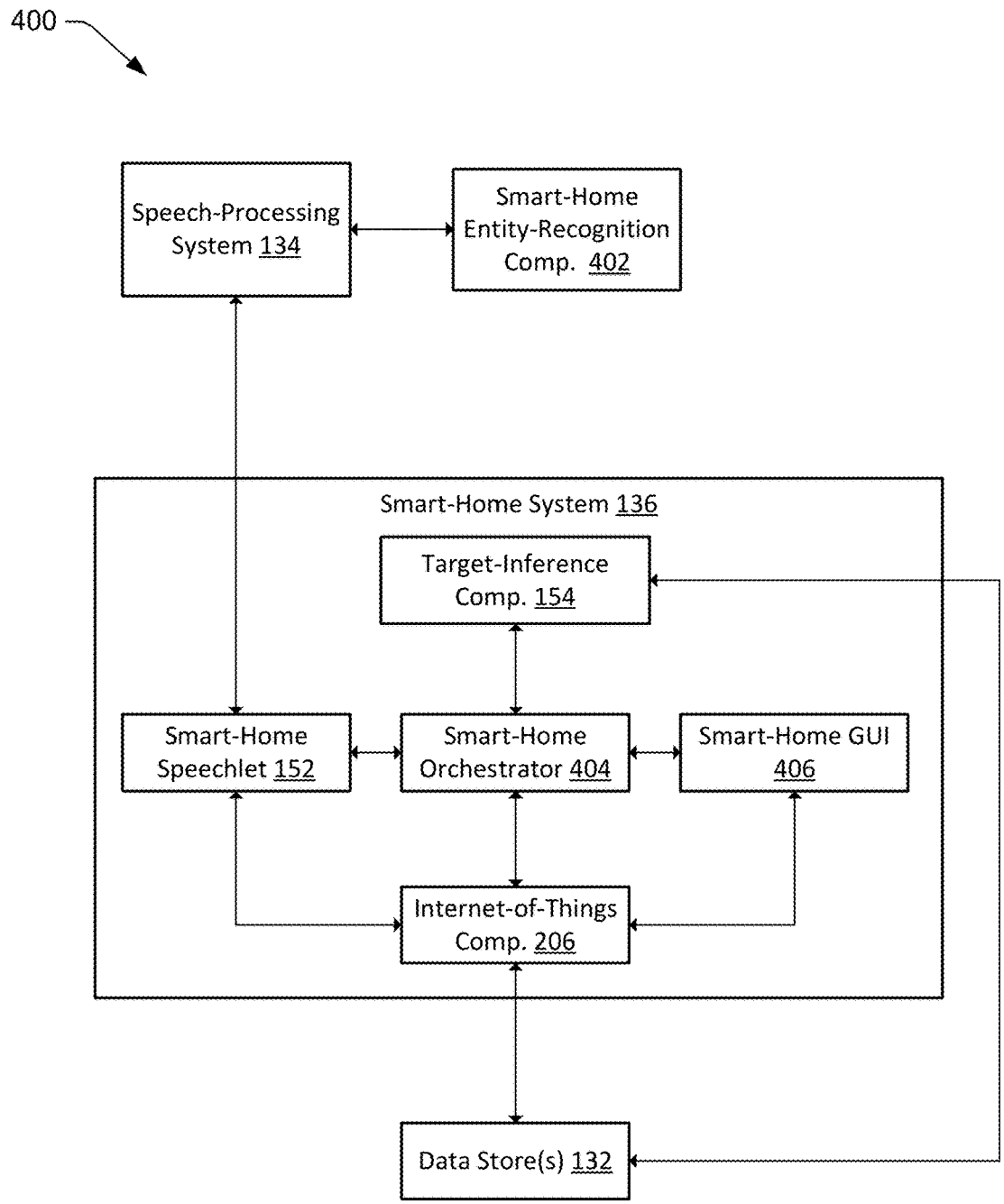
FIG. 4 illustrates a conceptual diagram of example components of a smart-home system.

FIG. 4 illustrates a conceptual diagram of example components of a smart-home system 400. The smart-home system 136 may include components described above with respect to FIG. 1, such as a smart-home speechlet 152, a target-inference component 154, a query component 156, and/or a recommendation component 158. The smart-home system 136 may also be configured to send data to and receive data from other components of a system and/or one or more other systems. For example, the other components may include a speech-processing system 134 and one or more data stores 132. The smart-home system 136 may also include components such as a smart-home orchestrator 404, a smart-home graphical user interface (GUI) 406, and/or an internet-of-things component 206. Each of these components will be described in detail below.

As described herein, a user may interact with an accessory device using tactile input to the accessory device, voice input to a voice-enabled device, and/or input to an application residing on and/or accessible to a personal device.

When a user interacts with an accessory device using voice input to a voice-enabled device, audio data representing user utterances may be received at the speech-processing system 134. The speech-processing system 134 may analyze the audio data and/or corresponding text data generated, by way of example, using an ASR component, to determine that the user utterance represents an intent to control an accessory device. To determine the intent associated with the user utterance, the speech-processing system 134 may utilize a smart-home entity-recognition component 402, which may be utilized to inform one or more intents available to the speech-processing system 134 and/or to inform one or more values associated with the intents. For example, the user utterance of "turn off bedroom lights" may be analyzed by the speech-processing system 134. The smart-home entity-recognition component 402 may train or otherwise provide data to the speech-processing system 134 indicating intents associated with operation of accessory devices, such as "turn on," "turn off," "activate," "deactivate," "dim," "brighten," "lock," "unlock," etc. The smart-home entity-recognition component 402 may additionally, or alternatively, provide data indicating identifiers and/or payloads associated with such intents, such as "light," "lights," "lock," "outlet," "switch," etc. It should be understood that while the smart-home entity-recognition component 402 is depicted in FIG. 4 as being a component separate from the smart-home system 136, the smart-home entity-recognition component 402 may be a component of the smart-home system 136.

The speech-processing system 134 may be configured to determine that the intent corresponds to an operation configured to be performed by the smart-home system 134, and based at least in part on such a determination, the speech-processing system 134 may provide the intent data and/or other data associated with the request to the smart-home speechlet 152 of the smart-home system 136. The smart-home orchestrator 404 may be configured to receive data indicating that the smart-home speechlet 152 has been invoked to determine a directive to be performed with respect to an accessory device and may query one or more other components of the smart-home system 136 to effectuate the request. For example, the smart-home orchestrator 404 may query the internet-of-things component 206 to identify naming indicators associated with accessory devices for a particular user account. The internet-of-things component 206 may query the data store(s) 132 and/or the user account for such naming indicators. Additionally, or alternatively, as described more fully herein, a naming component may provide naming indicators to the internet-of-things component 206. The internet-of-things component 206 may return the naming indicators to the smart-home speechlet 152, which may identify which naming indicator corresponds to the identified target device from the user utterance.

In other examples, such as when the smart-home speechlet 152 and/or the internet-of-things component 206 cannot determine which accessory device corresponds to the identified target device, the smart-home orchestrator 404 may query the target-inference component 154 to perform target-device resolution as described herein. For example, the target-inference component 154 may utilize one or more models and/or data as described herein to generate output data representing a ranked list of accessory devices. This information may be utilized to select the highest-ranking accessory device as the identified target device from the user utterance. In addition to and/or instead of the target-inference component 154, the query component 156 and/or the recommendation component 158 may utilize the naming indicators as described herein to generate queries and/or recommendations that identify accessory devices by the naming indicators.

Additionally, or alternatively, as mentioned above, the accessory devices may be operated based at least in part on input data received from an application residing on and/or accessible to a personal device, such as a mobile phone and/or computer. The smart-home GUI 406 may be utilized to receive the input data and/or to display recommendations and/or requests to a user. For example, the smart-home GUI 406 may be utilized to display a request to confirm that a selected accessory device is the desired device to be acted upon.

Figure 5:
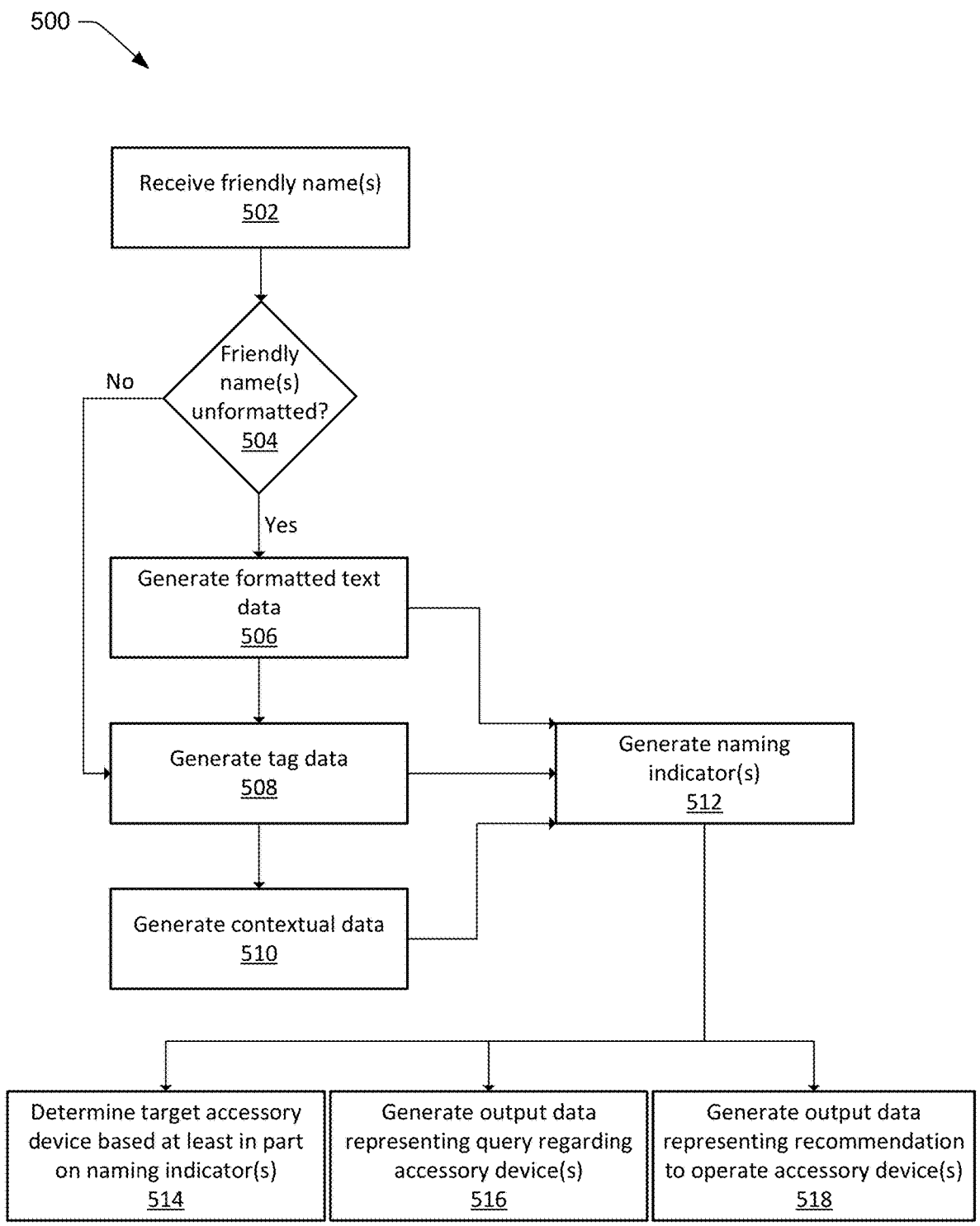
FIG. 5 illustrates a flow diagram of an example process for device naming-indicator generation.
Figure 6:
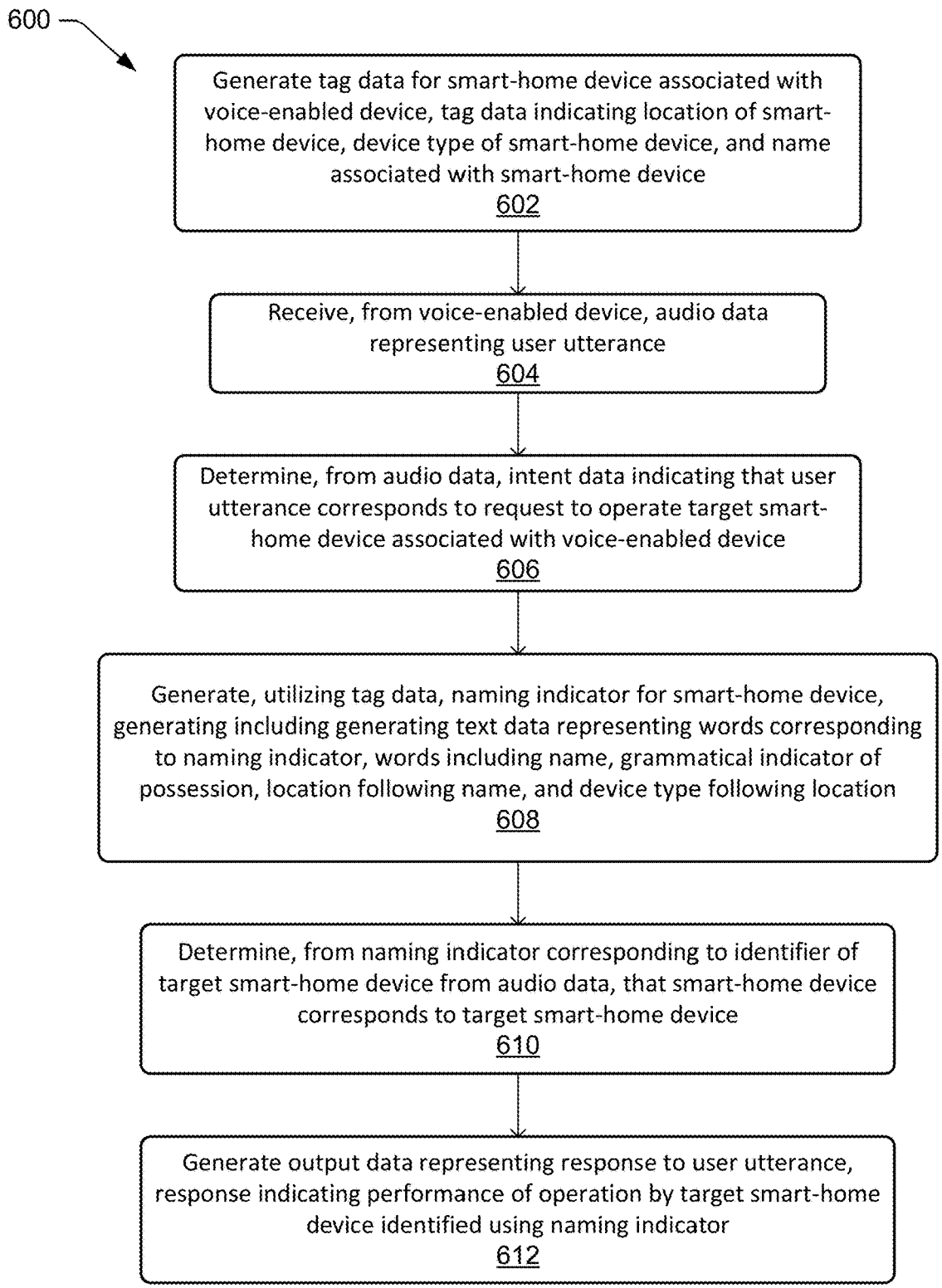
FIG. 6 illustrates a flow diagram of another example process for device naming-indicator generation.
Figure 7:
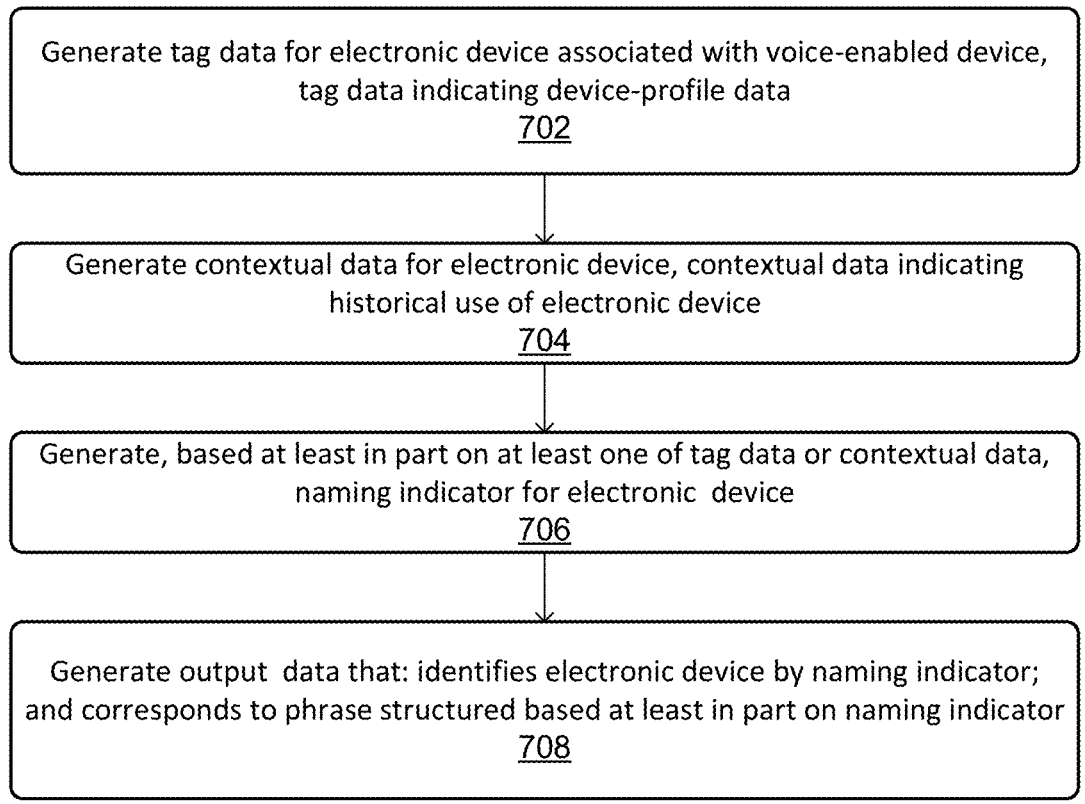
FIG. 7 illustrates a flow diagram of another example process for device naming-indicator generation.

FIGS. 5-7 illustrate processes for device naming-indicator generation. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-4, 8, and 9, although the processes may be implemented in a wide variety of other environments, architectures and systems.

FIG. 5 illustrates a flow diagram of an example process 500 for device naming-indicator generation. The order in which the operations or steps are described is not intended to be construed as a limitation, and any number of the described operations may be combined in any order and/or in parallel to implement process 500.

At block 502, the process 500 may include receiving one or more friendly names corresponding to one or more accessory devices. For example, during an out-of-the-box experience, during setup of an accessory device, or at some point after setup, a user may assign the device a friendly name. For example, the user may assign a smart light bulb by typing the naming indicator "Rob's Light," or "Kitchen Light," or "Brand X Light," for example. Assignment of friendly names may be performed utilizing an application residing on and/or accessible to a mobile device and/or utilizing the voice-enabled devices described herein. In these and other examples, numerous accessory devices in numerous spaces in an environment may each be assigned a friendly name. In other examples, friendly names may be considered default names associated with accessory devices that are assigned by the manufacturer and/or seller of the accessory device, such as "Brand X 13579 Light."

At block 504, the process 500 may include determining whether one or more of the friendly names are unformatted. If at least one friendly name is unformatted, then the process 500 may include, at block 506, generating formatted text data based at least in part on the unformatted friendly name(s). In examples, the friendly names may be stored in an irregularly-parsed manner such that the text data representing the friendly names does not indicate and/or omits capitalization and/or punctuation. For example, the friendly name "David's bedroom Brand X light" may be stored as "davids bedroom brand x light." In these examples, identifying and/or parsing the friendly name for purposes of determining its components may be difficult. As such, the system may format the text data representing the friendly name to indicate capitalization and/or punctuation. For example, the text data may be analyzed in association with a naming list indicating common names. The portions of the text data that correspond to a name in the naming list may be determined to be names and the first letter of that portion of the text data may be capitalized. Additionally, or alternatively, a brand list indicating common brands of accessory devices may be analyzed in association with the text data to determine portions of the text data corresponding to a brand name. Text data indicating a capitalized letter may be considered a proper noun such as a name and/or brand. Formatting of the text data may also include determining that a proper noun ends in an "s" and indicates possession of the next word in the text data. For example, for the friendly name "David's bedroom Brand X light," the "s" at the end of the proper noun "David" may indicate that the "bedroom Brand X light" is possessed by "David." In these examples, appropriate punctuation, such as an apostrophe may be included in the text data such that the formatted friendly name is "David's bedroom Brand X light."

If the friendly names are formatted such that text data corresponding to the friendly names indicates capitalization and/or punctuation, and/or once the formatted text data is generated at block 506, then the process 500 may include, at block 508, generating tag data based at least in part on the formatted text data. For example, the tag data may indicate device location, device type, device brand, device name, a quantifier, one or more setting values, and/or placeholder tags for unknown words not yet associated with the friendly name. Using the example provided herein, the system may generate tag data associated with the friendly name "David's bedroom Brand X light." In this example, given that "David" was determined to be a name during formatting, the tag data may indicate that the friendly name includes a person name and may indicate that the person name is "David." Additionally, given that "Brand X" was determined to be a brand name during formatting, the tag data may indicate that the friendly name includes a brand name and may indicate that the brand name is "Brand X."

Additionally, the formatted text data may be analyzed in association with a location list that may indicate common names of locations, such as spaces within a home. For example, the text data "David's bedroom Brand X light" may be analyzed with respect to the location list to determine that "bedroom" is a location. The tag data may indicate that the friendly name includes a location indicator and may indicate that the location is "bedroom." Additionally, the formatted text data may be analyzed in association with a device-type list that may indicate common device types, such as plugs, lights, switches, lamps, light bulbs, locks, thermostats, cameras, displays, etc. For example, the text data "David's bedroom Brand X light" may be analyzed with respect to the device-type list to determine that "light" is a device type. The tag data may indicate that the friendly name includes a device-type indicator and may indicate that the device type is "light." Additionally, given that the word "light" from the text data is singular, as opposed to "lights," tag data may be generated indicating that the friendly name corresponds to a single accessory device as opposed to multiple lights and/or a group of lights.

At block 510, the process 500 may include generating contextual data associated with accessory devices. The contextual data may include, for example, indications of historical usage of accessory devices. For example, the contextual data may indicate, for a given accessory device, times and/or days that a state change occurred for the accessory device, such as when the accessory device was turned on and/or turned off. The contextual data may also include a user identifier associated with a given interaction with a voice-enabled device. The user identifier may indicate which user provided the user utterance. The contextual data may be utilized by the system, for example, to temporally cluster devices based on state changes and/or usage information. For example, a given accessory device may be associated with a usage pattern that is similar to a group and/or cluster of other accessory devices having friendly names that include "porch light." In these examples, the given accessory device may be determined to be a "porch light," such as in examples where a friendly name has not been assigned to the given accessory device.

At block 512, the process 500 may include generating one or more naming indicators for a given accessory device. A naming component may be configured to identify, determine, and/or generate naming indicators based at least in part on the formatted text data, the tag data, and/or the contextual data, such as described above. For example, the friendly name for an accessory device may be "Rob's device." However, the naming component, utilizing the data described herein, may be configured to generate one or more naming indicators for the accessory device other than Rob's device. For example, the tag data may indicate that the accessory device is located in a kitchen, and the naming component may utilize this information to generate a naming indicator of "kitchen device." Additionally, or alternatively, the tag data may indicate that the accessory device is a "light," and the naming component may utilize this information to generate a naming indicator for "Rob's light." Additionally, or alternatively, the tag data may indicate that the accessory device is associated with a particular brand, such as Brand X, and the naming component may utilize this information to generate a naming indicator of "Rob's Brand X device." In further examples, the naming component may utilize the contextual data, particularly the usage history and temporal clustering as described herein, to determine that the device is likely a "porch light," and the naming component may generate a naming indicator of "Rob's porch light."

At block 514, the process 500 may include determining a target accessory device based at least in part on the one or more naming indicators. For example, a target-inference component of the system may utilize the naming indicators as generated by the naming component to determine which accessory device should be acted upon. Utilizing the example provided above of a user utterance including "David's bedroom Brand X light," the target-inference component may determine that the user who provided the user utterance is associated with a particular name identifier, such as "David." The target-inference component may utilize the naming indicators to determine which friendly names are associated with the name "David." Additionally, or alternatively, the target-inference component may utilize the naming indicators to determine which friendly names include the location indicator of "bedroom" and which friendly names include the device-type indicator of "light." In this example, the target-inference component may determine that the accessory device with the friendly name "David's bedroom Brand X light" is the target accessory device. In other examples, the contextual data may indicate that, at a time and/or day at which the audio data representing the user utterance was received by the system, the "David's bedroom Brand X light" accessory device is typically activated. This information may be utilized to select the "David's bedroom Brand X light" accessory device as the target accessory device. In still other examples where friendly names of accessory devices associated with the voice-enabled device do not include "bedroom light," the naming indicators generated based at least in part on the contextual data may indicate that a given accessory device is likely a "bedroom light" based at least in part on usage patterns associated with that accessory device.

At block 516, the process 500 may include generating output data representing a query regarding one or more of the accessory devices. For example, a query component of the system may utilize the naming indicator generated for accessory devices when communicating with a user. For example, the query component may generate a query to be sent to the voice-enabled device for audible output via one or more speakers of the voice-enabled device. The query may include a request for information, such as in response to a user utterance requesting an action to be performed. The query may include the naming indicator(s) as a means for identifying a corresponding accessory device.

At block 518, the process 500 may include generating output data representing a recommendation to operate one or more of the accessory devices. For example, a recommendation component may generate a recommendation, which may also be described as a "hunch," that may include an indication that, for example, an accessory device is in a state that the system has determined to differ from a state the accessory device is historically in at a given time and/or on a given day. The recommendation may include an indication that the user should request an action to be performed in association with an accessory device based at least in part on contextual data associated with the accessory device. The recommendation may include the naming indicator(s) as a means for identifying a corresponding accessory device.

FIG. 6 illustrates a flow diagram of another example process 600 for device naming-indicator generation. The order in which the operations or steps are described is not intended to be construed as a limitation, and any number of the described operations may be combined in any order and/or in parallel to implement process 600.

At block 602, the process 600 may include generating tag data for a smart-home device associated with a voice-enabled device, the tag data indicating at least one of a location of the smart-home device, a device type of the smart-home device, or a name associated with the smart-home device. For example, tag data may be generated for a given friendly name. The tag data may indicate device location, device type, device brand, device name, a quantifier, one or more setting values, and/or placeholder tags for unknown words not yet associated with the friendly name. In examples, generating the tag data may include generating, from an identifier of the smart-home device, a featurized identifier for the smart-home device. The featurized identifier may indicate attributes associated with the identifier. A tagging model may be generated that is configured to receive the featurized identifier as input and generate, as output, the tag data. In these examples, generating the tag data may be based at least in part on the tagging model and the featurized identifier.

At block 604, the process 600 may include receiving, from the voice-enabled device, audio data representing a user utterance. For example, a user may speak a user utterance and microphones of the voice-enabled device may capture audio corresponding to the user utterance. The voice-enabled device may generate audio data corresponding to the audio and may send the audio data to a system for speech processing, for example.

At block 606, the process 600 may include determining, from the audio data, intent data indicating that the user utterance corresponds to a request to operate a target smart-home device associated with the voice-enabled device. For example, an ASR component of the system may generate text data based at least in part on the audio data received from the voice-enabled device. A NLU component of the system may generate the intent data based at least in part on the text data. By way of example, the user utterance may be "turn on my light." The ASR component may generate text data representing "turn on my light," and the NLU component may generate intent data indicating a "turn on" intent and the smart-home device to turn on may be determined to be "my light."

At block 608, the process 600 may include generating, utilizing the tag data, a naming indicator for the smart-home device. The generating may include generating text data representing words corresponds to the naming indicator, where the words include the name, a grammatical indicator of possession, the location following the name, and/or the device type following the location. A naming component may be configured to identify, determine, and/or generate naming indicators based at least in part on the formatted text data, the tag data, and/or the contextual data, such as described above. For example, the friendly name for an smart-home device may be "Rob's device." However, the naming component, utilizing the data described herein, may be configured to generate one or more naming indicators for the smart-home device other than Rob's device. For example, the tag data may indicate that the smart-home device is located in a kitchen, and the naming component may utilize this information to generate a naming indicator of "kitchen device." Additionally, or alternatively, the tag data may indicate that the smart-home device is a "light," and the naming component may utilize this information to generate a naming indicator for "Rob's light." Additionally, or alternatively, the tag data may indicate that the smart-home device is associated with a particular brand, such as Brand X, and the naming component may utilize this information to generate a naming indicator of "Rob's Brand X device." In further examples, the naming component may utilize contextual data, particularly the usage history and temporal clustering as described herein, to determine that the device is likely a "porch light," and the naming component may generate a naming indicator of "Rob's porch light."

At block 610, the process 600 may include determining, from the naming indicator corresponding to an identifier of the target smart-home device from the audio data, that the smart-home device corresponds to the target smart-home device. For example, a target-inference component of the system may utilize the naming indicators as generated by the naming component to determine which smart-home device should be acted upon. Utilizing the example of a user utterance including "David's bedroom Brand X light," the target-inference component may determine that the user who provided the user utterance is associated with a particular name identifier, such as "David." The target-inference component may utilize the naming indicators to determine which friendly names are associated with the name "David." Additionally, or alternatively, the target-inference component may utilize the naming indicators to determine which friendly names include the location indicator of "bedroom" and which friendly names include the device-type indicator of "light." In this example, the target-inference component may determine that the smart-home device with the friendly name "David's bedroom Brand X light" is the target smart-home device. In other examples, the contextual data may indicate that, at a time and/or day at which the audio data representing the user utterance was received by the system, the "David's bedroom Brand X light" smart-home device is typically activated. This information may be utilized to select the "David's bedroom Brand X light" smart-home device as the target smart-home device. In still other examples where friendly names of smart-home devices associated with the voice-enabled device do not include "bedroom light," the naming indicators generated based at least in part on the contextual data may indicate that a given smart-home device is likely a "bedroom light" based at least in part on usage patterns associated with that smart-home device.

At block 612, the process 600 may include generating output data representing a response to the user utterance, the response indicating performance of an operation by the target smart-home device identified using the naming indicator. The text data may be utilized to generate audio data, such as via a TTS component of the speech-processing system. The naming indicator may be utilized for identifying the smart-home device as generated by the naming component based at least in part on the tag data and/or contextual data and incorporating the naming indicator in the audio data as the identifier of the smart-home device. Additionally, with respect to portions of the audio data other than the identifier of the smart-home device, the naming indicator may be utilized to inform generation of those portions by the TTS component. For example, if a naming indicator of "kitchen lights" is determined for the smart-home devices to be acted upon, the TTS component may determine that the naming indicator includes an indication of plural smart-home devices and may generate the remaining audio data based at least in part on that determination. For example, the TTS component may generate audio data corresponding to "the kitchen lights are on" instead of "the kitchen lights is on." The audio data may be sent to the voice-enabled device, which may output corresponding audio via speakers of the voice-enabled device. By way of further example, the system may identify and/or determine the naming indicator as "Rob's kitchen lights." The TTS component may generate audio data and/or text data that may be utilized to generate audio data to be utilized to output audio by a speaker of the voice-enabled device. The audio may represent a response to a user utterance and/or the audio may represent a query and/or a recommendation, as described more fully above. Depending on the context of the situations where the audio is output, the TTS component may be configured to generate text data that corresponds to the situation. For example, if the audio is to be a response to a user utterance, the text data generated by the TTS component may include wording that represents a response. Using the example above, if a user utterance is "turn on my lights," the TTS component, using the naming indicator identified or determined to be "Rob's kitchen lights" may generate text data that represents a response to the user utterance, such as "Rob's kitchen lights are now on." If a query is to be sent, the text data may represent a query such as "did you mean Rob's kitchen lights?" If a recommendation is to be sent, the text data may represent a recommendation such as "Rob's kitchen lights are on, would you like to turn them off?"

Additionally, or alternatively, the process 600 may include receiving, from a database, contextual data for the smart-home device, the contextual data indicating historical use of the smart-home device. The contextual data may include, for example, indications of historical usage of smart-home devices. For example, the contextual data may indicate, for a given smart-home device, times and/or days that a state change occurred for the smart-home device, such as when the smart-home device was turned on and/or turned off. The contextual data may also include a user identifier associated with a given interaction with a voice-enabled device. The user identifier may indicate which user provided the user utterance. The contextual data may be utilized by the system, for example, to temporally cluster devices based on state changes and/or usage information. For example, a given smart-home device may be associated with a usage pattern that is similar to a group and/or cluster of other smart-home devices having friendly names that include "porch light." In these examples, the given smart-home device may be determined to be a "porch light," such as in examples where a friendly name has not been assigned to the given smart-home device.

Additionally, or alternatively, the process 600 may include receiving an identifier, such as a friendly name, of the smart-home device in a format without capitalization and/or punctuation. The process 600 may also include generating and/or receiving a formatting model configured to identify first portions of the identifier to be capitalized and second portions of the identifier to include punctuation. The process 600 may also include generating, using the formatting model with the identifier as an input, formatted text data corresponding to the identifier, where the formatted text data may indicate a capitalized portion of the identifier and may include punctuation. In these examples, generating the tag data may be based at least in part on the formatted text data.

Additionally, or alternatively, the process 600 may include determining, based at least in part on the tag data, that an identifier of the smart-home device includes a name of a person and associating the name with a person identifier. The process 600 may also include determining, based at least in part on characteristics of the audio data, that a voice signature for the audio data corresponds to a reference voice signature associated with the person identifier. In these examples, the output data generated and sent to the voice-enabled device may indicate that the target smart-home device is associated with the person.

FIG. 7 illustrates a flow diagram of another example process 700 for device naming-indicator generation. The order in which the operations or steps are described is not intended to be construed as a limitation, and any number of the described operations may be combined in any order and/or in parallel to implement process 700.

At block 702, the process 700 may include generating tag data for an electronic device associated with a voice-enabled device, the tag data indicating device-profile data including an indication of at least one of a location of the electronic device, a device type of the electronic device, or a name associated with the electronic device. For example, tag data may be generated for a given friendly name. The tag data may indicate device location, device type, device brand, device name, a quantifier, one or more setting values, and/or placeholder tags for unknown words not yet associated with the friendly name. In examples, generating the tag data may include generating, from an identifier of the electronic device, a featurized identifier for the electronic device. The featurized identifier may indicate attributes associated with the identifier. A tagging model may be generated that is configured to receive the featurized identifier as input and generate, as output, the tag data. In these examples, generating the tag data may be based at least in part on the tagging model and the featurized identifier.

At block 704, the process 700 may include receiving, from a database, and/or generating contextual data for the electronic device, the contextual data indicating historical use of the electronic device. The contextual data may include, for example, indications of historical usage of electronic devices. For example, the contextual data may indicate, for a given electronic device, times and/or days that a state change occurred for the electronic device, such as when the electronic device was turned on and/or turned off. The contextual data may also include a user identifier associated with a given interaction with a voice-enabled device. The user identifier may indicate which user provided the user utterance. The contextual data may be utilized by the system, for example, to temporally cluster devices based on state changes and/or usage information. For example, a given electronic device may be associated with a usage pattern that is similar to a group and/or cluster of other electronic devices having friendly names that include "porch light." In these examples, the given electronic device may be determined to be a "porch light," such as in examples where a friendly name has not been assigned to the given electronic device.

At block 706, the process 700 may include generating, based at least in part on at least one of the tag data or the contextual data, a naming indicator for the electronic device. A naming component may be configured to identify, determine, and/or generate naming indicators based at least in part on the formatted text data, the tag data, and/or the contextual data, such as described above. For example, the friendly name for an electronic device may be "Rob's device." However, the naming component, utilizing the data described herein, may be configured to generate one or more naming indicators for the electronic device other than Rob's device. For example, the tag data may indicate that the electronic device is located in a kitchen, and the naming component may utilize this information to generate a naming indicator of "kitchen device." Additionally, or alternatively, the tag data may indicate that the electronic device is a "light," and the naming component may utilize this information to generate a naming indicator for "Rob's light." Additionally, or alternatively, the tag data may indicate that the electronic device is associated with a particular brand, such as Brand X, and the naming component may utilize this information to generate a naming indicator of "Rob's Brand X device." In further examples, the naming component may utilize the contextual data, particularly the usage history and temporal clustering as described herein, to determine that the device is likely a "porch light," and the naming component may generate a naming indicator of "Rob's porch light."

At block 708, the process 700 may include generating output data that: identifies the electronic device by the naming indicator; and corresponds to a phrase structured based at least in part on the naming indicator. For example, generation of audio data may be performed by a TTS component of the speech-processing system utilizing the text data, and may include utilizing the naming indicator for the electronic device as generated by the naming component based at least in part on the tag data and/or contextual data and incorporating the naming indicator in the audio data as the identifier of the electronic device. Additionally, with respect to portions of the audio data other than the identifier of the electronic device, the naming indicator may be utilized to inform generation of those portions by the TTS component. For example, if a naming indicator of "kitchen lights" is determined for the electronic devices to be acted upon, the TTS component may determine that the naming indicator includes an indication of plural electronic devices and may generate the remaining audio data based at least in part on that determination. For example, the TTS component may generate audio data corresponding to "the kitchen lights are on" instead of "the kitchen lights is on." The audio data may be sent to the voice-enabled device, which may output corresponding audio via speakers of the voice-enabled device.

Additionally, or alternatively, the process 700 may include receiving an identifier, such as a friendly name, of the electronic device in a format without capitalization and/or punctuation. The process 700 may also include generating and/or receiving a formatting model configured to identify first portions of the identifier to be capitalized and second portions of the identifier to include punctuation. The process 700 may also include generating, using the formatting model with the identifier as an input, formatted text data corresponding to the identifier, where the formatted text data may indicate a capitalized portion of the identifier and may include punctuation. In these examples, generating the tag data may be based at least in part on the formatted text data.

Additionally, or alternatively, the process 700 may include determining, based at least in part on the tag data, that an identifier of the electronic device includes a name of a person and associating the name with a person identifier. The process 700 may also include determining, based at least in part on characteristics of the audio data, that a voice signature for the audio data corresponds to a reference voice signature associated with the person identifier. In these examples, the audio data generated and sent to the voice-enabled device may indicate that the target electronic device is associated with the person.

Additionally, or alternatively, the process 700 may include receiving, from the voice-enabled device, audio data representing a user utterance and determining, based at least in part on the audio data, text data indicating a textual representation of the user utterance. The process 700 may also include determining, based at least in part on the text data, that the user utterance includes a request to operate the first electronic device and a second electronic device. In these examples, generating the naming indicator for the first electronic device may include generating the naming indicator for a device group including the first electronic device and the second electronic device. Additionally, the audio data to be sent to the voice-enabled device may identify the device group by the naming indicator.

Additionally, or alternatively, the process 700 may include receiving, from the voice-enabled device, audio data representing a user utterance and determining, based at least in part on the audio data, intent data indicating that the user utterance corresponds to a request to operate a target electronic device associated with the voice-enabled device. The process 700 may also include determining, based at least in part on the naming indicator, that the electronic device corresponds to the target electronic device. In these examples, the output data sent to the voice-enabled device may represent a response to the user utterance and may indicate performance of an operation by the target electronic device identified using the naming indicator.

Additionally, or alternatively, the process 700 may include determining, based at least in part on the contextual data, that the electronic device is historically in a first operation state during a period of time and determining that the electronic device is in a second state during the period of time. In these examples, the output data sent to the voice-enabled device may include an alert that the electronic device having the naming indicator is in the second state.

Additionally, or alternatively, the process 700 may include receiving, from the voice-enabled device, audio data representing a user utterance and determining, based at least in part on the audio data, intent data indicating that the user utterance corresponds to a request to operate a target electronic device. The process 700 may also include determining that a first identifier of the first electronic device corresponds to the target electronic device, and determining that a second identifier of a second electronic device corresponds to the target electronic device. In these examples, the output data sent to the voice-enabled device may include a request to confirm that the first electronic device having the naming indicator corresponds to the target electronic device instead of the second electronic device.

Figure 8:
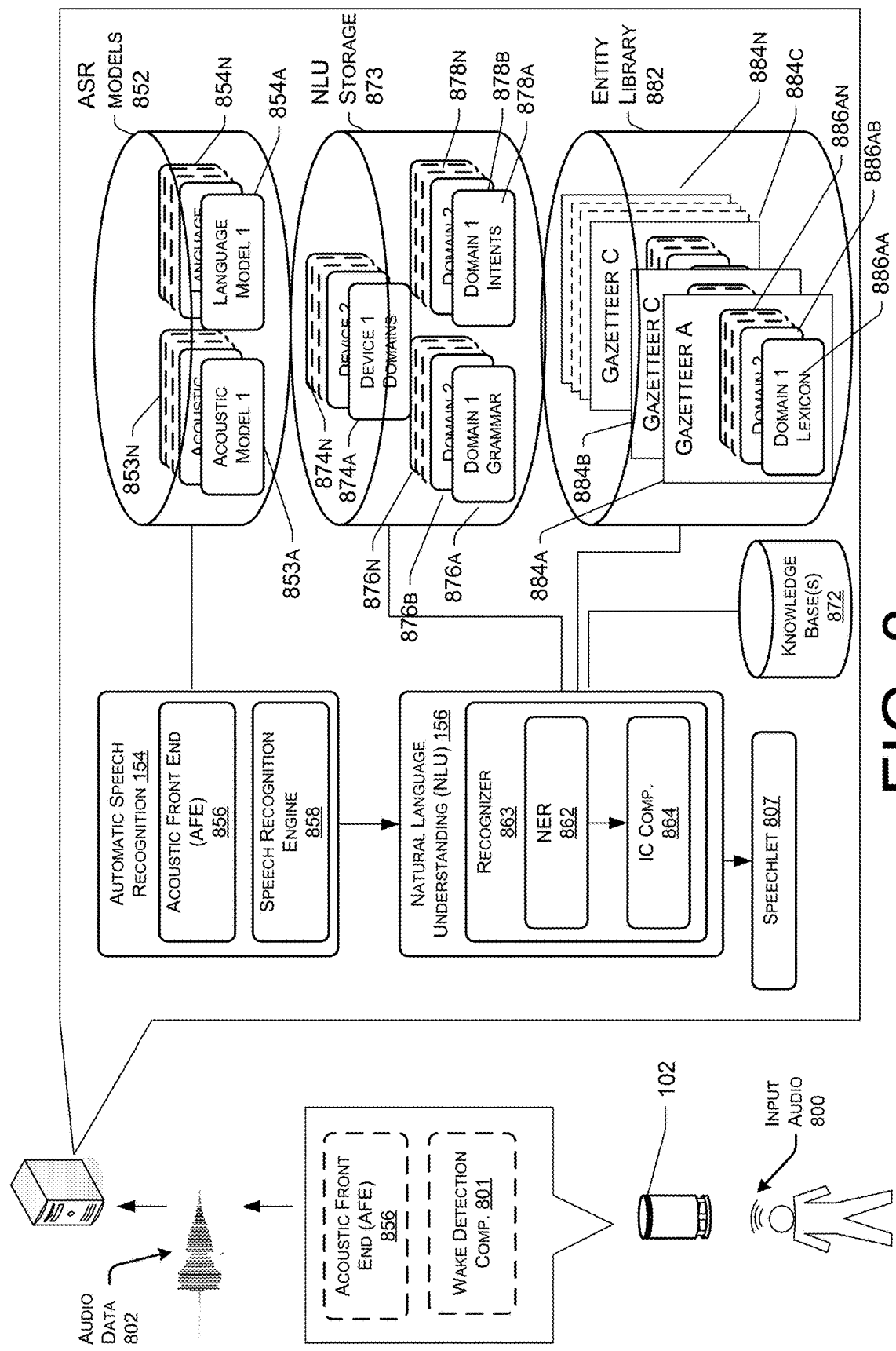
FIG. 8 illustrates a conceptual diagram of components of a speech-processing system for processing audio data provided by one or more devices.

FIG. 8 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin sending audio data to a system, such as system 106). The various components illustrated may be located on a same or different physical devices. Message between various components illustrated in FIG. 8 may occur directly or across a network 108. An audio capture component, such as a microphone 116 of the device 102, or another device, captures audio 800 corresponding to a spoken utterance. The device 102, using a wake-word component 801, then processes audio data corresponding to the audio 800 to determine if a keyword (such as a wakeword) is detected in the audio data. Following detection of a wakeword, the device 102 sends audio data 802 corresponding to the utterance to the system 106 that includes an ASR component 146. The audio data 802 may be output from an optional acoustic front end (AFE) 856 located on the device prior to transmission. In other instances, the audio data 802 may be in a different form for processing by a remote AFE 856, such as the AFE 856 located with the ASR component 146 of the system 106.

The wake-word component 801 works in conjunction with other components of the user device, for example a microphone to detect keywords in audio 800. For example, the device may convert audio 800 into audio data, and process the audio data with the wake-word component 801 to determine whether human sound is detected, and if so, if the audio data comprising human sound matches an audio signature and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wake-word component 801 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wake-word component 801 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 102 may "wake" and begin transmitting audio data 802 corresponding to input audio 800 to the system 106 for speech processing. Audio data corresponding to that audio may be sent to system 106 for routing to a recipient device or may be sent to the system 106 for speech processing for interpretation of the included speech (either for purposes of enabling voice-messages and/or for purposes of executing a command in the speech). The audio data 802 may include data corresponding to the wakeword, or the portion of the audio data corresponding to the wakeword may be removed by the local device 102 prior to sending. Further, a local device may "wake" upon detection of speech/spoken audio above a threshold, as described herein. Upon receipt by the system 106, an ASR component 146 may convert the audio data 802 into text. The ASR transcribes audio data into text data representing the words of the speech contained in the audio data 802. The text data may then be used by other components for various purposes, such as executing system commands, inputting data, etc. A spoken utterance in the audio data is input to a processor configured to perform ASR which then interprets the utterance based on the similarity between the utterance and pre-established language models 854 stored in an ASR model knowledge base (ASR Models Storage 852). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 853 stored in an ASR Models Storage 852), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 146 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 856 and a speech recognition engine 858. The acoustic front end (AFE) 856 transforms the audio data from the microphone into data for processing by the speech recognition engine 858. The speech recognition engine 858 compares the speech recognition data with acoustic models 853, language models 854, and other data models and information for recognizing the speech conveyed in the audio data. The AFE 856 may reduce noise in the audio data and divide the digitized audio data into frames representing time intervals for which the AFE 856 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 858 may process the output from the AFE 856 with reference to information stored in speech/model storage (852). Alternatively, post front-end processed data (such as feature vectors) may be received by the device executing ASR processing from another source besides the internal AFE. For example, the user device may process audio data into feature vectors (for example using an on-device AFE 856) and transmit that information to a server across a network for ASR processing. Feature vectors may arrive at the system 106 encoded, in which case they may be decoded prior to processing by the processor executing the speech recognition engine 858.

The speech recognition engine 858 attempts to match received feature vectors to language phonemes and words as known in the stored acoustic models 853 and language models 854. The speech recognition engine 858 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, turn on my lights." The wake detection component may identify the wake word, otherwise described as a trigger expression, "Alexa," in the user utterance and may "wake" based on identifying the wake word. Audio data corresponding to the user utterance may be sent to the system 106, where the speech recognition engine 858 may identify, determine, and/or generate text data corresponding to the user utterance, here "turn on my lights."

The speech recognition engine 858 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 858 to other processing components, which may be local to the device performing ASR and/or distributed across the network(s). For example, ASR results in the form of a single textual representation of the speech, an N-best list including multiple hypotheses and respective scores, lattice, etc. may be sent to the system 106, for natural language understanding (NLU) processing, such as conversion of the text into commands for execution, either by the user device, by the system 106, or by another device (such as a server running a specific application like a search engine, etc.).

The device performing NLU processing 148 (e.g., server 106) may include various components, including potentially dedicated processor(s), memory, storage, etc. As shown in FIG. 8, an NLU component 148 may include a recognizer 863 that includes a named entity recognition (NER) component 862 which is used to identify portions of query text that correspond to a named entity that may be recognizable by the system. A downstream process called named entity resolution links a text portion to a specific entity known to the system. To perform named entity resolution, the system may utilize gazetteer information (884*a*-884*n*) stored in entity library storage 882. The gazetteer information may be used for entity resolution, for example matching ASR results with different entities (such as voice-enabled devices, accessory devices, etc.) Gazetteers may be linked to users (for example a particular gazetteer may be associated with a specific user's device associations), may be linked to certain domains (such as music, shopping, etc.), or may be organized in a variety of other ways.

Generally, the NLU process takes textual input (such as processed from ASR 146 based on the utterance input audio 800) and attempts to make a semantic interpretation of the text. That is, the NLU process determines the meaning behind the text based on the individual words and then implements that meaning. NLU processing 148 interprets a text string to derive an intent or a desired action from the user as well as the pertinent pieces of information in the text that allow a device (e.g., device 102) to complete that action.

For example, if a spoken utterance is processed using ASR 146 and outputs the text "turn on my lights" the NLU process may determine that the user intended to active an accessory device with the naming indicator of "my lights."

The NLU may process several textual inputs related to the same utterance. For example, if the ASR 146 outputs N text segments (as part of an N-best list), the NLU may process all N outputs to obtain NLU results.

As will be discussed further below, the NLU process may be configured to parse and tag to annotate text as part of NLU processing. For example, for the text "turn on my lights," "turn on" may be tagged as a command (to activate an accessory device) and "my lights" may be tagged as the naming identifier of the accessory devices in question.

To correctly perform NLU processing of speech input, an NLU process 148 may be configured to determine a "domain" of the utterance so as to determine and narrow down which services offered by the endpoint device (e.g., system 106 or the user device) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 862 receives a query in the form of ASR results and attempts to identify relevant grammars and lexical information that may be used to construe meaning. To do so, the NLU component 148 may begin by identifying potential domains that may relate to the received query. The NLU storage 873 includes a database of devices (874a-874n) identifying domains associated with specific devices. For example, the user device may be associated with domains for music, telephony, calendaring, contact lists, and device-specific messages, but not video. In addition, the entity library may include database entries about specific services on a specific device, either indexed by Device ID, User ID, or Household ID, or some other indicator.

In NLU processing, a domain may represent a discrete set of activities having a common theme, such as "banking," "health care," "smart home," "communications," "shopping," "music," "calendaring," etc. As such, each domain may be associated with a particular recognizer 863, language model and/or grammar database (876a-876n), a particular set of intents/actions (878a-878n), and a particular personalized lexicon (886). Each gazetteer (884a-884n) may include domain-indexed lexical information associated with a particular user and/or device. For example, the Gazetteer A (884a) includes domain-index lexical information 886aa to 886an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both messages and, for example, music, the query may, substantially in parallel, be NLU processed using the grammar models and lexical information for messages, and will be processed using the grammar models and lexical information for music. The responses based on the query produced by each set of models is scored, with the overall highest ranked result from all applied domains ordinarily selected to be the correct result.

An intent classification (IC) component 864 parses the query to determine an intent or intents for each identified domain, where the intent corresponds to the action to be performed that is responsive to the query. Each domain is associated with a database (878a-878n) of words linked to intents. For example, a smart-home intent database may link words and phrases such as "turn on," "activate," "start," to a "turn on" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC component 864 identifies potential intents for each identified domain by comparing words in the query to the words and phrases in the intents database 878. In some instances, the determination of an intent by the IC component 864 is performed using a set of rules or templates that are processed against the incoming text to identify a matching intent.

In order to generate a particular interpreted response, the NER 862 applies the grammar models and lexical information associated with the respective domain to actually recognize a mention of one or more entities in the text of the query. In this manner, the NER 862 identifies "slots" or values (i.e., particular words in query text) that may be needed for later command processing. Depending on the complexity of the NER 862, it may also label each slot with a type of varying levels of specificity (such as noun, place, device name, device location, city, artist name, song name, amount of time, timer number, or the like). Each grammar model 876 includes the names of entities (i.e., nouns) commonly found in speech about the particular domain (i.e., generic terms), whereas the lexical information 886 from the gazetteer 884 is personalized to the user(s) and/or the device. For instance, a grammar model associated with the shopping domain may include a database of words commonly used when people discuss shopping.

The intents identified by the IC component 864 are linked to domain-specific grammar frameworks (included in 876) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "turn on" is an identified intent, a grammar (876) framework or frameworks may correspond to sentence structures such as "activate {Rob's light} device."

For example, the NER component 862 may parse the query to identify words as subject, object, verb, preposition, etc., based on grammar rules and/or models, prior to recognizing named entities. The identified verb may be used by the IC component 864 to identify intent, which is then used by the NER component 862 to identify frameworks. A framework for the intent of "play a song," meanwhile, may specify a list of slots/fields applicable to play the identified "song" and any object modifier (e.g., specifying a music collection from which the song should be accessed) or the like. The NER component 862 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 862 may search the database of generic words associated with the domain (in the knowledge base 872). So, for instance, if the query was "turn on office light," after failing to determine which device to operate, the NER component 862 may search the domain vocabulary for the phrase "office light". In the alternative, generic words may be checked before the gazetteer information, or both may be tried, potentially producing two different results.

The output data from the NLU processing (which may include tagged text, commands, etc.) may then be sent to a speechlet 152. The destination speechlet 152 may be determined based on the NLU output. For example, if the NLU output includes a command to send a message, the destination speechlet 152 may be a message sending application, such as one located on the user device or in a message sending appliance, configured to execute a message sending command. If the NLU output includes a search request, the destination speechlet 152 may include a search engine processor, such as one located on a search server, configured to execute a search command. After the appropriate command is generated based on the intent of the user, the speechlet 152 may provide some or all of this information to a text-to-speech (TTS) engine. The TTS engine may then generate an actual audio file for outputting the audio data determined by the speechlet 152 (e.g., "okay," or "Rob's light on"). After generating the file (or "audio data"), the TTS engine may provide this data back to the system 106.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 148 during runtime operations where NLU operations are performed on text (such as text output from an ASR component 146). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 863. Each recognizer may include various NLU components such as an NER component 862, IC component 864 and other components such as an entity resolver, or other components.

For example, a messaging domain recognizer 863-A (Domain A) may have an NER component 862-A that identifies what slots (i.e., portions of input text) may correspond to particular words relevant to that domain. The words may correspond to entities such as (for the messaging domain) a recipient. An NER component 862 may use a machine learning model, such as a domain specific conditional random field (CRF) to both identify the portions corresponding to an entity as well as identify what type of entity corresponds to the text portion. The messaging domain recognizer 863-A may also have its own intent classification (IC) component 864-A that determines the intent of the text assuming that the text is within the proscribed domain. An IC component may use a model, such as a domain specific maximum entropy classifier to identify the intent of the text, where the intent is the action the user desires the system to perform. For this purpose, the system computing device 106 may include a model training component. The model training component may be used to train the classifier(s)/machine learning models discussed above.

As noted above, multiple devices may be employed in a single speech-processing system. In such a multi-device system, each of the devices may include different components for performing different aspects of the speech processing. The multiple devices may include overlapping components. The components of the user device and the system 106, as illustrated herein are exemplary, and may be located in a stand-alone device or may be included, in whole or in part, as a component of a larger device or system, may be distributed across a network or multiple devices connected by a network, etc.

Figure 9:
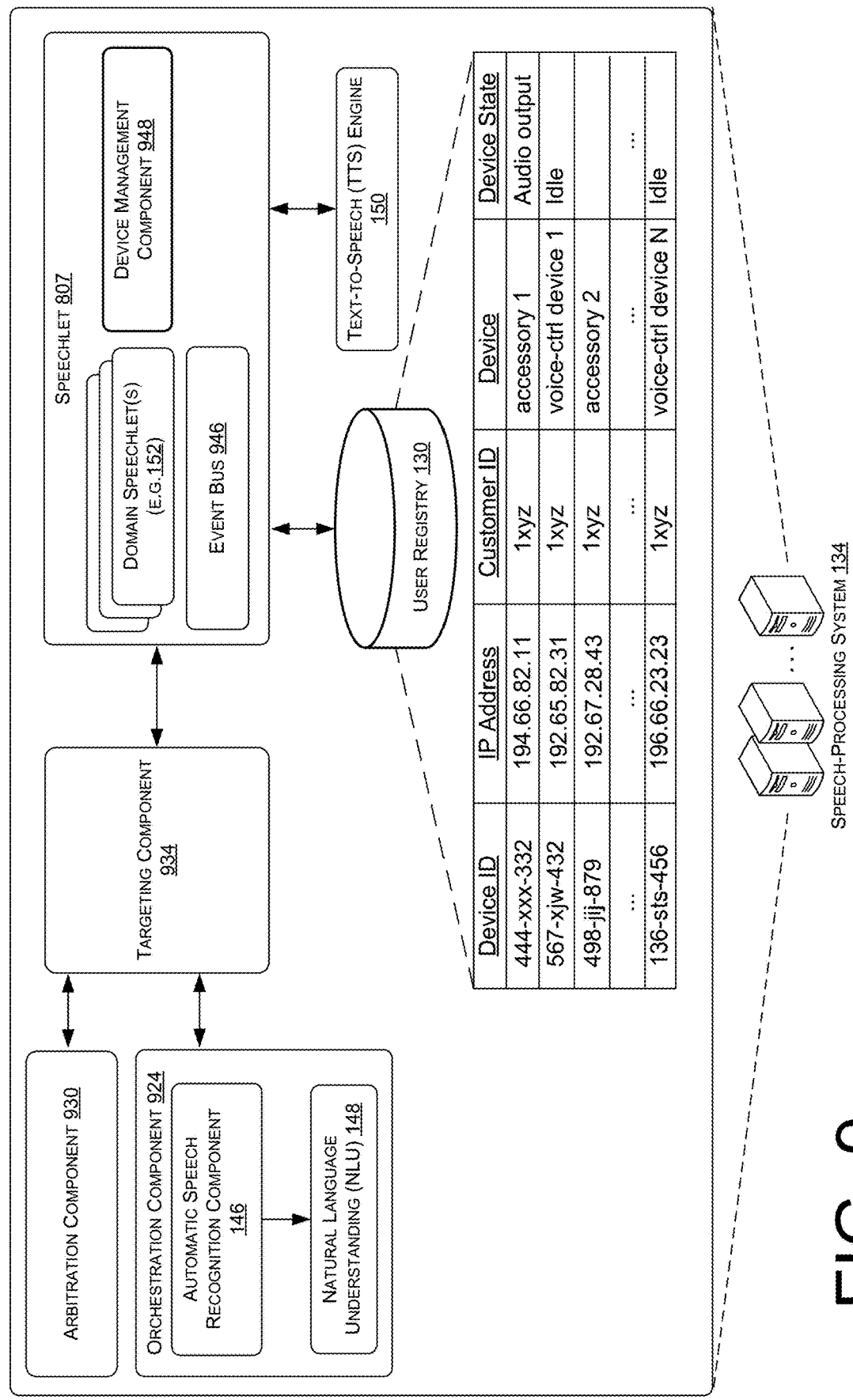
FIG. 9 illustrates a conceptual diagram of components of a speech-processing system for device naming-indicator generation.

FIG. 9 illustrates a conceptual diagram of components of a speech-processing system 134 associating audio output commands with multiple devices, including a speechlet 152 configured to generate a command that the selected voice-enabled device uses to respond to a user utterance. As used with respect to FIG. 9, a voice-enabled device may include a voice-enabled device 102, such as described with respect to FIG. 1. As illustrated in FIG. 9, the speech-processing system 134, including the orchestration component 924 comprising the ASR component 146 and the NLU component 148, may be coupled to the targeting component 934 and provide the targeting component 934 with the intent determined to be expressed in the user utterance. Further, the arbitration component 930 may provide the ranked list of devices to the targeting component 934, as well as device indicators (e.g., IP addresses, devices names, etc.) for one or more of the voice-enabled devices in the ranked list of devices. The targeting component 934 may then perform techniques to determine a target device (e.g., a device to perform the requested operation), and provide various data to the speechlet 807. For instance, the targeting component 934 may provide the speechlet 807 with various device identifiers of the voice-enabled devices, the determined target device, the determined intent and/or command, etc.

The speechlet 807 and/or NLU component 148 may determine a domain based on the intent and, based on this determination, route the request corresponding to the audio data to the appropriate domain speechlet, such as the illustrated domain speechlets 152. The domain speechlet 152 may comprise any type of device or group of devices (e.g., hardware device, virtual devices or partitions, server, etc.), and may receive the text data and/or an intent associated with the audio signals and may determine how to respond to the request. For instance, the intent for a command "what's my bank account balance" may be routed to a speechlet that controls generation of directive data for sending to voice-enabled devices for outputting audio informing a user of a bank account balance.

Various types of domain speechlets 152 may be used to determine which devices to send commands to and/or to use in response to a user utterance, as well as the appropriate response and potential additional content (e.g., audio data). For example, the domain speechlets 152 may include a third party application domain speechlet 152, which may handle intents associated with banking, healthcare, gaming, productivity, etc., a music domain speechlet, which may handle intents associated with music play requests (e.g., Amazon Music, Pandora, Spotify, iHeart, etc.), and/or an information domain speechlet, which may handle requests for information associated, for example, with the status of a particular device and/or content being utilized and/or output by a particular device and/or group of devices.

After the domain speechlet 152 generates the appropriate command, which may be described herein as directive data, based on the intent of the user, and/or provides additional content, such as audio data, to be output by one of the voice-enabled devices, the domain speechlet 152 may provide this information back to the speech system 134, which in turns provides some or all of this information to a text-to-speech (TTS) engine 150. The TTS engine 150 then generates an actual audio file for outputting the second audio data determined by the domain speechlet 152. After generating the file (or "audio data"), the TTS engine 150 may provide this data back to the speech system 134.

The speech system 134 may then publish (i.e., write) some or all of this information to an event bus 946. That is, the speech system 134 may provide information regarding the initial request (e.g., the speech, the text, the domain/intent, etc.), the response to be provided to the voice-enabled device, or any other information pertinent to the interaction between the voice-enabled device and the speech-processing system 134 to the event bus 946.

Within the speech-processing system 134, one or more components or services may subscribe to the event bus 946 so as to receive information regarding interactions between user devices and the speech-processing system 134. In the illustrated example, for instance, the device management component 948 may subscribe to the event bus 946 and, thus, may monitor information regarding these interactions. In some examples, monitoring information in the event bus 946 may comprise messages between various components of the speech-processing system 134. For example, the targeting component 934 may monitor the event bus 946 to identify device state data for voice-enabled devices. In some examples, the event bus 946 may "push" or send indications of events and/or device state data to the targeting component 934. Additionally, or alternatively, the event bus 946 may be "pulled" where the targeting component 934 sends requests to the event bus 946 to provide an indication of device state data for a voice-enabled device. The event bus 946 may store indications of the device states for the devices, such as in a database (e.g., user registry 130), and using the stored indications of the device states, send the device state data for voice-enabled devices to the targeting component 934. Thus, to identify device state data for a device, the targeting component 934 may send a request to the event bus 946 (e.g., event component) to provide an indication of the device state data associated with a device, and receive, from the event bus 946, the device state data that was requested.

The device management component 948 functions to monitor information published to the event bus 946 and identify events that may trigger action. For instance, the device management component 948 may identify (e.g., via filtering) those events that: (i) come from voice-enabled devices that are associated with secondary device(s) (e.g., have secondary devices in their environments such as televisions, personal computing devices, accessory devices, etc.), and (ii) are associated with supplemental content (e.g., image data, video data, etc.). The device management component 948 may reference the user registry 130 to determine which voice-enabled devices are associated with secondary devices, as well as determine device types, states, and other capabilities of these secondary devices. For instance, the device management component 948 may determine, from the information published to the event bus 946, an identifier associated with the voice-enabled device making the corresponding request or the voice-enabled device selected to respond to or act upon the user utterance. The device management component 948 may use this identifier to identify, from the user registry 130, a user account associated with the voice-enabled device. The device management component 948 may also determine whether any secondary devices have been registered with the identified user account, as well as capabilities of any such secondary devices, such as how the secondary devices are configured to communicate (e.g., via WiFi, short-range wireless connections, etc.), the type of content the devices are able to output (e.g., audio, video, still images, flashing lights, etc.), and the like.

The device management component 948 may determine whether a particular event identified is associated with supplemental content. That is, the device management component 948 may write, to a datastore, indications of which types of events and/or which primary content or responses are associated with supplemental content. In some instances, the speech-processing system 134 may provide access to third-party developers to allow the developers to register supplemental content for output on secondary devices for particular events and/or primary content. For example, if a voice-enabled device is to output that the weather will include thunder and lightning, the device management component 948 may store an indication of supplemental content such as thunder sounds, pictures/animations of lightning and the like. In another example, if a voice-enabled device is outputting information about a particular fact (e.g., "a blue whale is the largest mammal on earth . . . "), then a secondary device, such as television, may be configured to provide supplemental content such as a video or picture of a blue whale. In another example, if a voice-enabled device is outputting audio, then a second device, such as a speaker, may be configured to also output the audio based at least in part on a user utterance representing a request to add the secondary device to the audio session. In these and other examples, the device management component 948 may store an association between the primary response or content (e.g., outputting of information regarding the world's largest mammal) and corresponding supplemental content (e.g., the audio data, image data, or the like). In some instances, the device management component 948 may also indicate which types of secondary devices are to output which supplemental content. For instance, in the instant example, the device management component 948 may store an indication that secondary devices of a class type "tablet" are to output a picture of a blue whale. In these and other instances, meanwhile, the device management component 948 may store the supplemental content in association with secondary-device capabilities (e.g., devices with speakers output the audio commentary, devices with screens output the image, etc.).

The device management component 948 may also determine how to transmit response and/or supplement content (and/or information acquiring the content) to the voice-enabled devices and/or the secondary devices. To make this determination, the device management component 948 may determine a device type of the voice-enabled devices and/or secondary devices, capabilities of the device(s), or the like, potentially as stored in the user registry 130. In some instances, the device management component 948 may determine that a particular device is able to communicate directly with the speech-processing system 134 (e.g., over WiFi) and, thus, the device management component 948 may provide the response and/or content directly over a network 108 to the secondary device (potentially via the speech system 134). In another example, the device management component 948 may determine that a particular secondary device is unable to communicate directly with the speech-processing system 134, but instead is configured to communicate with a voice-enabled device in its environment over short-range wireless networks. As such, the device management component 948 may provide the supplement content (or information) to the speech system 134, which in turn may send this to the voice-enabled device, which may send the information over a short-range network to the secondary device.

The speech-processing system 134 may further include the user registry 130 that includes data regarding user profiles as described herein. The user registry 130 may be located part of, or proximate to, the speech-processing system 134, or may otherwise be in message with various components, for example over the network 108. The user registry 130 may include a variety of information related to individual users, accounts, etc. that interact with the voice-enabled devices, and the speech-processing system 134. For illustration, the user registry 130 may include data regarding the devices associated with particular individual user profiles. Such data may include user or device identifier (ID) and internet protocol (IP) address information for different devices as well as names by which the devices may be referred to by a user. Further qualifiers describing the devices may also be listed along with a description of the type of object of the device. Further, the user registry 130 may store indications of associations between various voice-enabled devices and/or secondary device, such as virtual clusters of devices, states of devices, and associations between devices and audio-session queues. The user registry 130 may represent clusters of devices and/or as single devices that can receive commands and disperse the commands to each device and/or in the cluster. In some examples, the virtual cluster of devices may be represented as a single device which is determined as being capable, or not capable (e.g., offline), of performing a command in a user utterance. A virtual cluster of devices may generally correspond to a stored grouping of devices, or a stored association between a group of devices.

In some examples, the device state for devices associated with a user account may indicate a current state of the device. In this way, the speechlet 807 and/or the domain speechlets 152 may determine, based on the stored device states in the user registry 130, a current device state of the voice-enabled devices. Rather than receiving device states for the voice-enabled devices, in metadata, the device states may already have been determined or received and stored in the user registry 130. Further, the user registry 130 may provide indications of various permission levels depending on the user. As an example, the speech system 134 may perform speaker recognition on audio signals to determine an identity of the speaker. If the speaker is a child, for instance, the child profile may have permission restrictions where they are unable to request audio to be output via certain devices and/or to output certain audio on one or more of the devices, for example. Conversely, a parent profile may be able to direct output of audio without restrictions.

In some examples, to determine the device state, the event bus 946 may publish different events which indicate device states to various entities or components that subscribe to the event bus 946. For instance, if an event of "turn on office lights" occurs for a voice-enabled device, the event bus 946 may publish the indication of this event, and thus the device state of the voice-enabled device from which the audio data was received may be determined. Thus, various components, such as the targeting component 934, may be provided with indications of the various device states via the event bus 946. The event bus 946 may further store and/or update device states for the voice-enabled devices in the user registry 130. The components of the speech-processing system 134 may query the user registry 130 to determine device states.

A particular user profile may include a variety of data that may be used by the system 134. For example, a user profile may include information about what voice-enabled devices are associated with the user and/or user profile. The user profile may further indicate an IP address for each of the devices associated with the user and/or user profile, user IDs for the devices, indications of the types of devices, and current device states for the devices.

Figure 10:
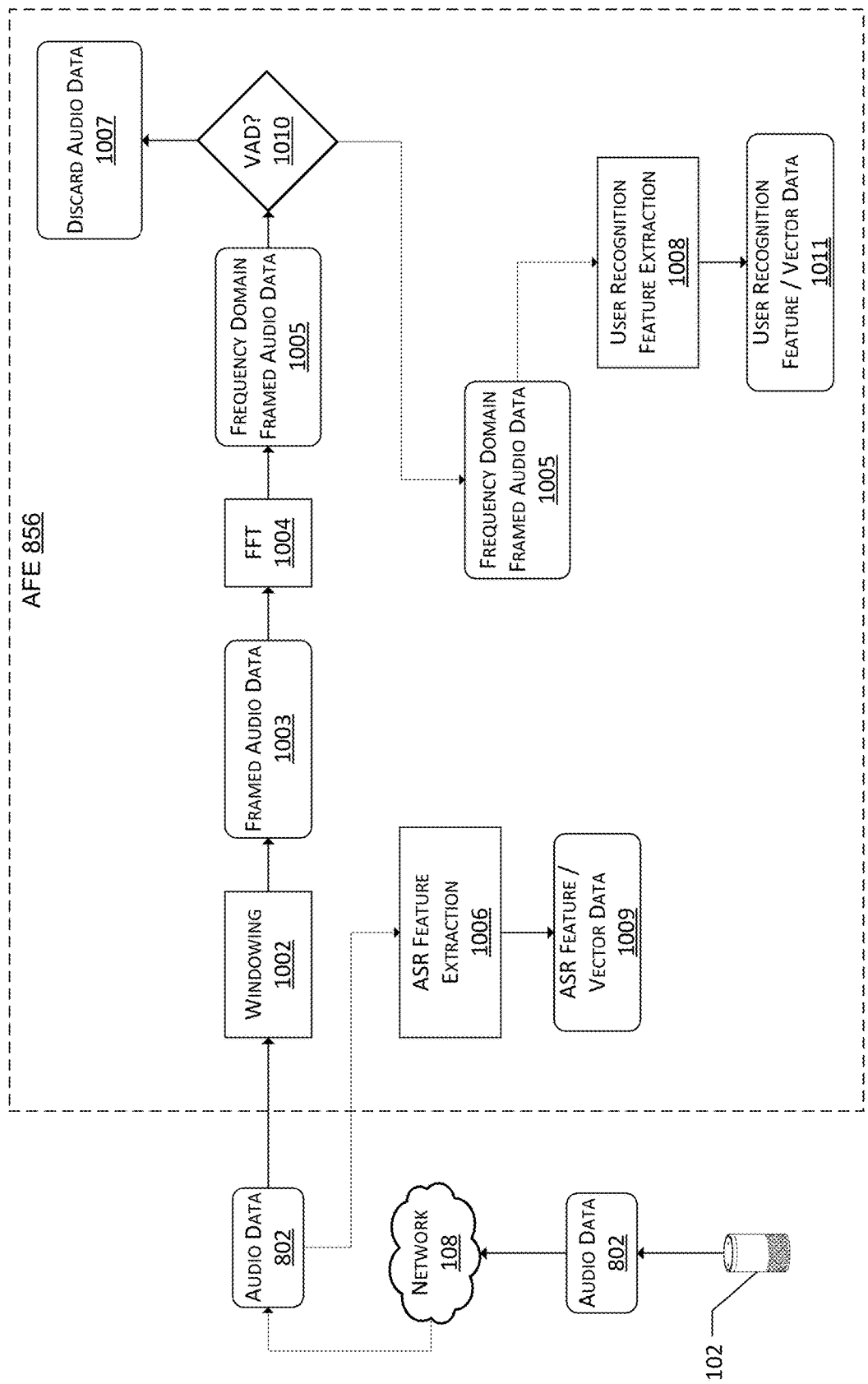
FIG. 10 illustrates a flow diagram for processing performed to prepare audio data for ASR and user recognition according to embodiments of the present disclosure.

FIG. 10 illustrates processing performed to prepare audio data for ASR and user recognition. The voice-enabled device 102 sends audio data 802 through a network(s) 108 to the system 106 for processing. The system 106 may include an acoustic front end (AFE) 856 (or other component(s)) that performs various functions on the incoming audio data 802 to prepare the incoming audio data 802 for further downstream processing, such as ASR and/or user recognition. For example, the AFE 856 may perform (1002) windowing functions on the audio data 802 to create framed audio data 1003 (e.g., waveforms). The size of each frame may depend upon implementation. In an example, each frame may include twenty-five (25) milliseconds (ms) of audio data, with an overlap of the next frame of 10 ms of data, thus resulting in sliding window processing of audio data. Performing a windowing function may include multiplying a time record by a finite-length window with an amplitude that varies smoothly and gradually toward zero at its edges. By performing such, the endpoints of the waveforms of respective frames of audio data meet, resulting in a continuous waveform without sharp transitions. The AFE 856 may then perform (1004) a fast Fourier transform (FFT) that converts the waveforms in each frame of the framed audio data 1003 from its original domain (e.g., time) to a representation in a frequency domain (thereby creating frequency domain framed audio data 1005). Audio processing techniques other than or in addition to FFT may be used to transform audio data (e.g., waveforms) into data that can be processed as needed.

The system 106 (through the AFE 856 or using another component) then detects (610) whether voice activity (i.e., speech) is present in the post-FFT waveforms (i.e., frequency domain framed audio data 1005). In doing so the system 106 may perform VAD operations discussed above. The VAD detector 1010 (or other components) may also be configured in a different order, for example the VAD detector 1010 may operate on input audio data 802 rather than on frequency domain framed audio data 1005, may operate on ASR features, etc. Various different configurations of components are possible. If there is no speech in the audio data, the system 106 discards the frequency domain framed audio data 1005 (i.e., removes the audio data from the processing stream). If, instead, the system 106 detects speech in the frequency domain framed audio data 1005, the system 106, performs user recognition feature extraction (1008) on the frequency domain framed audio data 1005. User recognition feature extraction (1008) may include performing frame level feature extraction and/or utterance level feature extraction. The frame level feature extraction may determine which frame of a universal background model (UBM) the frame corresponds to. The UBM may be a Gaussian mixture model, a deep neural network, etc. The utterance level feature extraction may analyze aligned speech frames to derive feature vectors of fixed length (i.e., the user recognition feature/vector data 1009). The feature extraction may continue until voice activity is no longer detected in the input audio data, at which point the system 106 may determine that an endpoint of the speech has been reached processing with respect thereto. ASR feature extraction (1006) may be performed on all the audio data 802 received from the voice-enabled device 102. Alternatively (not illustrated), ASR feature extraction (1006) may only be performed on audio data including speech (as indicated by the VAD 1010). ASR feature extraction (1006) and user recognition feature extraction (1008) involve determining values (i.e., features) representing qualities of the frequency domain framed audio data 1005, along with quantitating those features into values (i.e., feature vectors or audio feature vectors). ASR feature extraction (1006) may determine ASR feature/vector data 1009 useful for ASR processing, and user recognition feature extraction (1008) may determine user recognition feature/vector data 1009 useful for user recognition. The ASR feature/vector data 1009 and the user recognition feature/vector data 1009 may be the same features/vectors, different features/vectors, or may include some overlapping features/vectors. A number of approaches may be used to extract features/vectors from the frequency domain framed audio data 1005, such as MFCCs, PLP techniques, neural network feature vector techniques, linear discriminant analysis, semi-tied covariance matrices, or other approaches known to those skilled in the art.

Typically, the ASR feature/vector data 1009 may include a different audio feature vector for each audio frame. Thus, for one 25 ms long audio frame, the ASR feature extraction component 1006 may output a single ASR feature vector. The ASR feature vectors 1009 output by the ASR feature extraction component 1006 may be output to an ASR module 154 to perform speech recognition.

Depending on system configuration, the user recognition feature extraction component 1008 may output multiple user recognition feature vectors, for example one such vector for each audio frame. Alternatively, the user recognition feature extraction component 608 may continue to input the frequency domain framed audio data 1005 while the utterance is ongoing (e.g., before the endpoint of the speech is reached in the audio data 1005). While the audio data 1005 for the utterance is input, the user recognition feature extraction component 1008 may accumulate or otherwise combine the audio data 1005 as it comes in. That is, for a certain frame's worth of audio data 1005 that comes in, the user recognition feature extraction component 1008 may combine that frame's worth of data to the previous data received for the particular utterance. The particular method of accumulation may vary, including using an arithmetic component, a recurrent neural network (RNN), trained model, or other component capable of combining audio data. Further, the form of combination performed by the user recognition feature extraction component 1008 may depend on what audio qualities are determined to be important for ultimate user recognition. Thus, the user recognition feature extraction component 1008 may be trained to isolate and process data that is most useful for user recognition. The output of the user recognition feature extraction component 1008 may thus include user recognition feature/vector data 1011 that includes values for features useful for user recognition. The resulting user recognition feature/vector data 1011 may then be used for user recognition.

Figure 11:
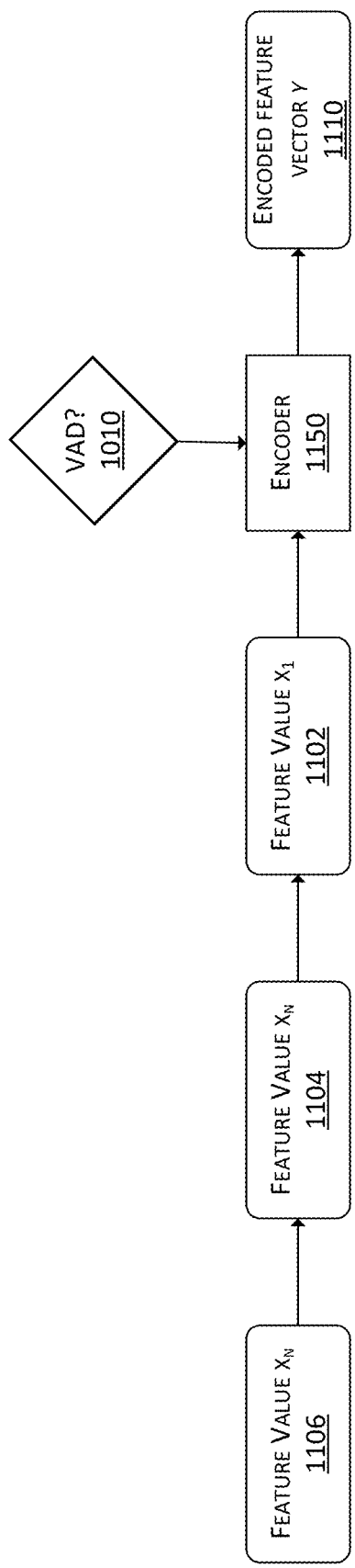
FIG. 11 illustrates a diagram of a vector encoder according to embodiments of the present disclosure.

The user recognition feature/vector data 1011 may include multiple vectors each corresponding to different portions of the input utterance. Alternatively, the user recognition feature/vector data 1011 may be a single vector representing audio qualities of the input utterance. Referring to FIG. 11, the single vector may be created using an encoder 1150 which can create a fixed-size vector to represent certain characteristics of the audio data entities as described below. In mathematical notation, given a sequence of feature data values x1, ... xm ... xM with xn being a D-dimensional vector, an encoder E(xu ... xN)=y projects the feature sequence to y, with y being a F-dimensional vector. F is a fixed length of the vector and is configurable depending on use of the encoded vector and other system configurations. As shown in FIG. 11, feature values 1102 through 1106 (which may include feature vectors of audio data 802, frequency domain framed audio data 1005, or the like) may be input into an encoder 1150 which will output an encoded feature vector 1110 that represents the input feature values. The VAD 1010 may be an input into the encoder 1150 such that the encoder 1150 may only operate when feature values input therein correspond to speech. The individual feature values (e.g., 1102-1106) may correspond to specific audio frames. Regardless of how many feature values are input, any particular encoder 1150 will be configured to output vectors of the same size, thus ensuring a continuity of output encoded vector size from any particular encoder 1150 (though different encoders may output vectors of different fixed sizes) and enabling comparing different feature vectors y. The value y may be called an embedding of the sequence Xu ... xN The length of xn and y are fixed and known a-priori, but the length of N of feature sequence Xu ... xN is not necessarily known a-priori. The encoder E may be implemented as a neural network (NN), recurrent neural network (RNN), GMM, or other model. One particular example is a long short-term memory (LSTM) RNN. There are a variety of ways for the encoder 1150 to consume the encoder input, including but not limited to:

linear, one direction (forward or backward), bi-linear, essentially the concatenation of a forward and a backward embedding, or tree, based on parse-tree of the sequence.

In addition, an attention model can be used, which is another RNN or deep neural network (DNN) that learns to "attract" attention to certain parts of the input. The attention model can be used in combination with the above methods of consuming the input.

FIG. 7 illustrates operation of the encoder 1150. The input feature value sequence, starting with feature value x1 1102, continuing through feature value xn 1104 and concluding with feature value xN 1106 is input into the encoder 1150. The encoder 1150 may process the input feature values as noted above. The encoder 1150 outputs the encoded feature vector y 1110, which is a fixed length feature vector of length F. Thus, the user recognition feature extraction component 1008 may include an encoder 1150 that receives audio feature values for a particular utterance as input, and outputs a fixed length encoded feature vector y 1110, which may be the user recognition feature/vector data 1011. Thus, in certain system configurations, no matter how long the utterance is, or how many acoustic frames worth of feature values are input into the encoder 1150, the output feature vector 1110/1011 will be of the same length, thus allowing for more ease of performing user recognition by the user recognition module 1002. To allow for robust system operation a final vector 1011 may include many dimensions (e.g., several hundred), thus providing many data points for downstream consideration.

To determine the user recognition feature/vector data 1011, the system may (for example using VAD detector 1010) determine that voice activity is detected in input audio. This may indicate the beginning of the utterance, thus resulting in the system determining that the input utterance starts at a first point in audio data. Audio processing (for example by windowing 1002, FFT 1004, ASR feature extraction 1006, user recognition feature extraction 1008, ASR module 154, or the like) may continue on the utterance audio data starting at the first point and continuing until the VAD detector 1010 determines that voice activity is no detected at a second point in audio data. Thus, the system may determine that the input utterance ends at the second point. Thus, the first point may be considered the beginpoint of the utterance and the second point may be considered the endpoint of the utterance. The VAD detector 1010, or other component, may signal the user recognition feature extraction component 1008 when the beginpoint and/or endpoint is detected so that the user recognition feature extraction component 1008 may begin processing audio data starting at the beginpoint and ending at the endpoint. Further, audio frames during the utterance that do not include speech may be filtered out by the VAD detector 1010 and thus not considered by the ASR feature extraction 1006 and/or user recognition feature extraction 1008. The resulting accumulated/processed speech audio data for the utterance (from beginpoint to endpoint) may then be represented in a single feature vector for the user verification feature/vector data 1011, which may then be used for user recognition.

Figure 12:
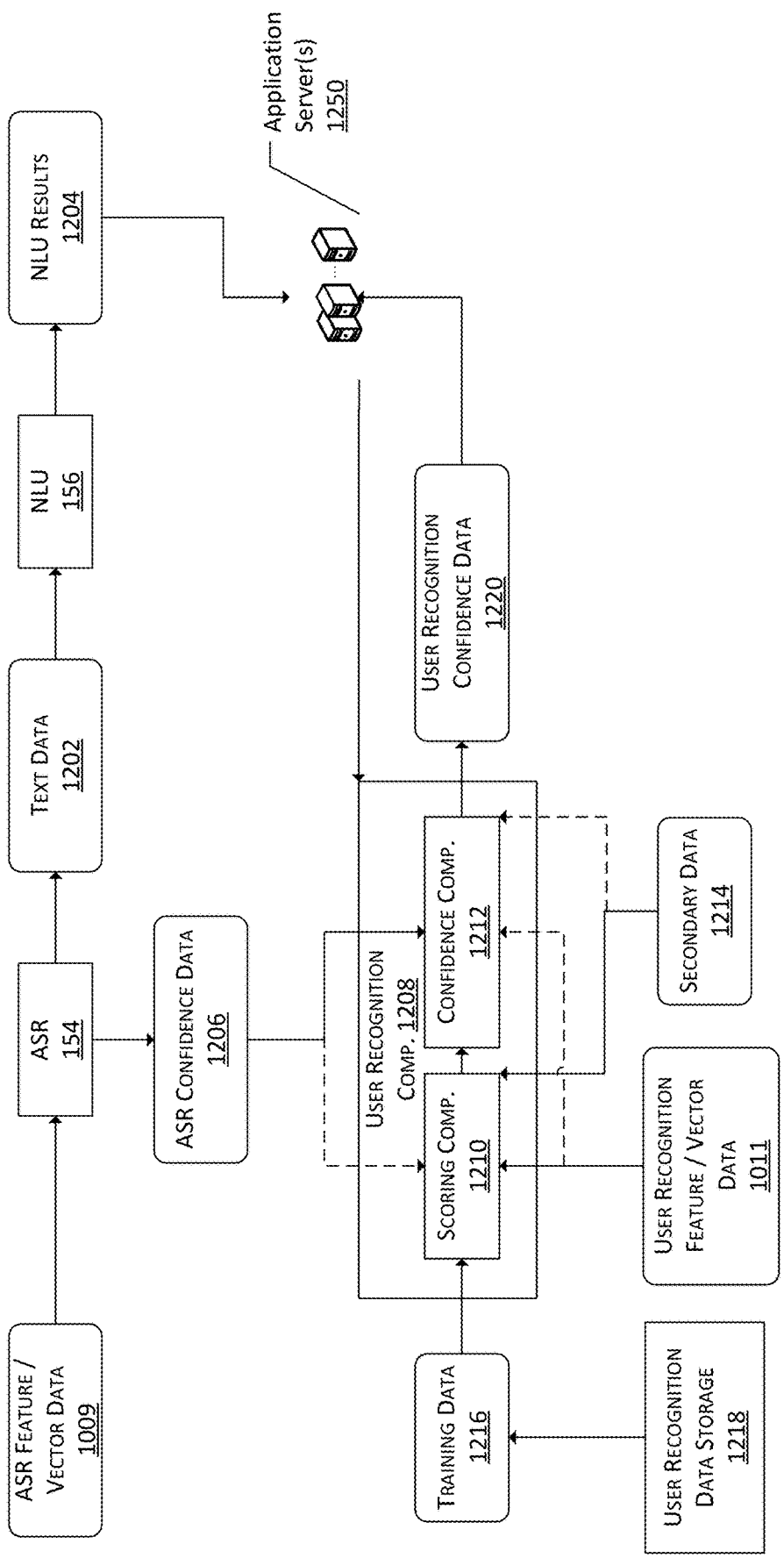
FIG. 12 illustrates a system flow diagram for user recognition according to embodiments of the present disclosure.

FIG. 12 illustrates user verification as performed by the system 106. The ASR module 154 performs ASR on the ASR feature/vector data 1009 as described above. ASR output (i.e., text data 1202) is then processed by the NLU component 156 as described above. The ASR confidence data 1206 may then be passed to a user recognition component 1208.

The user recognition component 1208 of the system 106 performs user recognition using various data including the user recognition feature/vector data 1011 and training data 1216 which may correspond to sample audio data corresponding to known users, the ASR confidence data 1206 and secondary data 1214. The user recognition component 1208 may then output user recognition confidence data 1220 which reflects a certain confidence that the input utterance was spoken by one or more particular users. The user recognition confidence data 1220 may not indicate access privileges of the user(s). The user recognition confidence data 1220 may include an indicator of the verified user (such as a user ID corresponding to the speaker of the utterance) along with a confidence value corresponding to the user ID, such as a numeric value or binned value as discussed below.

The training data 1216 may be stored in a user recognition data storage 1218. The user recognition data storage 1218 may be stored by the system 106, or may be a separate device. Further, the user recognition data storage 1218 may be part of user profile storage. The user recognition data storage 1218 may be a cloud-based storage. The training data 1216 stored in the user recognition data storage 1218 may be stored as waveforms and/or corresponding features/vectors. The training data 1216 may correspond to data from various audio samples, each audio sample associated with a known user and/or user identity. For example, each user known to the system may be associated with some set of training data 1216 for the known user. The user recognition component 1208 may then use the training data 1216 to compare against incoming audio data (represented by user recognition feature/vector data 1011) to determine the identity of a user speaking an utterance. The training data 1216 stored in the user recognition data storage 1218 may thus be associated with multiple users of multiple devices. Thus, the training data 1216 stored in the storage 1218 may be associated with both a user that spoke the respective utterance, as well as the voice-enabled device 102 that captured the respective utterance.

The training data 1216 for a particular user may include a feature vector of the same size as a vector of the user recognition feature/vector data 1011. Thus, for example, if a feature vector is of size F (for example encoded by encoder 1150), the training data 1216 may also be a feature vector of size F. To create such a training data feature vector, during a training period the system may either prompt a user to speak sample audio data or may identify sample audio data known to have been spoken by a particular user. The system may then process the sample audio data (for example into feature values such as 1102-1106 and then by encoder 1150) to create sample training data 1216 (e.g., a feature vector of size F). The training data 1216 may then be stored by the system (such as in data storage 1218) and saved for use during runtime user verification processing.

To perform user recognition, the user recognition component 1208 may determine the voice-enabled device 102 from which the audio data 802 originated. For example, the audio data 802 may include a tag indicating the voice-enabled device 102. Either the voice-enabled device 102 or the system 106 may tag the audio data 802 as such. The tag indicating the voice-enabled device 102 may be associated with the user recognition feature/vector data 1011 produced from the audio data 802. The user recognition component 1208 may send a signal to the user recognition data storage 1218, with the signal requesting only training data 1216 associated with known users of the voice-enabled device 102 from which the audio data 802 originated. This may include accessing a user profile associated with the voice-enabled device 102 and then only inputting training data 1216 associated with users corresponding to the user profile of the device 102. This limits the universe of possible training data the recognition component 1208 should consider at runtime when verifying a user and thus decreases the amount of time to perform user recognition by decreasing the amount of training data 1216 needed to be processed. Alternatively, the user recognition component 1208 may access all (or some other subset of) training data 1216 available to the system. However, accessing all training data 1216 will likely increase the amount of time needed to perform user recognition based on the magnitude of training data to be processed.

If the user recognition component 1208 receives training data 1216 as an audio waveform, the user recognition component 1208 may determine features/vectors of the waveform(s) or otherwise convert the waveform into a data format that can be used by the user recognition component 1208 to actually perform the user recognition. The user recognition component 1208 may then recognize the user that spoke the utterance in the audio data 802 by comparing features/vectors of the user recognition feature/vector data 1011 to training features/vectors (either received from the storage 1218 or determined from training data 1216 received from the storage 1218).

The user recognition component 1208 may include a scoring component 1210 which determines respective scores indicating whether the input utterance (represented by user recognition feature/vector data 1011) was spoken by particular users (represented by training data 1216). The user recognition component 1208 may also include a confidence component 1212 which determines an overall confidence as the accuracy of the user recognition operations (such as those of the scoring component 1210) and/or an individual confidence for each user potentially identified by the scoring component 1210. The output from the scoring component 1210 may include scores for all users with respect to which user recognition was performed (e.g., all users associated with the voice-enabled device 102). For example, the output may include a first score for a first user, a second score for a second user, and third score for a third user, etc. Although illustrated as two separate components, the scoring component 1210 and confidence component 1212 may be combined into a single component or may be separated into more than two components.

The scoring component 1210 and confidence component 1212 may implement one or more trained machine learning models (such neural networks, classifiers, etc.) as known in the art. For example, the scoring component 1210 may use probabilistic linear discriminant analysis (PLDA) techniques. PLDA scoring determines how likely it is that the input user recognition feature vector 1011 corresponds to a particular training data feature vector for a particular user. The PLDA scoring may generate similarity scores for each training feature vector considered and may output the list of scores and users and/or the user ID of the speaker whose training data feature vector most closely corresponds to the input user recognition feature vector 1011 of the utterance. The scoring component 1210 may also use other techniques such as GMMs, generative Bayesian models, or the like, to determine similarity scores.

The confidence component 1212 may input various data including information about the ASR confidence 1206, utterance length (e.g., number of frames or time of the utterance), audio condition/quality data (such as signal-to-interference data or other metric data), fingerprint data, image data, or other factors to consider how confident the user recognition component 1208 is with regard to the scores linking users to the input utterance. The confidence component 1212 may also consider the similarity scores and user IDs output by the scoring component 1210. Thus, the confidence component 1212 may determine that a lower ASR confidence 1206, or poor input audio quality, or other factors, may result in a lower confidence of the user recognition component 1208. Whereas a higher ASR confidence 1206, or better input audio quality, or other factors, may result in a higher confidence of the user recognition component 1208. Precise determination of the confidence may depend on configuration and training of the confidence component 1212 and the models used therein. The confidence component 1212 may operate using a number of different machine learning models/techniques such as GMM, neural networks, etc. For example, the confidence component 1212 may be a classifier configured to map a score output by the scoring component 1210 to a confidence.

The user recognition component 1208 may output user recognition confidence data 1220 specific to a single user. The user recognition confidence data 1220 may include a particular score (e.g., 0.0-1.0, 0-1000, or whatever scale the system is configured to operate). Alternatively or in addition, the user recognition confidence data 1220 may include a binned recognition indicator. For example, a computed recognition score of a first range (e.g., 0.0-0.33) may be output as "low," a computed recognition score of a second range (e.g., 0.34-0.66) may be output as "medium," and a computed recognition score of a third range (e.g., 0.67-1.0) may be output as "high." Combined binned and confidence score outputs are also possible. The user recognition component 1208 may also output a confidence value that the score/bin is correct, where the confidence value indicates how confident the user recognition component 1208 is in the output results. This confidence value may be determined by the confidence component 1212.

The confidence component 1212 may determine individual user confidences and differences between user confidences when determining the user recognition confidence data 1220. For example, if a difference between a first user's confidence score and a second user's confidence score is large, and the first user's confidence score is above a threshold, then the user recognition component 1208 is able to recognize the first user as the user that spoke the utterance with a much higher confidence than if the difference between the users' confidences were smaller.

The user recognition component 1208 may perform certain thresholding to avoid incorrect user recognition results being output. For example, the user recognition component 1208 may compare a confidence score output by the confidence component 1212 to a confidence threshold. If the confidence score is not above the confidence threshold (for example, a confidence of "medium" or higher), the user recognition component 1208 may not output user recognition confidence data 1220, or may only include in that data 1220 an indication that a user speaking the utterance could not be verified. Further, the user recognition component 1208 may not output user recognition confidence data 1220 until enough user recognition feature/vector data 1011 is accumulated and processed to recognize the user above a threshold confidence. Thus the user recognition component 1208 may wait until a sufficient threshold quantity of audio data of the utterance has been processed before outputting user recognition confidence data 1220. The quantity of received audio data may also be considered by the confidence component 1212.

The user recognition component 1208 may be defaulted to output binned (e.g., low, medium, high) user recognition confidence data 1220. However, such may be problematic from the application server(s) 1250 perspective. For example, if the user recognition component 1208 computes a single binned confidence for multiple users, the application server(s) 1250 may not be able to determine which user to determine content with respect to. In this situation, the user recognition component 1208 may be configured to override its default setting and output user recognition confidence data 1220 including numeric values (e.g., 0.0-1.0) associated with the users associated with the same binned confidence. This enables the application server(s) 1250 to select content associated with the user associated with the highest confidence value. The user recognition confidence data 1220 may also include the user IDs corresponding to the potential user(s) who spoke the utterance.

The NLU results 1204 may invoke multiple application servers 1250 having access to content responsive to a spoken utterance. The system 106 may communicate with one or more of the application servers 1250 without having to use a network(s) 108. Alternatively, the system 106 may communicate with one or more of the application servers 1250 through a network(s) 106.

Each application server 1250 may have a respective user recognition confidence threshold that must be satisfied prior to the application server 1250 providing content responsive to the spoken utterance in the audio data 802. The application server(s) 1250 may individually send a request for user recognition data to the user recognition component 1208. Each request may include the user recognition confidence threshold of the application server 1250 from which the request originated/was sent. Alternatively, a component of the system 106 may compile the user recognition confidence thresholds of all the application servers 1250 invoked by a spoken utterance, and may send all the user recognition confidence thresholds to the user recognition component 1208 in a single transmission. The user recognition confidence thresholds may be in the form of numeric confidence values (e.g., 0.0-1.0, 0-1000) or confidence indicators (e.g., low, medium, high). All of the user recognition confidence thresholds sent to the user recognition component 1208 may be confidence values, all of the user recognition confidence thresholds sent to the user recognition component 1208 may be in the form of confidence indicators, or some of the user recognition confidence thresholds sent to the user recognition component 1208 may be in the form of confidence values while others are in the form of confidence indicators.

The user recognition component 1208 may determine user recognition confidence data 1220 with respect to all of the users indicated in the profile associated with the voice-enabled device 102. The user recognition component 1208 may then determine whether one or more users are associated with user recognition confidence data 1220 satisfying a most stringent (e.g., highest) received user recognition confidence threshold. If the user recognition component 1208 determines a single user is associated with user recognition confidence data 1220 that meets or exceeds the highest user recognition confidence threshold, the user recognition component 1208 sends the user recognition confidence data 1220 to the application servers 1250 from which the user recognition confidence thresholds were received.

If the user recognition component 1208 does not determine a user associated with user recognition confidence data 1220 that meets or exceeds the highest user recognition confidence threshold, the user recognition component 1208 may cause the voice-enabled device 102 (and/or a different devices indicated in profiles associated with the users indicated in the voice-enabled device's profile) to gather additional data usable for user recognition. Such additional data may include image data or video data that may be used for facial recognition, for example. Such additional data may also include biometric data such as retina image data captured using a retina scanner and used for retina verification. Moreover, such additional data may include biometric data such as fingerprint data captured using a fingerprint scanner and used for fingerprint verification. Other user identifying data may also be used. The user recognition component 1208 may perform user recognition using additional data until the user recognition component 1208 determines a single user (indicated in the profile associated with the voice-enabled device 102) associated with user recognition confidence data 1220 that meets or exceeds the highest user recognition confidence threshold. Likewise, if the user recognition component 1208 determines more than one user associated with user recognition confidence data 1220 that meets or exceeds the highest user recognition confidence threshold, the user recognition component 1208 uses additional data (described above) to perform user recognition until only a single user is associated with user recognition confidence data 1220 that meets or exceeds the highest user recognition confidence threshold.

In addition, the user recognition component 1208 may use secondary data 1214 to inform user recognition processing. Thus, a trained model or other component of the user recognition component 1208 may be trained to take secondary data 1214 as an input feature when performing recognition. Secondary data 1214 may include a wide variety of data types depending on system configuration and may be made available from other sensors, devices, or storage such as user profile data, etc. The secondary data 1214 may include a time of day at which the audio data was captured, a day of a week in which the audio data was captured, the text data 1202, and/or the NLU results 1204.

The system 106 may receive the secondary data 1214 from various devices local to the user (e.g., the voice-enabled device 102, a smart phone, a biometric sensor, etc.). The secondary data 1214 received may depend upon the situation of the user's environment. For example, if multiple individuals are located proximate to the devices(s) (e.g., as determined by multiple individuals being located within a field of view of the camera or based on multiple individuals' voices being detected in audio data captured by the microphone), the system 106 may receive secondary data 1214 corresponding to a passcode, biometric content, or other content that may not be overheard/overseen by the other individuals. The passcode may be provided via a touch interface of a smart device (such as a smart phone, tablet, etc.). The biometric content may be a fingerprint captured by a fingerprint scanner, an image(s) of a retina captured by a retina scanner, etc. In another example, if multiple individuals are located around the user, the secondary data 1214 may only be a portion of a passcode. A user profile may indicate an alphanumeric passcode and the system 106 (or another device) may solicit only a portion (e.g., the third digit) of the passcode from the user. These techniques may be beneficial if it is determined that multiple individuals are present because it allows the user to provide useful verification data without having the user divulge confidential information to unauthorized individuals.

Each form of secondary data 1214 (e.g., image data for retina verification, passcode data, etc.) may be associated with a respective score/weight, or generally the determined confidence data 1220 may depend on the available forms of secondary data and their respective scores, if any. For example, a user recognition performed using retina scan data may increase a confidence data, but the amount of increase may depend on a score associated with the retina scan data (e.g., a score from a retina scan component that produces retina scan data). Thus, it should be appreciated that different forms of secondary data 1214 may affect user recognition determinations differently.

A profile associated with each user may include reference secondary data (i.e., reference retina image data, reference fingerprint image data, etc.) to which captured secondary data 1214 is compared for purposes of user recognition. Moreover, each user profile may include reliability weight information associated with each type of secondary data 1214. The reliability weight information may be specific to the device configured to capture the secondary data. For example, if the user has two different retina scanners, a first retina scanner may have be associated with a first reliability weight and a second retina scanner may be associated with a second reliability weight. If the user recognition component 1208 determines initial user recognition confidence data 1220 that does not satisfy the most stringent user recognition confidence threshold, the user recognition component 1208 may cause secondary data 1214 to be captured thereafter, and may use the secondary data 1214 to determine updated user recognition confidence data 1220.

In examples, secondary data 1214 may include image data or video data. For example, facial recognition may be performed on image data or video data received from the voice-enabled device 102 from which the audio data 802 was received. Facial recognition may be performed by the user recognition component 1208, or another component of the system 106. The output of the facial recognition process may be used by the user recognition component 1208. That is, facial recognition output data may be used in conjunction with the comparison of the features/vectors of the audio data 802 and training data 1216 to perform more accurate user recognition. Thus, while training data 1216 may be based on speech samples of a user, the training data 1216 may also be based on other data such as image data corresponding to known pictures of the user, retina scan data corresponding to the user, fingerprint data, etc.

The secondary data 1214 may also include location data of the voice-enabled device 102. The location data may be specific to a building within which the voice-enabled device 102 is located. For example, if the voice-enabled device 102 is located in user A's bedroom, such location may increase user recognition confidence data associated with user A, but decrease user recognition confidence data associated with user B.

The secondary data 1214 may further include type data indicating a type of the voice-enabled device 102. Different types of voice-enabled devices may include, for example, a smart watch, a smart phone, a tablet computer, and a vehicle. The type of the voice-enabled device 102 may be indicated in a profile associated with the voice-enabled device 102. For example, if the voice-enabled device 102 from which the audio data 802 was received is a smart watch or vehicle belonging to user A, the fact that the voice-enabled device 102 belongs to user A may increase user recognition confidence data associated with user A, but decrease user recognition confidence data associated with user B.

The secondary data 1214 may additionally include geographic coordinate data associated with the voice-enabled device 102. For example, a profile associated with a vehicle may indicate multiple users (e.g., user A and user B). The vehicle may include a global positioning system (GPS) indicating latitude and longitude coordinates of the vehicle when the audio data 802 is captured by the vehicle. As such, if the vehicle is located at a coordinate corresponding to a work location/building of user A, such may increase user recognition confidence data associated with user A, but decrease user recognition confidence data of all other users indicated in the profile associated with the vehicle. Global coordinates and associated locations (e.g., work, home, etc.) may be indicated in a user profile associated with the voice-enabled device 102. The global coordinates and associated locations may be associated with respective users in the user profile.

The secondary data 1214 may also include other data/signals about activity of a particular user that may be useful in performing user recognition of an input utterance. For example, if a user has recently entered a code to disable a home security alarm, and the utterance corresponds to a device at the home, signals from the home security alarm about the disabling user, time of disabling, etc. may be reflected in the secondary data 1214 and considered by the user recognition component 1208. If a mobile device (such as a phone, Tile, dongle, or other device) known to be associated with a particular user is detected proximate to (for example physically close to, connected to the same WiFi network as, or otherwise nearby) the voice-enabled device 102, this may be reflected in the secondary data 1214 and considered by the user recognition component 1208.

Depending on system configuration, the secondary data 1214 may be configured to be included in the vector representation of the user recognition feature/vector data 1011 (for example using encoder 1150) so that all the data relating to the utterance to be processed by the scoring component 1210 may be included in a single vector. Alternatively, the secondary data 1214 may be reflected in one or more different data structures to be processed by the scoring component 1210.

As shown in FIG. 12, the ASR module 154 may output text data 1202, which in turn is processed by the NLU component 156. The results 1204 of NLU processing performed by the NLU component 156 and the user recognition confidence data 1220 output by the user recognition component 1208 may be sent to one or more applications, represented by application server(s) 1250. The NLU results 1204 and the user recognition confidence data 1220 may be sent simultaneously (i.e., in a single transmission) to the application server(s) 1250 via an application program interface (API). Alternatively, the NLU results 1204 and the user recognition confidence data 1220 may be sent in consecutive transmissions to the application server(s) 1250 via the API. The application server(s) 1250 that receives the NLU results 1204 and the user recognition confidence score data 1220 may be determined by the system 106 as corresponding to content responsive to the utterance in the audio data 802. For example, if the audio data 802 includes the utterance "Play my music," the NLU results 1204 and user recognition confidence data 1220 may be sent to a music playing application server 1250. If user recognition confidence data 1220 associated with a single user is passed to the application server(s) 1250, the application server(s) 1250 may identify content responsive to the utterance and associated with the user. If, instead, user recognition confidence score data 1220 associated with multiple users is passed to the application server(s) 1250, the application server(s) 1250 may identify content responsive to the utterance and associated with the user associated with the highest recognition confidence.

The API used to pass the user recognition confidence data 1220 to the application server(s) 1250 may allow the application server(s) 1250 to receive various information such a user ID as well as a confidence value corresponding to the user ID, such as a numeric value or binned value as discussed herein. The API may also pass data corresponding to or representing the confidence value such as a binned value discussed herein or other data, numeric or otherwise representing the confidence. The API may also pass other data such as a source of user recognition data (e.g., whether the system recognized the user using speech analysis, a passcode, a passphrase, a fingerprint, biometric data, etc. or some combination thereof). The API may also pass data such as other user profile information, a speech session identifier (so the various components can track the speech session corresponding to the data) or other information. The speech session identifier may correspond to an utterance spoken by a user and/or to an ongoing exchange between the system and the user (such as a dialog of multiple utterances) to exchange information for executing a command. The API, or one or more other APIs, may also be used to exchange the user recognition confidence thresholds sent from the application server(s) 1250 to the user recognition component 1208 as well as other data such as requested specific sources of user recognition data, user IDs, speech session IDs, requested content data, or other information to be exchanged for purposes of processing a speech command/session.

Various machine learning techniques may be used to train and operate models to perform various steps described above, such as user recognition feature extraction, encoding, user recognition scoring, user recognition confidence determination, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Different content sources may require different user recognition confidence level thresholds be satisfied prior to creating/releasing user specific content. For example, if a user says "What is my bank account balance", an output of the system may ultimately be "Hello John, your Bank A account balance is $500." The portion of the output corresponding to "Hello John" may be created by a TTS content source that requires a user recognition confidence threshold of "low" be satisfied since potentially speaking the wrong user's name in a greeting is not necessarily problematic from a confidentiality perspective. In contrast, the portion of the output corresponding to "your Bank A account balance is $500" may be created using output from a banking content source (e.g., an application server 1250) that requires a user recognition confidence threshold of "high" be satisfied because divulging a bank and an account balance of a user to a wrong user is highly problematic from a confidentiality perspective.

Moreover, a single content source may require different user recognition confidence level thresholds be satisfied based on the type/kind of content to be released. For example, a banking application may be configured to create/release bank branch information (e.g., branch locations and times of operation). The banking application may also be configured to release bank account information. The banking application may require a user recognition confidence level of "low" be satisfied to release bank branch information, but may require a user recognition confidence level of "high" be satisfied to release user specific bank account information.

Figure 13:
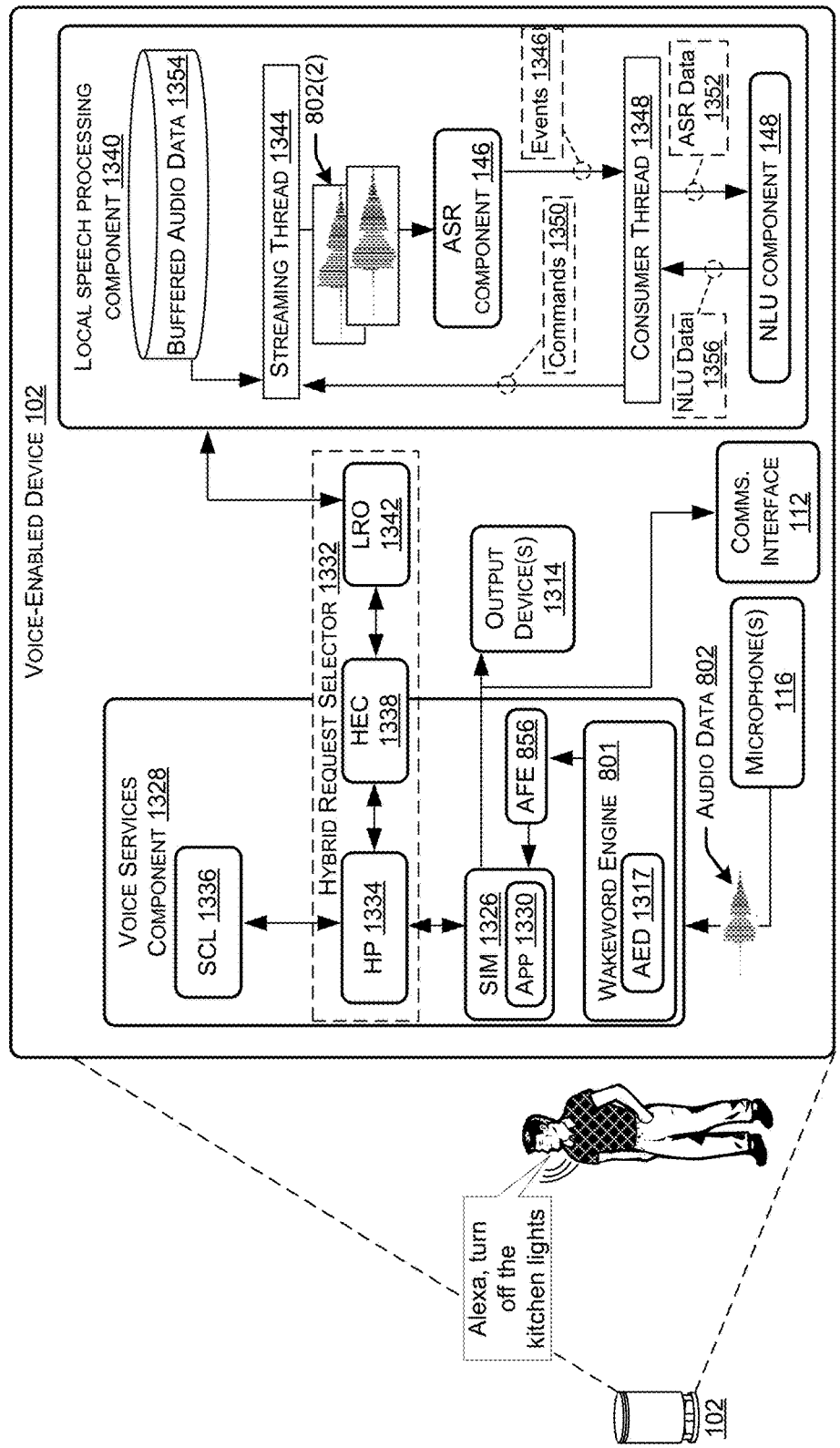
FIG. 13 is a block diagram illustrating a system including a voice-enabled device that is capable of performing speech-processing operations.

FIG. 13 is a block diagram illustrating a system 1300 including a voice-enabled device 102 that is capable of performing speech-processing operations. The voice-enabled device 102 may be located within an environment to provide various capabilities to a user, when the user is also in the environment. The environment in which the voice-enabled device 102 is located may be a home or other premises, an automobile, or any similar environment. Such an environment may include other devices including additional voice-enabled devices, and/or accessory devices 104 (e.g., Internet of Things (IoT) devices and/or smart home devices like thermostats, lights, refrigerators, ovens, etc.) that may be controllable by voice-enabled devices, such as the voice-enabled device 102. When acting as a hub, the voice-enabled device 102 may be configured to connect a multiple devices in an environment and control communications among them, thereby serving as a place of convergence where data arrives from one or more devices, and from which data is sent to one or more devices.

In general, the voice-enabled device 102 may be capable of capturing utterances with a microphone(s) 116, and responding in various ways, such as by outputting content via an output device(s) 1314, which may be a speaker(s), a display(s), or any other suitable output device 1314. In addition, the voice-enabled device 102 may be configured to respond to user speech by controlling second devices that are collocated in the environment with the voice-enabled device 102, such as by sending a command to a second device via a communications interface 112 (e.g., a short range radio), the command instructing an operation to be performed at the second device (e.g., to turn on a light in the environment). FIG. 13 also shows that, in addition to using the microphone(s) 116 to capture utterances and convert them into digital audio data 802, the voice-enabled device 102 may additionally, or alternatively, receive audio data 802 (e.g., via the communications interface 112) from another voice-enabled device in the environment, such as when the other voice-enabled device captures an utterance from the user and sends the audio data 802 to the voice-enabled device 102. This may occur in situations where the other voice-enabled device is closer to the user and would like to leverage the "hybrid" capabilities of the voice-enabled device 102.

Under normal conditions, the voice-enabled device 102 may operate in conjunction with and/or under the control of a remote, network-based or network-accessible control system (abbreviated to "system" 106 in FIG. 1). The system 106 may, in some instances be part of a network-accessible computing platform that is maintained and accessible via a wide area network 108. Network-accessible computing platforms such as this may be referred to using terms such as "on-demand computing", "software as a service (SaaS)", "platform computing", "network-accessible platform", "cloud services", "data centers", and so forth. The system 106 may be configured to provide particular functionality to large numbers of local (e.g., in-home, in-car, etc.) devices of different users. The wide area network 108 is representative of any type of public or private, wide-area network, such as the Internet, which extends beyond the environment of the voice-enabled device 102. Thus, the wide area network 108 may represent and/or include, without limitation, data and/or voice networks, a wired infrastructure (e.g., coaxial cable, fiber optic cable, etc.), a wireless infrastructure (e.g., radio frequencies (RF), cellular, satellite, etc.), and/or other connection technologies.

The term "local" is used herein as an adjective that describes a common attribute of devices, components, processing operations, and resources (e.g., computing resources, such as processing resources, memory resources, networking resources, etc.). As used herein, a "local" device, component, processing operation, and/or resource can be one that is located, or performed, in the environment of the voice-enabled device 102. By contrast, a device, component, processing operation, and/or resource that is located, or performed, at a geographically remote location, such as the geographically remote location of the system 106, is not considered to be a "local" device, component, processing operation, and/or resource. Thus, a "local" component may be a physical, logical and/or functional component of the voice-enabled device 102 itself, or a physical, logical and/or functional component that is located in the environment of the voice-enabled device 102 and is in communication (e.g., in short-range wired or wireless communication) with the voice-enabled device 102. A contrasting example is a component of a server that is located at a geographically remote location and is part of the system 106; such a component is not considered a "local" component, as the term "local" is used herein. A "local" device can be a device that is located in the environment of the voice-enabled device 102. When processing operations are described herein as being performed "locally," this means that they are performed at least in part by the voice-enabled device 102 and/or a component thereof. However, this does not preclude the possibility that another local component and/or device that is located in the environment of the voice-enabled device 102 may perform some of those "locally-performed" processing operations using its own resources, and/or using the resources of the voice-enabled device 102. In some embodiments, "local" processing operations are operations performed exclusively by the voice-enabled device 102. In some embodiments, a "local" device means exclusively the voice-enabled device 102 and does not include devices that are external or peripheral to the voice-enabled device 102. That is, local processing may comprise processing that is done within a common environment but across multiple collocated devices, while in other instances local processing may be done within a single device.

In some embodiments, the system 106 may be configured to receive audio data 802 from the voice-enabled device 102, to recognize speech in the received audio data 802 using a remote speech-processing system 134, and to perform functions in response to the recognized speech. In some embodiments, these functions involve sending directives, from the system 106, to the voice-enabled device 102 to cause the voice-enabled device 102 to perform an action, such as output an audible response to the user speech via a speaker(s) (i.e., an output device(s) 1314), and/or control second devices in the environment by sending a control command via the communications interface 112. Thus, under normal conditions, when the voice-enabled device 102 is able to communicate with the system 106 over a wide area network 108 (e.g., the Internet), some or all of the functions capable of being performed by the system 106 may be performed by sending a directive(s) over the wide area network 108 to the voice-enabled device 102, which, in turn, may process the directive(s) for performing an action(s). For example, the system 106, via a remote directive that is included in remote response data, may instruct the voice-enabled device 102 to output an audible response (e.g., using text-to-speech (TTS)) to a user's question, to output content (e.g., music) via a speaker of the voice-enabled device 102, and/or to turn on/off a light in the environment. It is to be appreciated that the system 106 may be configured to provide other functions in addition to those discussed herein, such as, without limitation, providing step-by-step directions for navigating from an origin to a destination location, conducting an electronic commerce transaction on behalf of the user as part of a shopping function, establishing a communication session between the user and another user, and so on.

A home automation example is shown in FIG. 13 by the user uttering the expression "Alexa, turn off the kitchen lights." Whether this utterance is captured by the microphone(s) 116 of the voice-enabled device 102 or captured by another voice-enabled device in the environment, the audio data 802 representing this user's speech is ultimately received by a wakeword engine 801 of a voice services component 1328 executing on the voice-enabled device 102. The wakeword engine 801 may be configured to compare the audio data 802 to stored models used to detect a wakeword (e.g., "Alexa") that indicates to the voice-enabled device 102 that the audio data 802 is to be processed for determining an intent (a local NLU result). Thus, the wakeword engine 801 is configured to determine whether a wakeword is detected in the audio data 802, and, if a wakeword is detected, the wakeword engine 801 can proceed with routing the audio data 802 to an audio front end (AFE) 856 of the voice services component 1328. If a wakeword is not detected in the audio data 802, the wakeword engine 801 can refrain from sending the audio data 802 to the AFE 856, thereby preventing the audio data 802 from being further processed. The audio data 802 can be discarded in this situation.

In some embodiments, the wakeword engine 801 may include an acoustic event detector (AED) 1317. The AED 1317 may be configured to compare the audio data 802 to stored models used to detect an acoustic or audio event that indicates to the voice-enabled device 102 that the audio data 802 is to be processed for determining an intent for the detected audio event. An example of an audio event might be the sound of a hand clap, the sound of breaking glass, the sound of a baby crying, or the like, that is detected in the audio data 802. In other words, the AED 1317 is configured to detect non-speech events in the audio data 802.

The AFE 856 (sometimes referred to as acoustic front end (AFE) 856) of a voice services component 1328 executing on the voice-enabled device 102. The AFE 856 is configured to transform the audio data 802 from the wakeword engine 801 into data for processing by the ASR component 146 and/or the NLU component 148. The AFE 856 may reduce noise in the audio data 802 and divide the digitized audio data into frames representing a time intervals for which the AFE 856 determines a number of values, called features, representing the qualities of the audio data 802, along with a set of those values, called a feature vector, representing the features/qualities of the audio data 802 within the frame. Many different features may be determined, and each feature represents some quality of the audio data 802 that may be useful for ASR processing and/or NLU processing. A number of approaches may be used by the AFE 856 to process the audio data 802, such as mel-frequency cepstral coefficients (MFCCs), perceptual linear predictive (PLP) techniques, neural network feature vector techniques, linear discriminant analysis, semi-tied covariance matrices, or other approaches known to those of skill in the art. In some embodiments, the AFE 856 is configured to use beamforming data to process the received audio data 802. Beamforming can be used to distinguish between the directions from which speech and noise originate. Accordingly, the microphones 116 may be arranged in a beamforming array to receive multiple audio signals, where multiple audio sources including speech may be identified in different beams and processed. Beamforming may involve processing multiple audio signals (e.g., originating from multiple microphones in a microphone array) together, such as by time shifting one audio signal with respect to another audio signal, to increase the signal and decrease the noise in the audio. Time offsets in the audio data 802, used by the AFE 856 in beamforming, may be determined based on results of the wakeword engine's 801 processing of the audio data 802. For example, the wakeword engine 801 may detect the wakeword in the audio data 802 from a first microphone 116 at time, t, while detecting the wakeword in the audio data 802 from a second microphone 116 a millisecond later in time (e.g., time, t+1 millisecond), and so on and so forth, for any suitable number of audio signals corresponding to multiple microphones 116 in a microphone array.

A speech interaction manager (SIM) 1326 of the voice services component 1328 may receive the audio data 802 that has been processed by the AFE 856. The SIM 1326 may manage received audio data 802 by processing utterances as events, and the SIM 1326 may also manage the processing of directives that are used to respond to the user speech (e.g., by controlling the action(s) of the voice-enabled device 102). The SIM 1326 may include one or more client applications 1330 or skills for performing various functions at the voice-enabled device 102.

A hybrid request selector 1332 (or, hybrid request selector component 1332) of the voice-enabled device 102 is shown as including a hybrid proxy (HP) 1334 (or, hybrid proxy (HP) subcomponent 134), among other subcomponents. The HP 1334 can be implemented as a layer within the voice services component 1328 that is located between the SIM 1326 and a speech communication library (SCL) 1336, and may be configured to proxy traffic to/from the system 106. For example, the HP 1334 may be configured to pass messages between the SIM 1326 and the SCL 1336 (such as by passing events and directives there between), and to send messages to/from a hybrid execution controller (HEC) 1338 (or, hybrid execution controller (HEC) subcomponent 1338) of the hybrid request selector 1332. For instance, directive data received from the system 106 can be sent to the HEC 1338 using the HP 1334, which sits in the path between the SCL 1336 and the SIM 1326. The HP 1334 may also be configured to allow audio data 802 received from the SIM 1326 to pass through to the remote speech processing system 134 (via the SCL 1336) while also receiving (e.g., intercepting) this audio data 802 and sending the received audio data to the HEC 1338 (sometimes via an additional SCL).

A local speech processing component 1340 (sometimes referred to as a "speech processing component" 1340, or a "spoken language understanding (SLU) component" 1340) is configured to process audio data 802 representing user speech. In some embodiments, the hybrid request selector 1332 may further include a local request orchestrator (LRO) 1342 (or, local request orchestrator (LRO) subcomponent) of the hybrid request selector 1332. The LRO 1342 is configured to notify the local speech processing component 1340 about the availability of new audio data 802 that represents user speech, and to otherwise initiate the operations of the local speech processing component 1340 when new audio data 802 becomes available. In general, the hybrid request selector 1332 may control the execution of the local speech processing component 1340, such as by sending "execute" and "terminate" events/instructions to the local speech processing component 1340. An "execute" event may instruct the local speech processing component 1340 to continue any suspended execution based on audio data 802 (e.g., by instructing the local speech processing component 1340 to execute on a previously-determined intent in order to generate a directive). Meanwhile, a "terminate" event may instruct the local speech processing component 1340 to terminate further execution based on the audio data 802, such as when the voice-enabled device 102 receives directive data from the system 106 and chooses to use that remotely-generated directive data.

In the example of FIG. 13, where the user utters the expression "Alexa, turn off the kitchen lights," the audio data 802 is received by the SIM 1326 of the voice services component 1328. The SIM 1326 may send the audio data 802 through the HP 1334, and the HP 1334 may allow the audio data 802 to pass through to the remote speech processing system 134 via the SCL 1336, and the HP 1334 may also input the audio data 802 to the local speech processing component 1340 by routing the audio data 802 through the HEC 1338 of the hybrid request selector 1338, whereby the LRO 1342 notifies the local speech processing component 1340 of the incoming audio data 802. At this point, the hybrid request selector 1332 may wait for response data from either or both of the system 106 or the local speech processing component 1340.

The local speech processing component 1340 is configured to receive the audio data 802 from the hybrid request selector 1332 as input, to recognize speech in the audio data 802, to determine user intent from the recognized speech, and to determine how to act on the user intent by generating directive data. In some cases, a directive may include a description of the intent (e.g., an intent to turn off {device A}). In some cases, a directive may include (e.g., encode) an identifier of a second device(s), such as the kitchen lights, and an operation to be performed at the second device. Directive data that is generated by the local speech processing component 1340 (and/or the remote speech processing system 134) may be formatted using Java, such as JavaScript syntax, or JavaScript-based syntax. This may include formatting the directive using JSON. In some embodiments, a locally-generated directive may be serialized, much like how remotely-generated directives are serialized for transmission in data packets over the wide area network 108. In other embodiments, a locally-generated directive is formatted as a programmatic API call with a same logical operation as a remotely-generated directive. In other words, a locally-generated directive may mimic remotely-generated directives by using a same, or a similar, format as the remotely-generated directive.

In some embodiments, the voice-enabled device 102 may be configured to compare the audio data 802 to stored models used to detect a wakeword (e.g., "Alexa") that indicates to the voice-enabled device 102 that the audio data 802 is to be processed for determining an intent (a local NLU result). In some embodiments, the hybrid request selector 1332 may send the audio data 802 to a wakeword engine, which determines whether a wakeword is detected in the audio data 802, and, if a wakeword is detected, this indication may be provided to the hybrid request selector 1332 so that the hybrid request selector 1332 can proceed with routing the audio data 802 to the remote speech processing system 134 while the local speech processing component 1340 processes the audio data 802 in parallel. If a wakeword is not detected in the audio data 802, this indication may be provided to the hybrid request selector 1332 so that the hybrid request selector 1332 can refrain from sending the audio data 802 to the remote speech processing system 134, and to prevent the local speech processing component 1340 from further processing the audio data 802, which does not include the wakeword. The audio data 802 can be discarded in this situation.

As mentioned, the local speech processing component 1340 may include an ASR component 146 (or, ASR subcomponent 146) that is configured to perform ASR processing on the audio data 802 to convert the audio data 802 into text data (sometimes referred to herein as "ASR text data," an "ASR result", or "ASR data"). ASR transcribes audio data 802 into text data representing the words of the user speech contained in the audio data 802. A spoken utterance in the audio data 802 can be input to the ASR component 146, which then interprets the utterance based on the similarity between the utterance and pre-established language models available to the local speech processing component 1340. For example, the ASR component 146 may compare the input audio data 802 with models for sounds (e.g., subword units or phonemes) and sequences of sounds to identify words that match the sequence of sounds spoken in the utterance of the audio data 802. In some embodiments, the ASR component 146 outputs the most likely text recognized in the audio data 802, or multiple hypotheses in the form of a lattice or an N-best list with individual hypotheses corresponding to confidence scores or other scores (such as probability scores, etc.). In some embodiments, the ASR component 146 is customized to the user (or multiple users) who created a user account to which the voice-enabled device 102 is registered. For instance, the language models (and other data) used by the ASR component 146 may be based on known information (e.g., preferences) of the user, and/or on a history of previous interactions with the user.

As mentioned, the local speech processing component 1340 may also include a NLU component 148 (or, NLU subcomponent 148) that performs NLU processing on the generated ASR text data to determine intent data and/or slot data (referred to herein as a "NLU result", or "NLU data") so that directives may be determined based on the intent data and/or the slot data. Generally, the NLU component 148 takes textual input (such as text data generated by the ASR component 146) and attempts to make a semantic interpretation of the ASR text data. That is, the NLU component 148 determines the meaning behind the ASR text data based on the individual words, and then the NLU component 148 can implement that meaning. The NLU component 148 interprets a text string to derive an intent or a desired action or operation from the user. This may include deriving pertinent pieces of information in the text that allow the NLU component 148 to identify a second device in the environment, if the user, for example, intends to control a second device (e.g., a light(s) in the user's house, as is the case in the example of FIG. 13). The local speech processing component 1340 may also provide a dialog management function to engage in speech dialogue with the user to determine (e.g., clarify) user intents by asking the user for information using speech prompts. In some embodiments, the NLU component 148 is customized to the user (or multiple users) who created a user account to which the voice-enabled device 102 is registered. For instance, data used by the NLU component 148 to understand the meaning of ASR text may be based on known information (e.g., preferences) of the user, and/or on a history of previous interactions with the user.

In some embodiments, one or more subcomponents of the local speech processing component 1340 may utilize "artifacts." An "artifact," as used herein, means compiled data that is executable by one or more subcomponents of the local speech processing component 1340 when responding to user speech. Examples of artifacts include, without limitation, ASR models (e.g., acoustic models, language models, etc.), NLU models (e.g., grammar models), entity resolution (ER) data (e.g., lexical data, including association data that associates names of entities with canonical identifiers of those entities, etc.), and/or TTS voice files. In some embodiments, the compiled form of an artifact includes a finite state transducer (FST) that is usable, by one or more subcomponents of the local speech processing component 1340, to process user speech. A FST may include a compressed graph structure that relates to words and/or phrases (e.g., names of entities, expressions of intent, etc.). In some embodiments, the local speech processing component 1340 may also include, or be configured to use, one or more installed speechlets, as described more fully above.

In order to generate a particular interpreted response, the NLU component 148 may apply grammar models and lexical information associated with the respective domains or speechlets to recognize one or more entities in the text of the query. In this manner the NLU component 148 may identify "slots" (i.e., particular words in query text) that may be needed for later command processing. Depending on the complexity of the NLU component 148, it may also label each slot with a type of varying levels of specificity (such as noun, place, city, artist name, song name, device name, or the like). Each grammar model used by the NLU component 148 may include the names of entities (i.e., nouns) commonly found in speech about the particular domain (e.g., generic terms), whereas the lexical information (e.g., from a gazetteer) is personalized to the user(s) and/or the device. For instance, a grammar model associated with the navigation domain may include a database of words commonly used when people discuss navigation.

Accordingly, the intents identified by the NLU component 148 may be linked to domain-specific grammar frameworks with "slots" or "fields" to be filled (e.g., resolved). Each slot/field corresponds to a portion of the query text that the system believes corresponds to a named entity. For example, if "play music" is an identified intent, a grammar framework(s) may correspond to sentence structures such as "Play {Artist Name}," "Play {Album Name}," "Play {Song name}," "Play {Song name} by {Artist Name}," etc. However, to make slot resolution more flexible, these frameworks would ordinarily not be structured as sentences, but rather based on associating slots with grammatical tags.

For example, the NLU component 148 may parse the query to identify words as subject, object, verb, preposition, etc., based on grammar rules and/or models, prior to recognizing named entities. The identified verb may be used by the NLU component 148 to identify an intent, which is then used to identify frameworks. A framework for an intent of "play" may specify a list of slots/fields applicable to play the identified "object" and any object modifier (e.g., a prepositional phrase), such as {Artist Name}, {Album Name}, {Song name}, etc. The NLU component 148 may then search the corresponding fields in the domain-specific and personalized lexicon(s), attempting to match words and phrases in the query tagged as a grammatical object or object modifier with those identified in the database(s).

After determining local intent data, or failing to do so, the local speech processing component 1340 may send response data to the hybrid request selector 1332, such as a "ReadyToExecute" response, which can indicate that the local speech processing component 1340 has recognized an intent, or that the local speech processing component 1340 is ready to communicate failure (if the local speech processing component 1340 could not recognize an intent via the NLU component 148). The hybrid request selector 1332 may then determine whether to use directive data from the local speech processing component 1340 to respond to the user speech, or whether to use directive data received from the system 106, assuming a remote response is even received (e.g., when the voice-enabled device 102 is able to access the remote speech processing system 1324 over the wide area network 108). In a scenario where the hybrid request selector 1332 chooses remote directive data to respond to user speech, the microphone(s) 116 may be closed so that no more audio data is processed through the local speech processing component 1340, and the local speech processing component 1340 finishes processing whatever audio data it has already ingested.

When audio data 802 representing user speech is processed locally on the voice-enabled device 102, the LRO 1342 can notify the local speech processing component 1340 that an interaction has started, and the audio data 802 can be input to the local speech processing component 1340. As shown in FIG. 13, the local speech processing component 1340 may buffer the audio data 802 as buffered audio data 1354 before that audio data is input to the ASR component 146. This may be accomplished by storing the audio data 802 in volatile memory, such as a volatile memory buffer (e.g., a dynamic random-access memory (DRAM) buffer), of the voice-enabled device 102. Such a volatile memory buffer can include any suitable form of volatile memory (e.g., volatile RAM) that is not used for persistent storage of data, but is used to temporarily store data until it is used, transmitted, deleted, and/or stored persistently. The local speech processing component 1340 may also invoke a streaming thread 1344 that is executed on one or more processors of the voice-enabled device 102 to stream (or otherwise input) the incoming audio data 802 (representing the user speech) to the ASR component 146. As mentioned, audio data 802 that has been buffered as the buffered audio data 1354 may be partitioned into multiple audio data samples, and these audio data samples may be input sequentially to the ASR component 146. For example, a single utterance (e.g., "Alexa, turn off the kitchen lights") captured by a microphone(s) 116 of the voice-enabled device 102 can be digitized into audio data 802, and this audio data 802 may be partitioned into multiple audio data samples, such as a first audio data sample 802(1), a second audio data sample 802(2), etc. The samples of audio data 802 may be partitioned based on an amount of data (e.g., each sample may be a particular number of bytes, representing a few milliseconds of audio, such as 5 milliseconds (ms), 10 ms, 15 ms, or any other suitable apportionment of the audio data 802). Collectively, these audio data samples 802(1), 802(2), etc., may representative a single utterance or multiple utterances, such as when the user speaks a first utterance, then pauses momentarily, and then speaks a second utterance.

Initially, the streaming thread 1344 is configured to automatically input audio data samples to the ASR component 146 as long as audio data samples are received from the hybrid request selector 1332 and buffered as the buffered audio data 1354. The ASR component 146 is configured to perform ASR processing on the audio data samples it receives from the streaming thread 1344, and to emit events 1346 (event data) that vary in type. For example, the ASR component 146 may emit a first type of event 1346 (e.g., a "StartOfSpeech" event) that indicates the ASR component 146 has detected a point in the audio data 802 where the user speech has started (e.g., the ASR component 146 has detected that the user started speaking). The ASR component 146 may additionally, or alternatively, emit another type of event 1346 (e.g., an "EndOfSpeech" event) that indicates the ASR component 146 has detected a breakpoint in the audio data 802 where the user speech has stopped (e.g., the ASR component 146 has detected that the user stopped speaking). The ASR component 146 may use any suitable endpointing model for this purpose. In some embodiments, the ASR component 146 may analyze the frequencies of the audio data 802 to determine a frequency range that corresponds to a human voice, and may determine the breakpoint based at least in part on pause durations in that frequency range of the voice being analyzed. The ASR component 146 may additionally, or alternatively, emit yet another type of event 1346 (e.g., a "RecognitionResult" event) that includes text data and that indicates the ASR component 146 has recognized user speech in the audio data 802.

In response to the LRO 1342 notifying the local speech processing component 1340 that an interaction has started, the local speech processing component 1340 may also invoke a consumer thread 1348 that is executed on one or more processors of the voice-enabled device 102 to receive the events 1346 (event data) emitted (or output) from the ASR component 146, and to respond in various ways (e.g., by sending commands 1350 to the streaming thread 1344, and/or by forwarding ASR data 1352 to the NLU component 148, etc.) depending on the type of event 1346 received from the ASR component 146. Although the order in which the streaming thread 1344 and the consumer thread 1348 are invoked can vary by implementation, in some embodiments, the consumer thread 1348 is invoked before the streaming thread 1344 is invoked. It is to be appreciated the streaming thread 1344 and the consumer thread 1348 are examples of threads of execution. A "process" is an instance of a computer program. A process may be made up of multiple threads of execution that execute instructions concurrently. Accordingly, the streaming thread 1344 and the consumer thread 1348 may execute concurrently, and they may be part of the same process, or they may be parts of different processes. The streaming thread 1344 and the consumer thread 1348 may execute concurrently using a parallel multithreading implementation, or a processor(s) of the voice-enabled device 102 may execute each of these threads using time slicing, where the processor switches between executing the streaming thread 1344 and the consumer thread 1348. Multiple threads may also share memory resources of the voice-enabled device 102. Threads can be used to divide (sometimes referred to as "split") a computer program into two or more executing tasks. In this sense, a thread can be contained inside of a process, and different threads in the same process may share the same resources.

The processes described herein are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A system comprising:
one or more processors; and
non-transitory computer-readable media storing computer-executable instructions that, when executed by the one or more processors, cause the one or more processors to perform operations comprising:
receiving first data representing a naming identifier for a smart-home device associated with a voice-enabled device, the naming identifier generated based at least in part on user input data;
generating, based at least in part on the first data, tag data indicating a location portion of the naming identifier, a device type portion of the naming identifier, and a name portion of the naming identifier;
receiving, from the voice-enabled device, audio data representing a user utterance;
determining, from the audio data, intent data indicating that the user utterance corresponds to a request to operate a target smart-home device associated with the voice-enabled device;
generating, utilizing the tag data, a naming indicator for the smart-home device, the generating including generating text data representing words corresponding to the naming indicator, the words including the name portion, a grammatical indicator of possession, the location portion following the name, and the device type portion following the location portion;
determining, from the naming indicator corresponding to an identifier of the target smart-home device from the audio data, that the smart-home device corresponds to the target smart-home device; and
generating output data representing a response to the user utterance, the response indicating performance of an operation by the target smart-home device identified using the naming indicator.

2. The system of claim 1, the operations further comprising:
receiving the first data in a format without capitalization and punctuation;
receiving a formatting model configured to identify first portions of the naming identifier to be capitalized and second portions of the naming identifier to include punctuation;
generating, using the formatting model with the naming identifier as an input, formatted text data corresponding to the naming identifier, the formatted text data indicating a capitalized portion of the naming identifier and including punctuation; and
wherein generating the tag data is from the formatted text data.

3. The system of claim 1, the operations further comprising:
generating, from the first data, a featurized identifier for the smart-home device;
receiving a tagging model configured to receive the featurized identifier as input and generate, as output, the tag data; and
wherein generating the tag data utilizes the tagging model and the featurized identifier.

4. The system of claim 1, the operations further comprising:
determining, from the tag data, that the name portion includes a name of a person;
associating the name with a person identifier;
determining, from characteristics of the audio data, that a voice signature for the audio data corresponds to a reference voice signature associated with the person identifier; and
wherein the output data indicates that the target smart-home device is associated with the person.

5. A method, comprising:
receiving first data representing a first identifier of an electronic device associated with a voice-enabled device, the first identifier generated based at least in part on user input data;
generating tag data for the electronic device, the tag data indicating grammatic portions of the first identifier of the electronic device, the tag data generated based at least in part on the first data;
generating, based at least in part on the tag data, a second identifier of the electronic device; and
generating output data that:
identifies the electronic device by the second identifier; and
corresponds to a phrase structured based at least in part on the second identifier.

6. The method of claim 5, further comprising:
receiving the first identifier of the electronic device in a format without capitalization and punctuation;
receiving a formatting model configured to identify a first portion of the first identifier to be capitalized and a second portion of the first identifier to include punctuation;
generating, based at least in part on the formatting model with the first identifier as an input, formatted text data corresponding to the first identifier, the formatted text data indicating a capitalized portion of first identifier and including punctuation; and
wherein generating the tag data comprises generating the tag data based at least in part on the formatted text data.

7. The method of claim 5, further comprising:
generating, from the first identifier, a featurized identifier for the electronic device, the featurized identifier indicating an attribute of the first identifier;
receiving a tagging model configured to receive the featurized identifier as input and generate, as output, the tag data; and
wherein generating the tag data comprises generating the tag data based at least in part on the tagging model and the featurized identifier.

8. The method of claim 5, further comprising:
determining, based at least in part on the tag data, that the first identifier includes a name of a person;
associating the name with a person identifier;
receiving audio data representing a user utterance from the voice-enabled device;

determining, based at least in part on characteristics of the audio data, that a voice signature for the audio data corresponds to a reference voice signature associated with the person identifier; and wherein the output data indicates that the electronic device is associated with the person.

9. The method of claim 5, wherein the electronic device comprises a first electronic device, and the method further comprises:

receiving, from the voice-enabled device, audio data representing a user utterance;

determining, based at least in part on the audio data, that the user utterance includes a request to operate the first electronic device and a second electronic device;

wherein generating the second identifier for the first electronic device comprises generating the second identifier naming indicator for a device group including the first electronic device and the second electronic device; and wherein the output data identifies the device group by the second identifier.

10. The method of claim 5, further comprising:

receiving, from the voice-enabled device, audio data representing a user utterance;

determining, based at least in part on the audio data, intent data indicating that the user utterance corresponds to a request to operate a target electronic device associated with the voice-enabled device;

determining, based at least in part on the second identifier, that the second identifier associated with the electronic device corresponds to an identifier of the target electronic device; and wherein the output data represents a response to the user utterance, the response indicating performance of an operation by the target electronic device identified using the second identifier.

11. The method of claim 5, further comprising:

determining, based at least in part on contextual data, that the electronic device is historically in a first state during a period of time;

determining that the electronic device is in a second state during the period of time; and wherein the output data includes an alert that the electronic device having the second identifier is in the second state.

12. The method of claim 5, wherein the electronic device comprises a first electronic device, and the method further comprises:

receiving, from the voice-enabled device, audio data representing a user utterance;

determining, based at least in part on the audio data, intent data indicating that the user utterance corresponds to a request to operate a target electronic device;

determining that an identifier of the first electronic device corresponds to the target electronic device;

determining that an identifier of a second electronic device corresponds to the target electronic device; and wherein the output data includes a request to confirm that the first electronic device having the second identifier corresponds to the target electronic device instead of the second electronic device.

13. A system comprising:
one or more processors; and
non-transitory computer-readable media storing computer-executable instructions that, when executed by the one or more processors, cause the one or more processors to perform operations comprising:

receiving first data representing a first identifier of an electronic device associated with a voice-enabled device, the first identifier generated based at least in part on user input data;

generating tag data based at least in part on the first data, the tag data indicating grammatic portions of the first identifier of the electronic device;

generating, based at least in part on the tag data, a second identifier for the electronic device; and generating output data that:
identifies the electronic device by the second identifier; and
corresponds to a phrase structured based at least in part on the second identifier.

14. The system of claim 13, the operations further comprising:

receiving a formatting model configured to identify a first portion of the first identifier to be capitalized and a second portion of the first identifier to include punctuation;

generating, based at least in part on the formatting model with the first identifier as an input, formatted text data corresponding to the first identifier, the formatted text data indicating a capitalized portion of the first identifier and including punctuation; and wherein generating the tag data comprises generating the tag data based at least in part on the formatted text data.

15. The system of claim 13, the operations further comprising:

generating, from the first identifier, a featurized identifier for the electronic device, the featurized identifier indicating an attribute associated with the first identifier;

receiving a tagging model configured to receive the featurized identifier as input and generate, as output, tag data; and wherein generating tag data comprises generating the tag data based at least in part on the tagging model and the featurized identifier.

16. The system of claim 13, the operations further comprising:

determining, based at least in part on the tag data, that the first identifier of the electronic device includes a name of a person;

associating the name with a person identifier;

receiving audio data representing a user utterance from the voice-enabled device;

determining, based at least in part on characteristics of the audio data, that a voice signature for the audio data corresponds to a reference voice signature associated with the person identifier; and wherein the output data indicates that the electronic device is associated with the person.

17. The system of claim 13, wherein the electronic device comprises a first electronic device, and the operations further comprise:

receiving, from the voice-enabled device, audio data representing a user utterance;

determining, based at least in part on the audio data, that the user utterance includes a request to operate the first electronic device and a second electronic device;

wherein generating the second identifier comprises generating the second identifier for a device group including the first electronic device and the second electronic device; and wherein the output data identifies the device group by the second identifier.

18. The system of claim 13, the operations further comprising:
- receiving, from the voice-enabled device, audio data representing a user utterance;
- determining, based at least in part on the audio data, intent data indicating that the user utterance corresponds to a request to operate a target electronic device associated with the voice-enabled device;
- determining, based at least in part on the second identifier, that the electronic device corresponds to the target electronic device; and
- wherein the output data represents a response to the user utterance, the response indicating performance of an operation by the target electronic device identified using the second identifier.

19. The system of claim 13, the operations further comprising:
- determining, based at least in part on contextual data, that the electronic device is historically in a first state during a period of time;
- determining that the electronic device is in a second state during the period of time; and
- wherein the output data includes an alert that the electronic device having the second identifier is in the second state.

20. The system of claim 13, wherein the electronic device comprises a first electronic device, and the operations further comprise:
- receiving, from the voice-enabled device, audio data representing a user utterance;
- determining, based at least in part on the audio data, intent data indicating that the user utterance corresponds to a request to operate a target electronic device;
- determining that an identifier of the first electronic device corresponds to the target electronic device;
- determining that an identifier of a second electronic device corresponds to the target electronic device; and
- wherein the output data includes a request to confirm that the first electronic device having the second identifier corresponds to the target electronic device instead of the second electronic device.

* * * * *